(12) United States Patent
Baba et al.

(10) Patent No.: US 7,885,009 B2
(45) Date of Patent: Feb. 8, 2011

(54) SMALL PROJECTION LENS AND PROJECTION DISPLAY DEVICE USING THE SAME

(75) Inventors: Tomoyuki Baba, Saitama (JP); Chikara Yamamoto, Saitama (JP); Kenzo Sado, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/544,633

(22) Filed: Aug. 20, 2009

(65) Prior Publication Data
US 2010/0053774 A1    Mar. 4, 2010

(30) Foreign Application Priority Data
Sep. 1, 2008   (JP)   ............ P2008-223047
Jun. 4, 2009   (JP)   ............ P2009-134591

(51) Int. Cl.
*G02B 9/00*   (2006.01)
(52) U.S. Cl. .................. 359/651; 359/649
(58) Field of Classification Search .......... 359/649–651
See application file for complete search history.

(56) References Cited
U.S. PATENT DOCUMENTS
7,057,830 B2 *   6/2006   Ebbesmeier ........... 359/755

FOREIGN PATENT DOCUMENTS
JP        3508011 B2      3/2004
JP        2005-84456 A    3/2005

* cited by examiner

*Primary Examiner*—William C Choi
(74) *Attorney, Agent, or Firm*—Birch, Stewart, Kolasch & Birch, LLP

(57) ABSTRACT

A small projection lens includes a first lens, which is a biconvex lens, an aperture, an aperture diaphragm (or an aperture), a second lens, which is a negative meniscus lens having a concave surface facing a magnification side, a third lens, which is a positive meniscus lens having a convex surface facing a reduction side, and a fourth lens, which is a biconvex lens having aspheric surfaces at both sides on an optical axis, arranged in this order from the magnification side. A minimum portion of the length of all lens elements of the small projection lens in a diametric direction vertical to the optical axis is equal to or less than 15 mm, and the small projection lens satisfies the following conditional expression: $2.5 < \beta/S < 10.0$ (where S indicates the maximum length of a magnification-side image (inch) and $\beta$ indicates a magnifying power).

18 Claims, 44 Drawing Sheets

EXAMPLE 1

EXAMPLE 2

EXAMPLE 4

FIG.6 EXAMPLE 6

EXAMPLE 8

EXAMPLE 9

EXAMPLE 11

EXAMPLE 13

EXAMPLE 14

EXAMPLE 15

EXAMPLE 16

EXAMPLE 17

FIG.18 EXAMPLE 18

EXAMPLE 19

FIG.20 EXAMPLE 20

EXAMPLE 21

FIG.22 EXAMPLE 22

EXAMPLE 23

EXAMPLE 24

EXAMPLE 25

EXAMPLE 26

EXAMPLE 27

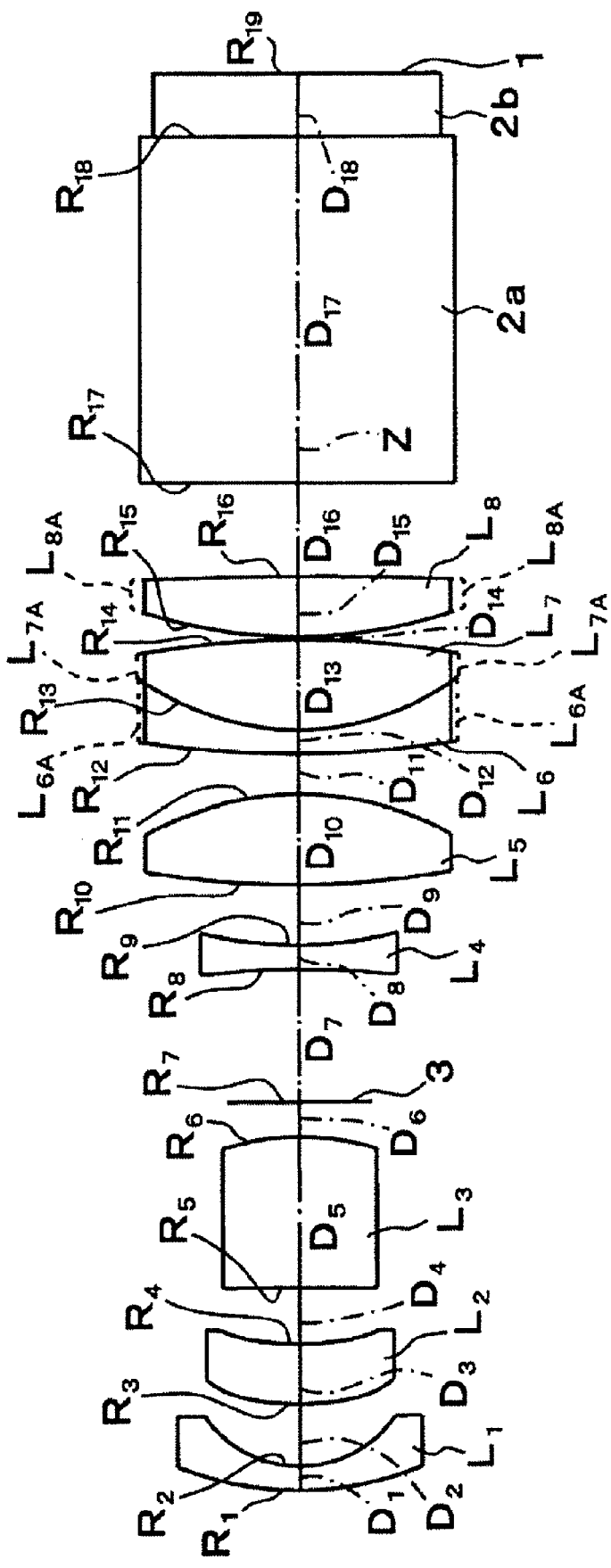

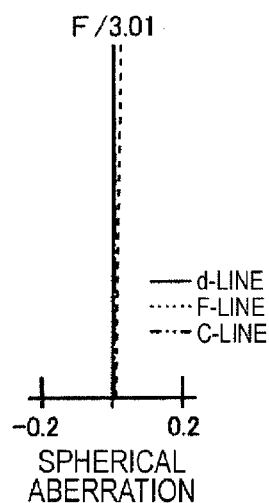
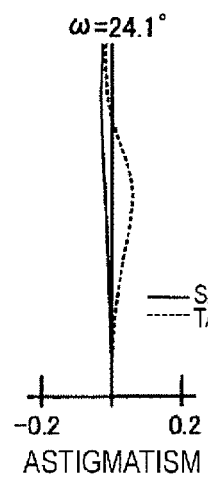
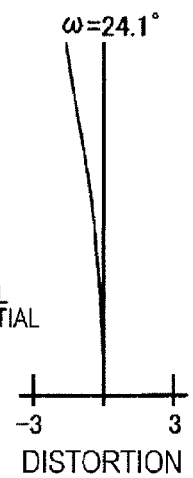
FIG.29A EXAMPLE 1 — SPHERICAL ABERRATION
FIG.29B EXAMPLE 1 — ASTIGMATISM
FIG.29C EXAMPLE 1 — DISTORTION
FIG.29D EXAMPLE 1 — LATERAL CHROMATIC ABERRATION
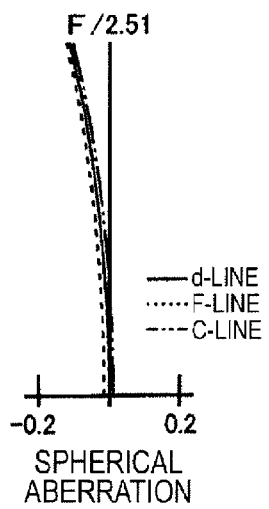
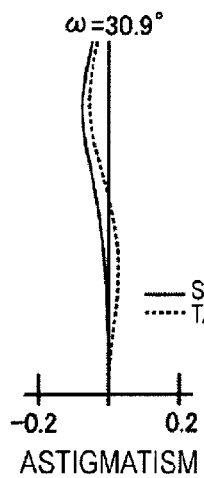
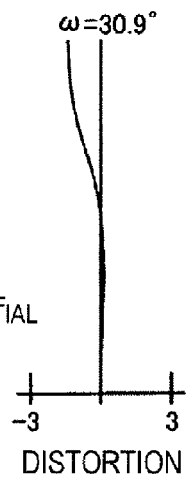
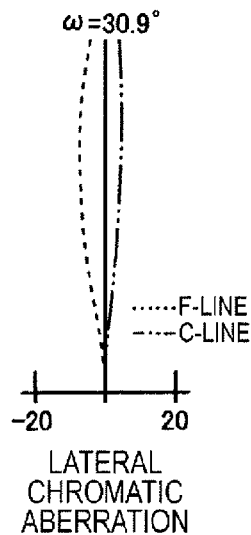
FIG.30A EXAMPLE 2 — SPHERICAL ABERRATION
FIG.30B EXAMPLE 2 — ASTIGMATISM
FIG.30C EXAMPLE 2 — DISTORTION
FIG.30D EXAMPLE 2 — LATERAL CHROMATIC ABERRATION FIG.31A EXAMPLE 3
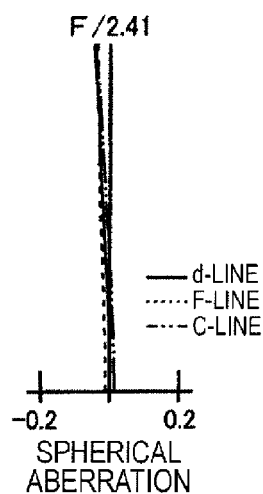
SPHERICAL ABERRATION
FIG.31B EXAMPLE 3
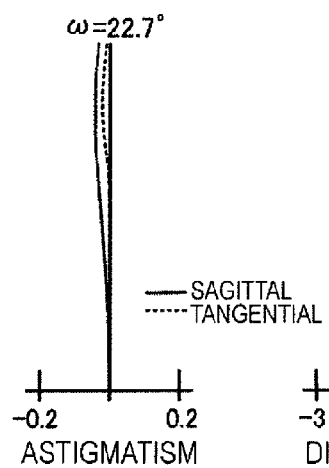
ASTIGMATISM
FIG.31C EXAMPLE 3
DISTORTION
FIG.31D EXAMPLE 3
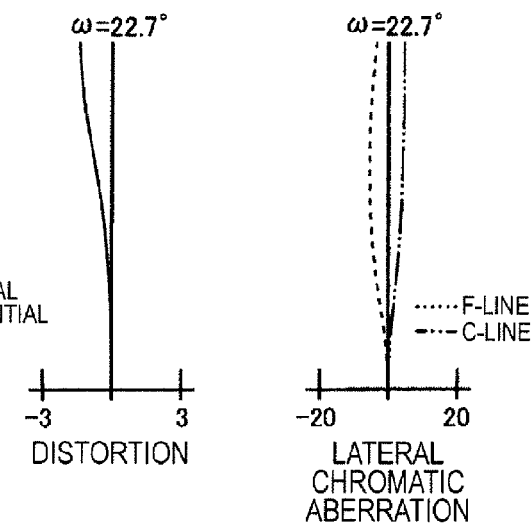
LATERAL CHROMATIC ABERRATION
FIG.32A EXAMPLE 4
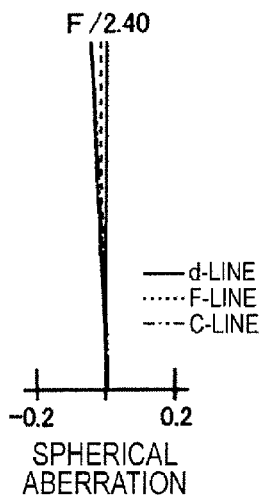
SPHERICAL ABERRATION
FIG.32B EXAMPLE 4
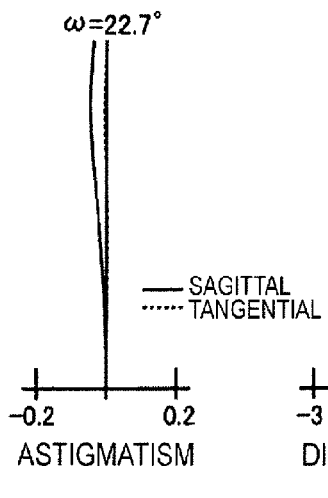
ASTIGMATISM
FIG.32C EXAMPLE 4
DISTORTION
FIG.32D EXAMPLE 4
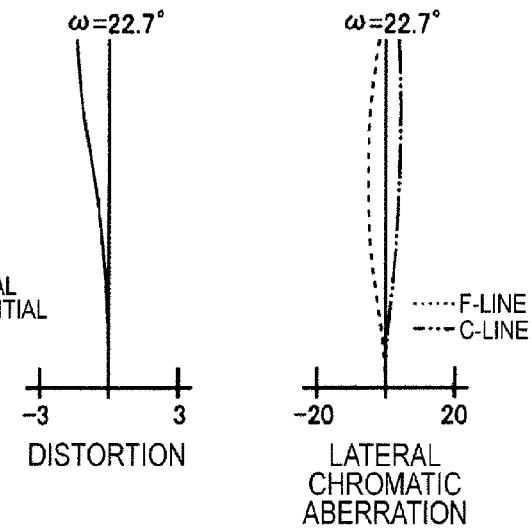
LATERAL CHROMATIC ABERRATION

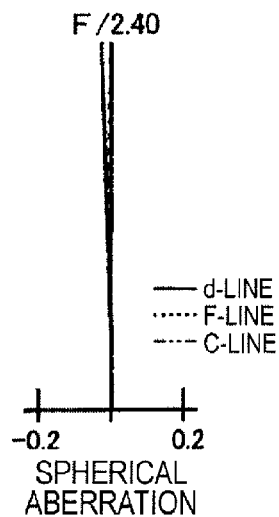
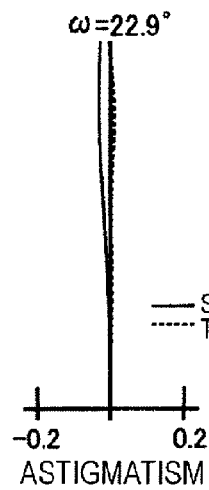
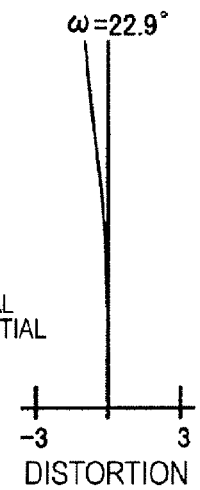
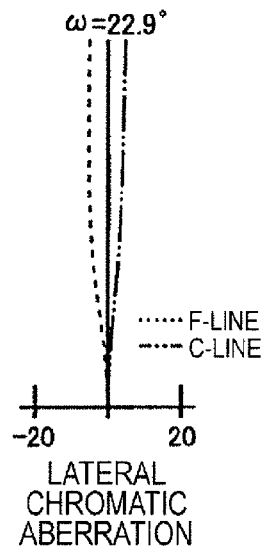
FIG.33A EXAMPLE 5 — SPHERICAL ABERRATION
FIG.33B EXAMPLE 5 — ASTIGMATISM
FIG.33C EXAMPLE 5 — DISTORTION
FIG.33D EXAMPLE 5 — LATERAL CHROMATIC ABERRATION
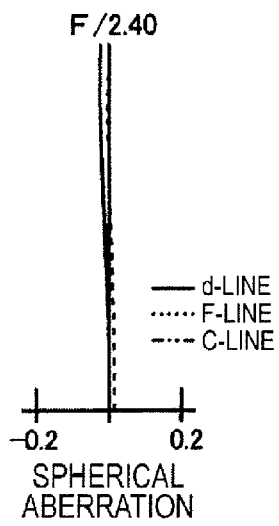
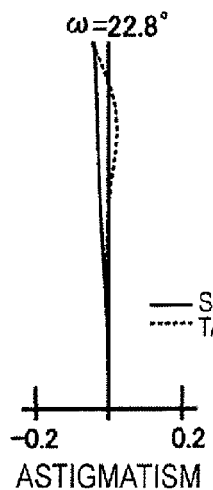
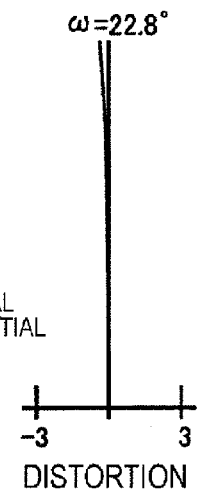
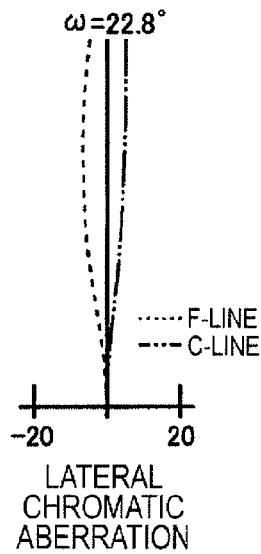
FIG.34A EXAMPLE 6 — SPHERICAL ABERRATION
FIG.34B EXAMPLE 6 — ASTIGMATISM
FIG.34C EXAMPLE 6 — DISTORTION
FIG.34D EXAMPLE 6 — LATERAL CHROMATIC ABERRATION

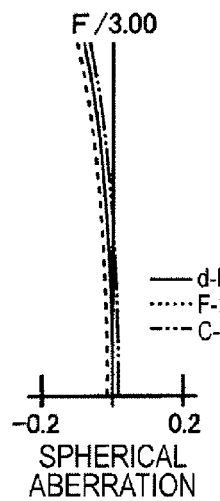 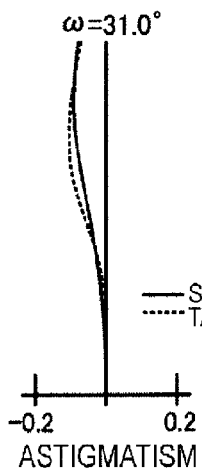 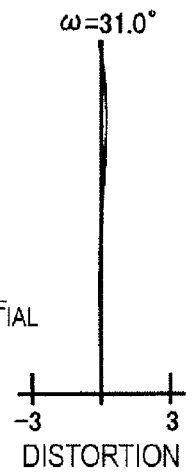 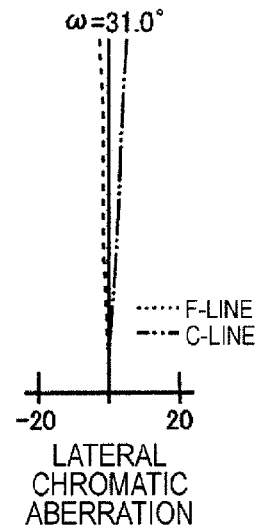
FIG.35A EXAMPLE 7 — SPHERICAL ABERRATION
FIG.35B EXAMPLE 7 — ASTIGMATISM
FIG.35C EXAMPLE 7 — DISTORTION
FIG.35D EXAMPLE 7 — LATERAL CHROMATIC ABERRATION
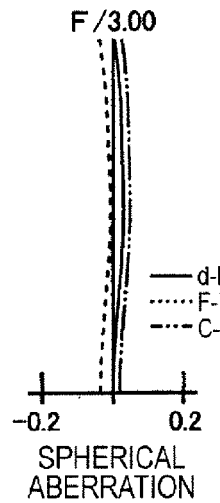 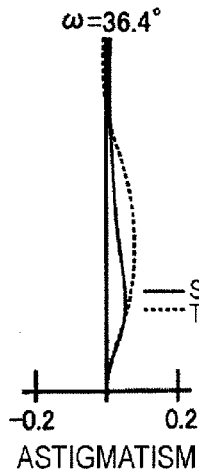 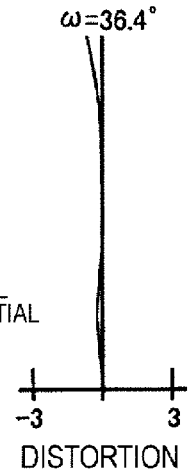 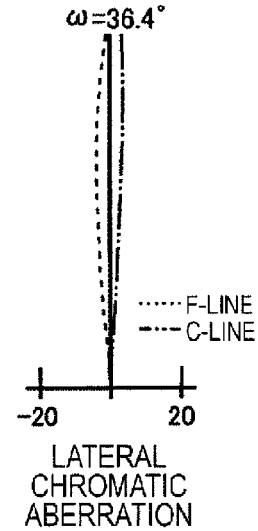
FIG.36A EXAMPLE 8 — SPHERICAL ABERRATION
FIG.36B EXAMPLE 8 — ASTIGMATISM
FIG.36C EXAMPLE 8 — DISTORTION
FIG.36D EXAMPLE 8 — LATERAL CHROMATIC ABERRATION

EXAMPLE 9
SPHERICAL ABERRATION

EXAMPLE 9
ASTIGMATISM

EXAMPLE 9
DISTORTION

EXAMPLE 9
LATERAL CHROMATIC ABERRATION

EXAMPLE 10
SPHERICAL ABERRATION

EXAMPLE 10
ASTIGMATISM

EXAMPLE 10
DISTORTION

EXAMPLE 10
LATERAL CHROMATIC ABERRATION

FIG.39A EXAMPLE 11
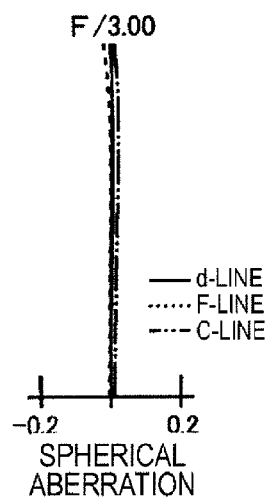
SPHERICAL ABERRATION
FIG.39B EXAMPLE 11
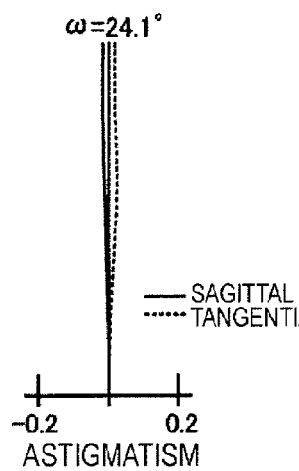
ASTIGMATISM
FIG.39C EXAMPLE 11
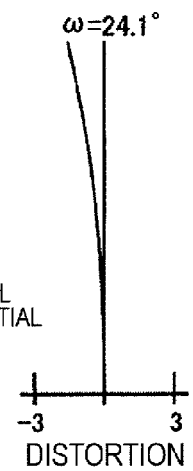
DISTORTION
FIG.39D EXAMPLE 11
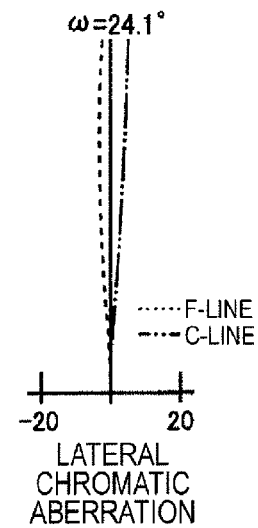
LATERAL CHROMATIC ABERRATION
FIG.40A EXAMPLE 12
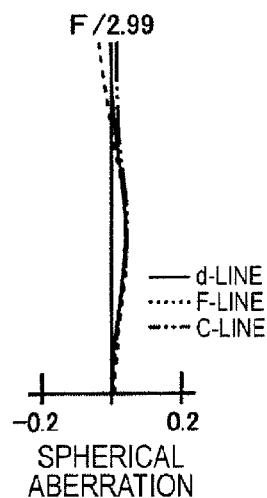
SPHERICAL ABERRATION
FIG.40B EXAMPLE 12
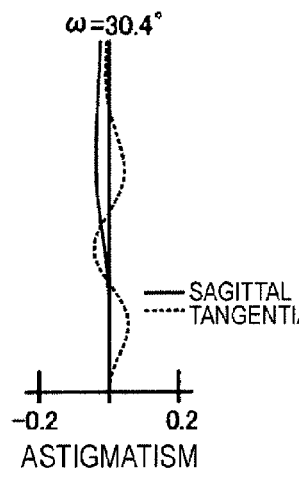
ASTIGMATISM
FIG.40C EXAMPLE 12
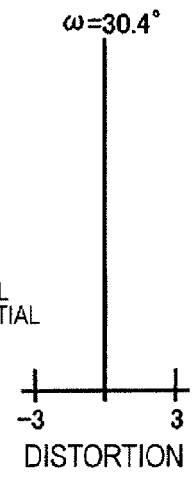
DISTORTION
FIG.40D EXAMPLE 12
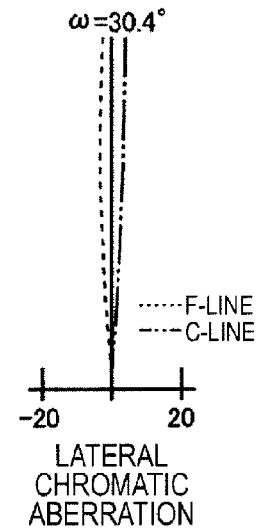
LATERAL CHROMATIC ABERRATION

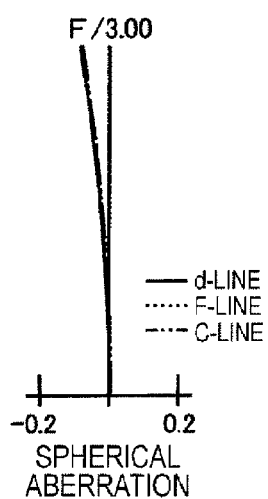
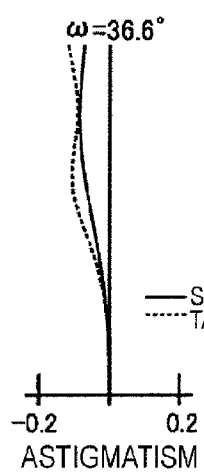
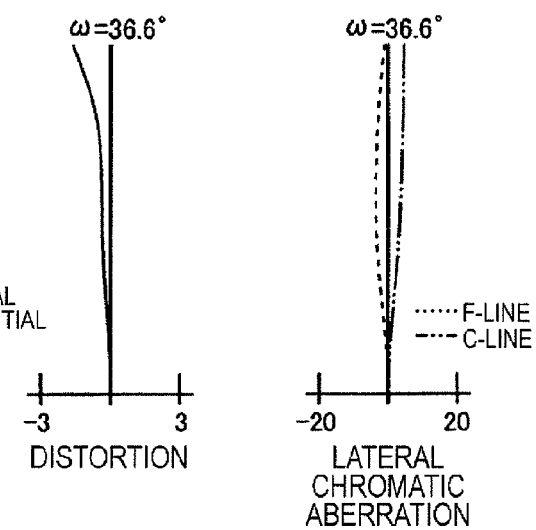
FIG.41A EXAMPLE 13
FIG.41B EXAMPLE 13
FIG.41C EXAMPLE 13
FIG.41D EXAMPLE 13
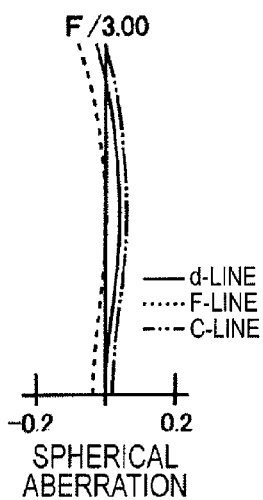
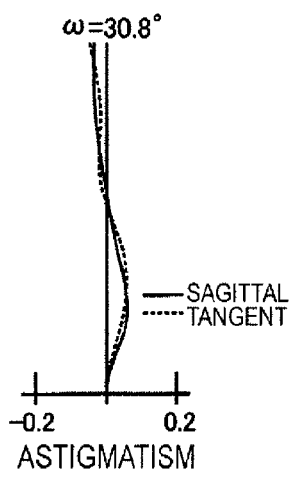
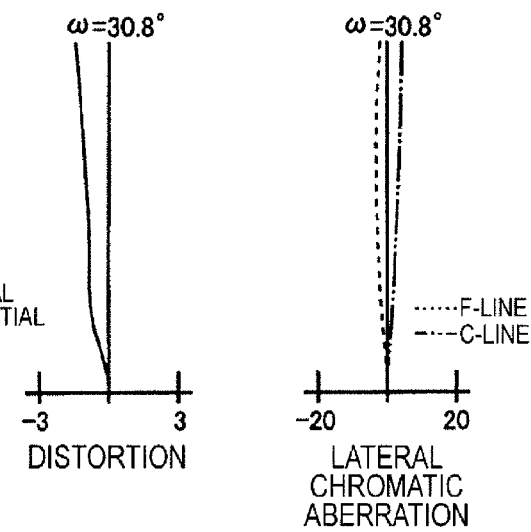
FIG.42A EXAMPLE 14
FIG.42B EXAMPLE 14
FIG.42C EXAMPLE 14
FIG.42D EXAMPLE 14

EXAMPLE 15

SPHERICAL ABERRATION

EXAMPLE 15

ASTIGMATISM

EXAMPLE 15

DISTORTION

EXAMPLE 15

LATERAL CHROMATIC ABERRATION

EXAMPLE 16

SPHERICAL ABERRATION

EXAMPLE 16

ASTIGMATISM

EXAMPLE 16

DISTORTION

EXAMPLE 16

LATERAL CHROMATIC ABERRATION

EXAMPLE 17

EXAMPLE 17

EXAMPLE 17

EXAMPLE 17

EXAMPLE 18

EXAMPLE 18

EXAMPLE 18

EXAMPLE 18

FIG.47A EXAMPLE 19
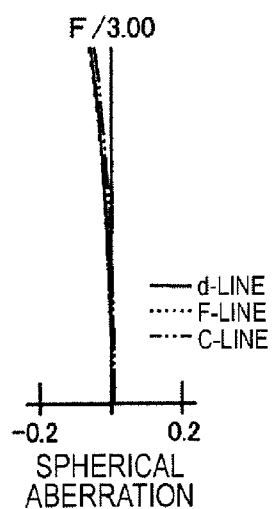
FIG.47B EXAMPLE 19
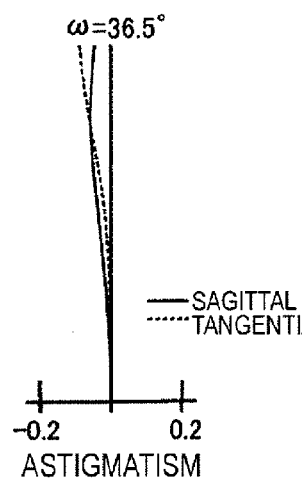
FIG.47C EXAMPLE 19
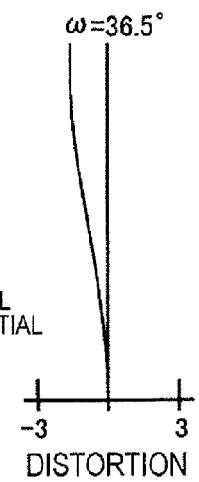
FIG.47D EXAMPLE 19
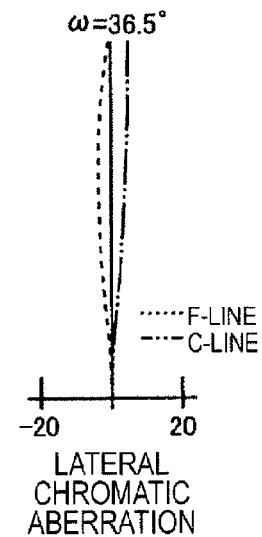
FIG.48A EXAMPLE 20
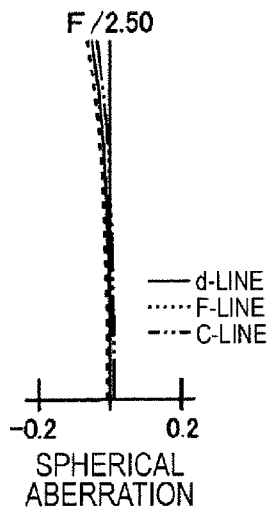
FIG.48B EXAMPLE 20
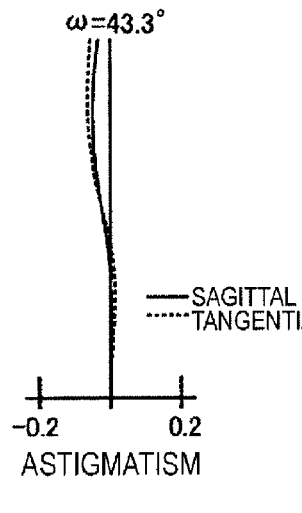
FIG.48C EXAMPLE 20
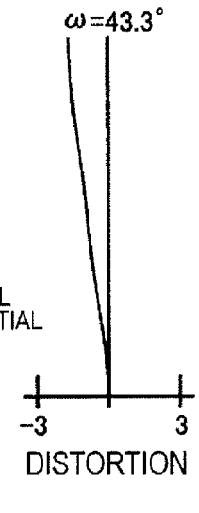
FIG.48D EXAMPLE 20
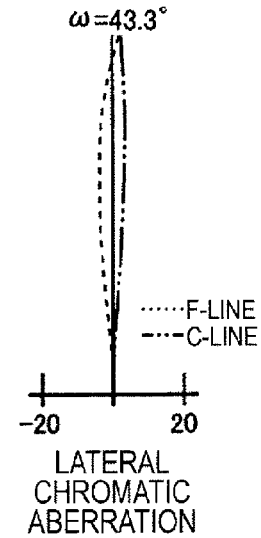

EXAMPLE 21

EXAMPLE 21

EXAMPLE 21

EXAMPLE 21

EXAMPLE 22

EXAMPLE 22

EXAMPLE 22

EXAMPLE 22

EXAMPLE 23

EXAMPLE 23

EXAMPLE 23

EXAMPLE 23

EXAMPLE 24

EXAMPLE 24

EXAMPLE 24

EXAMPLE 24

FIG.53A EXAMPLE 25
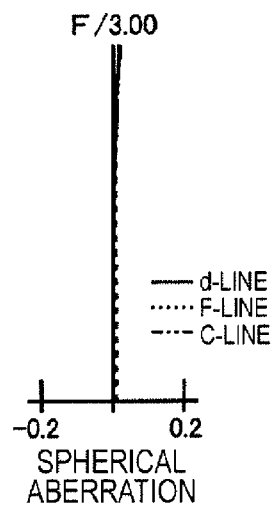
FIG.53B EXAMPLE 25
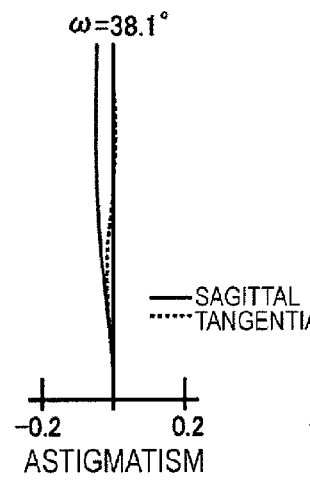
FIG.53C EXAMPLE 25
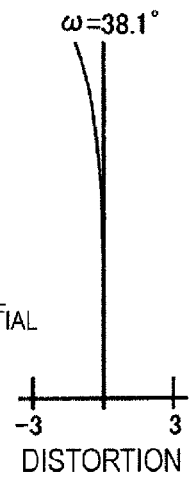
FIG.53D EXAMPLE 25
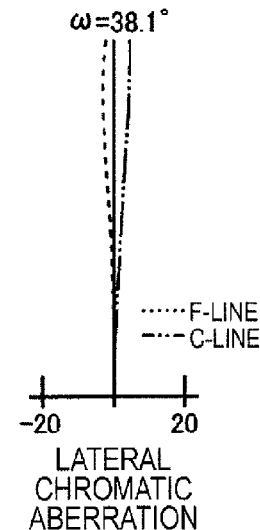
FIG.54A EXAMPLE 26
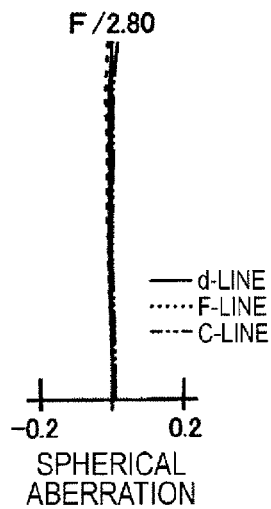
FIG.54B EXAMPLE 26
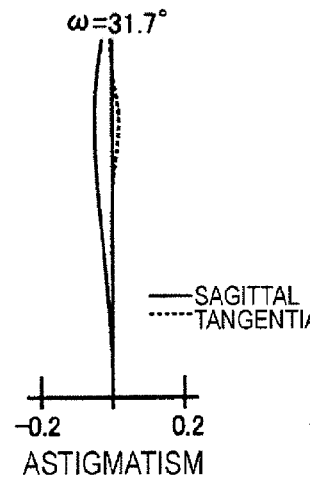
FIG.54C EXAMPLE 26
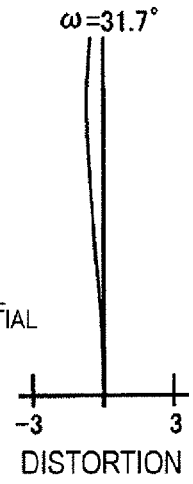
FIG.54D EXAMPLE 26
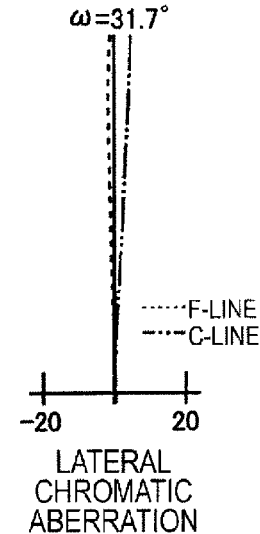

FIG.55A EXAMPLE 27
FIG.55B EXAMPLE 27
FIG.55C EXAMPLE 27
FIG.55D EXAMPLE 27
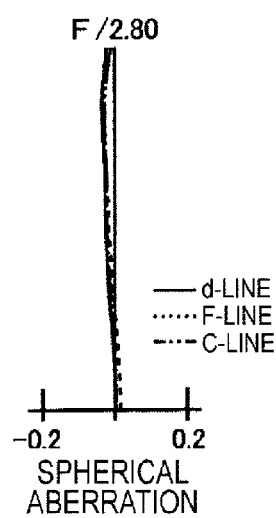
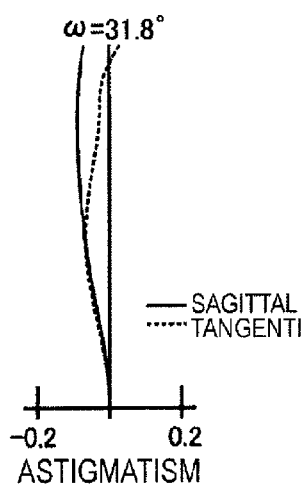
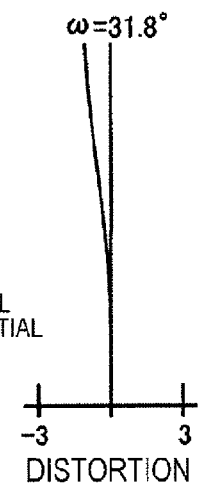
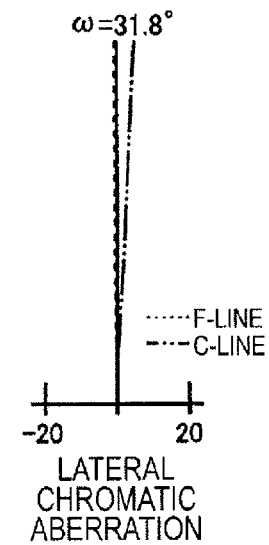
FIG.56A EXAMPLE 28
FIG.56B EXAMPLE 28
FIG.56C EXAMPLE 28
FIG.56D EXAMPLE 28
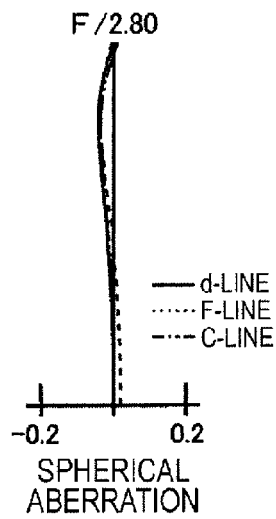
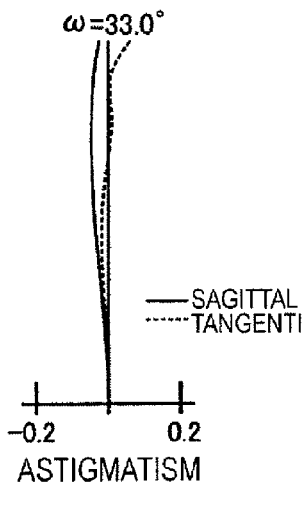
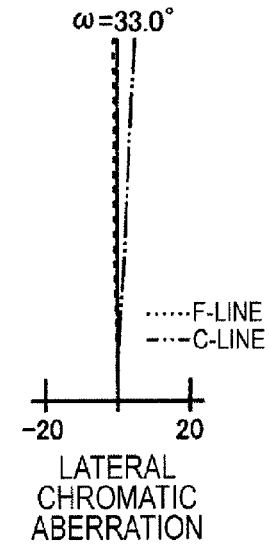

SMALL PROJECTION LENS AND PROJECTION DISPLAY DEVICE USING THE SAME

CROSS-REFERENCE TO RELATED APPLICATIONS

This application is based upon and claims the benefit of priority from the Japanese Patent Application No. 2008-223047 filed on Sep. 1, 2008 and Japanese Patent Application No. 2009-134591 filed on Jun. 4, 2009; the entire contents of which are incorporated herein by reference.

BACKGROUND OF THE INVENTION

1. Field of the Invention

The present invention relates to a small projection lens that enlarges and projects, for example, display information from a light valve, such as a transmissive or reflective liquid crystal display device or a DMD (digital micro-mirror device), and more particularly, to a small projection lens applicable for a so-called handy-type projection display device having high portability, and a projection display device using the same.

2. Description of the Related Art

Projection display devices using light valves, such as a liquid crystal display device or a DMD display device, have come into widespread use. As the size of the light valve is reduced, the precision thereof is improved, and personal computers are widely spread, the use of the projection display device for presentation is increased. Therefore, in recent years, there is a demand for, particularly, a small projection display device with high portability. In addition, it will be considered that a projection display device is treated with the same sense as treating a mobile phone or a flashlight in the near feature. Therefore, it is necessary to further improve portability.

In order to meet the requirements, particularly, it is effective to reduce the thickness of an apparatus in a direction vertical to the optical axis of a projection optical system, generally, in the thickness direction of a case of the apparatus. In order to reduce the size of the apparatus, it is important to reduce the outside diameters of all lenses in a projection lens.

For example, JP-B-3508011 and JP-A-2005-84456 disclose projection lenses that have a small size and are capable of improving the portability of an apparatus. In the projection lens, a reduction side is telecentric, and a certain amount of space to perform color composition or separate illumination light from projection light is ensured on the rear side of the lens.

However, the projection lens disclosed in JP-B-3508011 and JP-A-2005-84456 has a small angle of view of about 50 degrees, and it is difficult to project an image such that an image size is increased at a short distance.

As described above, in the projection lens disclosed in JP-B-3508011 and JP-A-2005-84456, the reduction side is telecentric and a certain amount of space is ensured on the rear side of the lens. However, JP-B-3508011 and JP-A-2005-84456 do not disclose any measures to prevent an increase in the size of a reduction-side lens and to actively reduce the size of the projection lens. In addition, JP-B-3508011 and JP-A-2005-84456 do not disclose any measures to actively reduce the sizes of the reduction-side lens and a magnification-side lens with respect to an effective light beam.

In order to improve the portability, it is effective to reduce the size of a light valve. However, JP-B-3508011 and JP-A-2005-84456 do not disclose this structure.

SUMMARY OF THE INVENTION

The invention has been made in order to solve the above-mentioned problems, and an object of the invention is to provide a small projection lens that is applicable for a projection display device having high portability, and has a high projection performance and a wide angle of view such that an image size is increased during short-distance projection, and a projection display device using the same.

According to an aspect of the invention, there is provided a small projection lens that projects image information displayed at a reduction-side conjugate position to a magnification-side conjugate position. A minimum portion of the length of all lens elements of the small projection lens in a diametric direction vertical to an optical axis is equal to or less than 15 mm, and the small projection lens satisfies Conditional expression 1 given below:

$$2.5 < \beta/S < 10.0 \quad \text{[Conditional expression 1]}$$

(where S indicates the maximum length of a magnification-side image (inch), and β indicates a magnifying power).

The small projection lens may have any one of the following six structures.

That is, according to a first structure, the small projection lens may satisfy Conditional expressions 2 and 3 given below:

$$2\omega > 60 \text{ degrees, and} \quad \text{[Conditional expression 2]}$$

$$FH < BH \quad \text{[Conditional expression 3]}$$

(where 2ω indicates an angle of view on a magnification side, FH indicates the maximum effective light beam height of a lens surface closest to the magnification side, and BH indicates the maximum effective light beam height of a lens surface closest to a reduction side).

According to a second structure, a lens arranged closest to the reduction side may have a non-circular shape including an effective light beam transmission area, and the small projection lens may satisfy Conditional expression 4 given below:

$$Bf/f > 0.8 \quad \text{[Conditional expression 4]}$$

(where Bf indicates a reduction-side back focal length and f indicates the focal length of the entire lens system).

According to a third structure, a lens arranged closest to the reduction side may have a non-circular shape including an effective light beam transmission area, and the small projection lens may satisfy Conditional expressions 2' and 4 given below:

$$2\omega > 35 \text{ degrees, and} \quad \text{[Conditional expression 2']}$$

$$Bf/f > 0.8 \quad \text{[Conditional expression 4]}$$

(where 2ω indicates an angle of view on a magnification side, Bf indicates a reduction-side back focal length, and f indicates the focal length of the entire lens system).

According to a fourth structure, the small projection lens may satisfy Conditional expressions 4 and 5 given below:

$$Bf/f > 0.8, \text{ and} \quad \text{[Conditional expression 4]}$$

$$IH > TH \quad \text{[Conditional expression 5]}$$

(where Bf indicates a reduction-side back focal length, f indicates the focal length of the entire lens system, IH indicates the maximum effective light beam height at a reduction-side conjugate position, and TH indicates the maximum effective light beam height of lenses other than a lens closest to the reduction side).

According to a fifth structure, the small projection lens may satisfy Conditional expression 6 given below:

20<S/OBJ<65  [Conditional expression 6]

(where S indicates the maximum length of a magnification-side image (inch), OBJ indicates a magnification-side projection distance (m), and β indicates a magnifying power).

According to a sixth structure, the small projection lens may satisfy Conditional expressions 6' and 7 given below:

35<S/OBJ<140, and  [Conditional expression 6']

3.0<S<10.0  [Conditional expression 7]

(where S indicates the maximum length of a magnification-side image (inch), and OBJ indicates a magnification-side projection distance (m)).

In the small projection lens, the reduction side may be telecentric.

Next, preferred aspects of the small projection lens will be described.

According to a first aspect, a small projection lens includes a first lens having a positive refractive power, a second lens that has a negative refractive power and includes a concave surface facing a magnification side, a third lens that has a positive refractive power and includes a convex surface facing a reduction side, and a fourth lens having a positive refractive power arranged in this order from the magnification side.

According to a second aspect, a small projection lens includes a first lens that has a negative refractive power and includes a concave surface facing a reduction side, a second lens that has a positive refractive power and includes a convex surface facing the reduction side, a third lens having a negative refractive power, a fourth lens that has a positive refractive power and includes a convex surface facing the reduction side, and a fifth lens having a positive refractive power arranged in this order from a magnification side.

According to a third aspect, a small projection lens includes a meniscus-shaped first lens having a convex surface facing a magnification side, a second lens having a positive refractive power, a third lens that has a negative refractive power and includes a concave surface facing the magnification side, a fourth lens that has a positive refractive power and includes a convex surface facing a reduction side, and a fifth lens having a positive refractive power arranged in this order from the magnification side.

According to a fourth aspect, a small projection lens includes a first lens that has a negative refractive power and includes a concave surface facing a reduction side, a second lens that has a positive refractive power and includes a convex surface facing the reduction side, a third lens that has a positive refractive power and includes a convex surface facing the reduction side, a fourth lens having a negative refractive power, a fifth lens that has a positive refractive power and includes a convex surface facing the reduction side, and a sixth lens that has a positive refractive power and includes a convex surface facing a magnification side arranged in this order from the magnification side.

According to a fifth aspect, a small projection lens includes a first lens that has a negative refractive power and includes a concave surface facing a reduction side, a second lens that has a negative refractive power and includes a concave surface facing the reduction side, a third lens that has a positive refractive power and includes a convex surface facing the reduction side, a fourth lens having a negative refractive power, a fifth lens that has a positive refractive power and includes a convex surface facing the reduction side, and a sixth lens having a positive refractive power arranged in this order from a magnification side.

According to a sixth aspect, a small projection lens includes a first lens that has a negative refractive power and includes a concave surface facing a reduction side, a second lens that has a negative refractive power and includes a concave surface facing the reduction side, a third lens having a positive refractive power, a fourth lens that has a positive refractive power and includes a convex surface facing the reduction side, a fifth lens having a negative refractive power, a sixth lens that has a positive refractive power and includes a convex surface facing the reduction side, and a seventh lens that has a positive refractive power and includes a convex surface facing a magnification side arranged in this order from the magnification side.

According to a seventh aspect, a small projection lens includes a first lens having a negative refractive power, a second lens having a positive refractive power, a third lens having a negative refractive power, a fourth lens having a positive refractive power, a fifth lens having a positive refractive power, a sixth lens having a negative refractive power, a seventh lens having a positive refractive power, and an eighth lens having a positive refractive power arranged in this order from a magnification side.

According to an eighth aspect, a small projection lens includes a first lens having a negative refractive power, a second lens having a negative refractive power, a third lens having a positive refractive power, a fourth lens having a negative refractive power, a fifth lens having a positive refractive power, a sixth lens having a negative refractive power, a seventh lens having a positive refractive power, and an eighth lens having a positive refractive power arranged in this order from a magnification side.

A first projection display device of the invention includes: a light source; a plurality of light valves; an illumination optical unit that guides light emitted from the light source to the light valves; and the small projection lens according to any one of the above-mentioned aspects. The light valves modulate the light emitted from the light source, the modulated light is composed, and the composed light is projected onto a screen by the small projection lens.

A second projection display device of the invention includes: a light source; a light valve; an illumination optical unit that guides light emitted from the light source to the light valve; and the small projection lens according to any one of the above-mentioned aspects. The light valve modulates the light emitted from the light source, and the modulated light is projected onto a screen by the small projection lens.

Any 'aperture' may be used as long as it can have a function of restricting the transmission of a light beam, and includes a variable aperture diaphragm.

The 'non-circular shape' means that the shape of each lens is not circular as viewed in the traveling direction of a light beam.

According to the small projection lens of the above-mentioned aspects of the invention, a minimum portion of the length of all lens elements of the small projection lens in a diametric direction vertical to the optical axis is equal to or less than 15 mm. Therefore, it is possible to reduce the size of a lens system. In addition, since the small projection lens satisfies Conditional expression 1, it is possible to improve illumination efficiency and the resolution of a screen while preventing an increase in the size of an apparatus.

The small projection lenses according to preferred aspects of the invention have the following effects.

That is, according to the first small projection lens, when Conditional expression 2 is satisfied, it is possible to define an angle of view on the magnification side to be greater than 60 degrees and increase an image size during short-distance projection. In addition, when Conditional expression 3 is satisfied, the maximum effective light beam height of a lens surface closest to the magnification side is less than that of a lens surface closest to the reduction side. Therefore, it is possible to prevent the diameter of a magnification-side lens from being excessively large as an angle of view is increased.

According to the second small projection lens, when Conditional expression 4 is satisfied, it is possible to ensure a reduction-side back focal length and thus it is easy to separate illumination light from projection light or compose color light components. When the back focal length is long, the diameter of a reduction-side lens becomes excessively large in order to ensure the telecentricity of the reduction side. Therefore, the lens arranged closest to the reduction side is formed in a non-circular shape such that a predetermined region other than a region required to transmit a light beam is cut. In this way, it is possible to prevent the diameter of the reduction-side lens from being excessively large.

According to the third small projection lens, when Conditional expression 2' is satisfied, a certain angle of view on the wide angle side is ensured. Therefore, it is possible to increase an image size to a certain degree even during short-distance projection. In addition, when Conditional expression 4 is satisfied, the reduction-side back focal length is ensured. Therefore, it is easy to separate illumination light from projection light or compose color light components. However, when Conditional expression 2' is satisfied, the diameter of the magnification-side lens becomes excessively large. When Conditional expression 4 is satisfied, the diameter of the reduction-side lens becomes excessively large in order to ensure the telecentricity of the reduction side.

Therefore, the lens arranged closest to the magnification side and the lens arranged closest to the reduction side are each formed in non-circular shapes including an effective light beam transmission area. In this way, it is possible to prevent the diameter of the lens arranged closest to the magnification side and the diameter of the lens arranged closest to the reduction side from being excessively large.

According to the fourth small projection lens, when Conditional expression 4 is satisfied, the reduction-side back focal length is ensured. Therefore, it is easy to separate illumination light from projection light or compose color light components. However, when Conditional expression 4 is satisfied, the diameter of the reduction-side lens becomes excessively large in order to ensure the telecentricity of the reduction side. Therefore, when Conditional expression 5 is satisfied, lenses other than the lens closest to the reduction side may be formed in circular shapes in a cross-sectional view, not a non-circular shape including an effective light beam transmission area. In this case, it is possible to effectively reduce manufacturing costs.

According to the fifth small projection lens, when Conditional expression 6 is satisfied, it is possible to appropriately set a projection screen size (maximum length) and a projection distance.

According to the sixth small projection lens, it is possible to prevent the brightness of a projection screen from being excessively low during short-distance projection, as compared to the fifth small projection lens. That is, when Conditional expression 7 is satisfied, it is possible to prevent the size of a light valve from being excessively small and the brightness of a projection screen from being excessively low.

Further, the projection display device according to the invention uses the small projection lens according to the invention. Therefore, it is possible to achieve a projection display device having high portability, a wide angle of view such that an image size is sufficiently large during short-distance projection, and a high projection performance.

BRIEF DESCRIPTION OF THE DRAWINGS

FIG. 28 is a diagram illustrating the structure of a small projection lens according to Example 28 of the invention;
FIGS. 29A to 29D are diagrams illustrating all aberrations of the small projection lens according to Example 1;
FIGS. 30A to 30D are diagrams illustrating all aberrations of the small projection lens according to Example 2;

FIGS. 31A to 31D are diagrams illustrating all aberrations of the small projection lens according to Example 3;
FIGS. 32A to 32D are diagrams illustrating all aberrations of the small projection lens according to Example 4;
FIGS. 33A to 33D are diagrams illustrating all aberrations of the small projection lens according to Example 5;
FIGS. 34A to 34D are diagrams illustrating all aberrations of the small projection lens according to Example 6;
FIGS. 35A to 35D are diagrams illustrating all aberrations of the small projection lens according to Example 7;
FIGS. 36A to 36D are diagrams illustrating all aberrations of the small projection lens according to Example 8;
FIGS. 39A to 39D are diagrams illustrating all aberrations of the small projection lens according to Example 11;
FIGS. 40A to 40D are diagrams illustrating all aberrations of the small projection lens according to Example 12;
FIGS. 41A to 41D are diagrams illustrating all aberrations of the small projection lens according to Example 13;
FIGS. 42A to 42D are diagrams illustrating all aberrations of the small projection lens according to Example 14;
FIGS. 47A to 47D are diagrams illustrating all aberrations of the small projection lens according to Example 19;
FIGS. 48A to 48D are diagrams illustrating all aberrations of the small projection lens according to Example 20;
FIGS. 53A to 53D are diagrams illustrating all aberrations of the small projection lens according to Example 25;
FIGS. 54A to 54D are diagrams illustrating all aberrations of the small projection lens according to Example 26;
FIGS. 55A to 55D are diagrams illustrating all aberrations of the small projection lens according to Example 27;
FIGS. 56A to 56D are diagrams illustrating all aberrations of the small projection lens according to Example 28.

DESCRIPTION OF THE PREFERRED EMBODIMENTS

Figure 1:
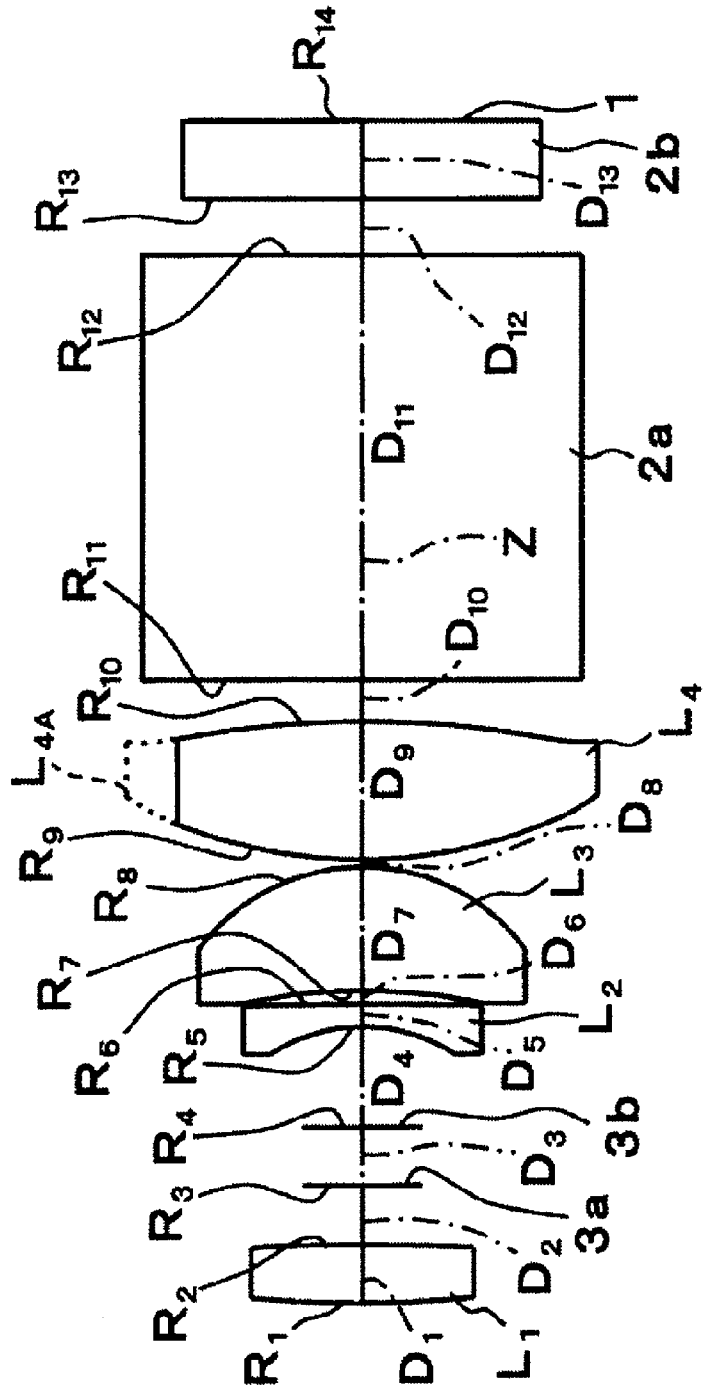
FIG. 1 is a diagram illustrating the structure of a small projection lens according to Example 1 of the invention.

Hereinafter, exemplary embodiments of the invention will be described with reference to the accompanying drawings. FIG. 1 is a diagram illustrating the structure of a small projection lens according to an embodiment of the invention, and shows a lens structure according to Example 1, which will be described below. In FIG. 1, Z indicates an optical axis.

The small projection lens according to this embodiment projects image information displayed at a reduction-side conjugate position to a magnification-side conjugate position. A minimum portion of the length of all lens elements of the small projection lens in a diametric direction vertical to the optical axis is equal to or less than 15 mm. The projection lens satisfies Conditional expression 1 given below:

$$2.5 < \beta/S < 10.0 \quad \text{[Conditional expression 1]}$$

(where S indicates the maximum length of a magnification-side image (inch), and $\beta$ indicates a magnifying power).

The 'maximum length' means the longest distance of the magnification-side image, and generally means a diagonal length.

That is, Conditional expression 1 means that a panel size is in the range of 0.1 inch to 0.4 inch when all aberrations are not considered.

If the ratio is beyond the range of Conditional expression 1, it is difficult to improve illumination efficiency and the resolution of a screen while preventing an increase in the size of a device.

The value of the 'minimum portion of the length of the lens in the diametric direction' is preferably 'equal to or less than 12 mm' and more preferably, 'equal to or less than 10 mm', instead of 'equal to or less than 15 mm'.

In addition, it is preferable that the small projection lens according to this embodiment have any one of the following six structures.

That is, in a first preferred structure, a small projection lens that projects image information displayed at a reduction-side conjugate position to a magnification-side conjugate position satisfies Conditional expressions 2 and 3 given below:

$$2\omega > 60 \text{ degrees, and} \quad \text{[Conditional expression 2]}$$

$$FH < BH \quad \text{[Conditional expression 3]}$$

(where $2\omega$ indicates an angle of view on a magnification side, FH indicates the maximum effective light beam height of a lens surface closest to the magnification side, and BH indicates the maximum effective light beam height of a lens surface closest to a reduction side).

If the angle of view on the magnification side is equal to or less than the lower limit of Conditional expression 2, it is difficult to sufficiently increase an image size during short-distance projection.

If Conditional expression 3 is not satisfied, it is difficult to prevent the diameter of a magnification-side lens from being excessively large as an angle of view is increased.

In a second preferred structure, in a small projection lens that projects image information displayed at a reduction-side conjugate position to a magnification-side conjugate position, a lens arranged closest to a reduction side has a non-circular shape including an effective light beam transmission area, and the small projection lens satisfies Conditional expression 4 given below:

$$Bf/f > 0.8 \quad \text{[Conditional expression 4]}$$

(where Bf indicates a reduction-side back focal length and f indicates the focal length of the entire lens system).

If the ratio is equal to or less than the lower limit of Conditional expression 4, the reduction-side back focal length is not ensured, and it is difficult to separate illumination light from projection light or compose color light components.

When the telecentricity of the reduction side is ensured, the back focal length is increased, which causes the diameter of the reduction-side lens to be excessively large. Therefore, in order to prevent the diameter of the reduction-side lens from being excessively large, a lens arranged closest to the reduction side is formed in a non-circular shape including the effective light beam transmission area to remove an unnecessary lens portion (a so-called D-cut is performed).

In a third preferred structure, in a small projection lens that projects image information displayed at a reduction-side conjugate position to a magnification-side conjugate position, a lens arranged closest to a reduction side has a non-circular shape including an effective light beam transmission area, and the small projection lens satisfies Conditional expressions 2' and 4 given below:

$2\omega > 35$ degrees, and  [Conditional expression 2']

$Bf/f > 0.8$  [Conditional expression 4]

(where $2\omega$ indicates an angle of view on a magnification side, Bf indicates a reduction-side back focal length, and f indicates the focal length of the entire lens system).

If the angle of view on the magnification side is equal to or less than the lower limit of Conditional expression 2', an angle of view on a wide angle side is not ensured. Therefore, it is difficult to sufficiently increase an image size during short-distance projection. If the ratio is equal to or less than the lower limit of Conditional expression 4, the reduction-side back focal length is not ensured, and it is difficult to separate illumination light from projection light or compose color light components.

In a fourth preferred structure, a small projection lens that projects image information displayed at a reduction-side conjugate position to a magnification-side conjugate position satisfies Conditional expressions 4 and 5 given below:

$Bf/f > 0.8$, and  [Conditional expression 4]

$IH > TH$  [Conditional expression 5]

(where Bf indicates a reduction-side back focal length, f indicates the focal length of the entire lens system, IH indicates the maximum effective light beam height at the reduction-side conjugate position, and TH indicates the maximum effective light beam height of lenses other than a lens closest to the reduction side).

If the ratio is equal to or less than the lower limit of Conditional expression 4, an angle of view on a wide angle side is not ensured. Therefore, it is difficult to sufficiently increase an image size during short-distance projection. If Conditional expression 5 is not satisfied, the reduction-side back focal length is not ensured, and it is difficult to separate illumination light from projection light or compose color light components.

In a fifth preferred structure, a small projection lens that projects image information displayed at a reduction-side conjugate position to a magnification-side conjugate position satisfies Conditional expression 6 given below:

$20 < S/OBJ < 65$  [Conditional expression 6]

(where S indicates the maximum length of a magnification-side image (inch) and OBJ indicates a magnification-side projection distance (m)).

The 'maximum length' means the longest distance of the magnification-side image, and generally means a diagonal length.

If the ratio is beyond the range of Conditional expression 6, it is difficult to appropriately set a projection screen size and a projection distance.

In a sixth preferred structure, a small projection lens that projects image information displayed at a reduction-side conjugate position to a magnification-side conjugate position satisfies Conditional expressions 6' and 7 given below:

$35 < S/OBJ < 140$, and  [Conditional expression 6']

$3.0 < S < 10.0$  [Conditional expression 7]

(where S indicates the maximum length of a magnification-side image (inch), and OBJ indicates a magnification-side projection distance (m)).

The sixth small projection lens is preferably provided in, for example, a portable projection imaging apparatus having a very small size.

From the viewpoint of defining the above-mentioned Conditional expression 6, it is preferable that the small projection lens satisfy the following Conditional expression 6" instead of Conditional expression 6:

$30 < S/OBJ < 65$.  [Conditional expression 6"]

According to the sixth small projection lens, it is possible to obtain the same effect and operation as those by Conditional expression 6 of the fifth small projection lens and the same effect and operation as those by Conditional expression 7. If Conditional expression 7 is not satisfied, it is difficult to obtain an appropriate light valve size. That is, it is difficult to obtain a light valve that is not excessively small and a projection image that is not excessively dark.

Each of the above-mentioned small projection lenses includes four to eight lenses (in FIG. 1, four lenses $L_1$ to $L_4$).

In addition, an aperture (or an aperture diaphragm) is arranged in the lens system.

In the small projection lens shown in FIG. 1, a light beam that is incident from the right side of FIG. 1 and is given image information from an image display surface 1 of a light valve is incident on the small projection lens through a glass block 2a, and various filters, such as a low pass filter or an infrared cut filter, or a cover glass 2b of the light valve. Then, the incident light beam is enlarged and projected to the left side of FIG. 1 by the small projection lens. FIG. 1 shows only one image display surface 1. However, in a projection display device, a color separation optical system separates a light beam emitted from a light source into three primary color light beams, and light valves are provided for the three primary color light beams to display a full color image. In addition, it is preferable that the reduction side be telecentric.

Specifically, for example, a color composition unit (glass block), such as a cross dichroic prism, a prism for DMD for separating illumination light from projection light, or a PBS for LCOS may be provided at the position of the glass block 2a.

It is preferable that the small projection lens according to this embodiment have at least one aspheric surface. In this way, it is possible to reduce the number of lenses and improve resolution.

In the small projection lens according to this embodiment (particularly, a lens system including five or more lenses), the second and third lenses from the reduction side are bonded to each other. In this way, it is possible to effectively reduce chromatic aberration, particularly, lateral chromatic aberration.

In the small projection lens according to this embodiment, as in the following examples, a conditional expression related to the Abbe number of a predetermined lens is set. In this way, it is possible to effectively reduce chromatic aberration.

Next, aspects of a detailed lens structure according to the embodiment of the invention will be described below.

First, for example, as shown in FIGS. 1 to 6, a first aspect includes a first lens $L_1$ having a positive refractive power, a second lens $L_2$ that has a negative refractive power and includes a concave surface facing a magnification side, a third lens $L_3$ that has a positive refractive power and includes a convex surface facing a reduction side, and a fourth lens $L_4$ having a positive refractive power arranged in this order from the magnification side.

In this case, an aperture that restricts the transmission of a light beam may be provided between the first lens $L_1$ and the second lens $L_2$.

The fourth lens $L_4$ may have an aspheric surface.

The first aspect may satisfy Conditional expressions 8 and 9 given below:

$$\nu_{d12}<45, \text{ and} \qquad \text{[Conditional expression 8]}$$

$$\nu_{d34}>40 \qquad \text{[Conditional expression 9]}$$

(where $\nu_{d12}$ indicates the Abbe number of each of the first lens $L_1$ and the second lens $L_2$ and $\nu_{d34}$ indicates the Abbe number of each of the third lens $L_3$ and the fourth lens $L_4$).

Next, for example, as shown in FIGS. 7 to 10, a second aspect includes a first lens $L_1$ that has a negative refractive power and includes a concave surface facing a reduction side, a second lens $L_2$ that has a positive refractive power and includes a convex surface facing the reduction side, a third lens $L_3$ having a negative refractive power, a fourth lens $L_4$ that has a positive refractive power and includes a convex surface facing the reduction side, and a fifth lens $L_5$ having a positive refractive power arranged in this order from a magnification side.

In this case, an aperture that restricts the transmission of a light beam may be provided between the second lens $L_2$ and the third lens $L_3$.

The first lens $L_1$ may have an aspheric surface.

The fifth lens $L_5$ may have an aspheric surface.

The third lens $L_3$ and the fourth lens $L_4$ may be bonded to each other.

The second aspect may satisfy Conditional expression 10 given below:

$$\nu_{d4}-\nu_{d3}>35 \qquad \text{[Conditional expression 10]}$$

(where $\nu_{d4}$ indicates the Abbe number of the fourth lens $L_4$ and $\nu_{d3}$ indicates the Abbe number of the third lens $L_3$).

Figure 11:
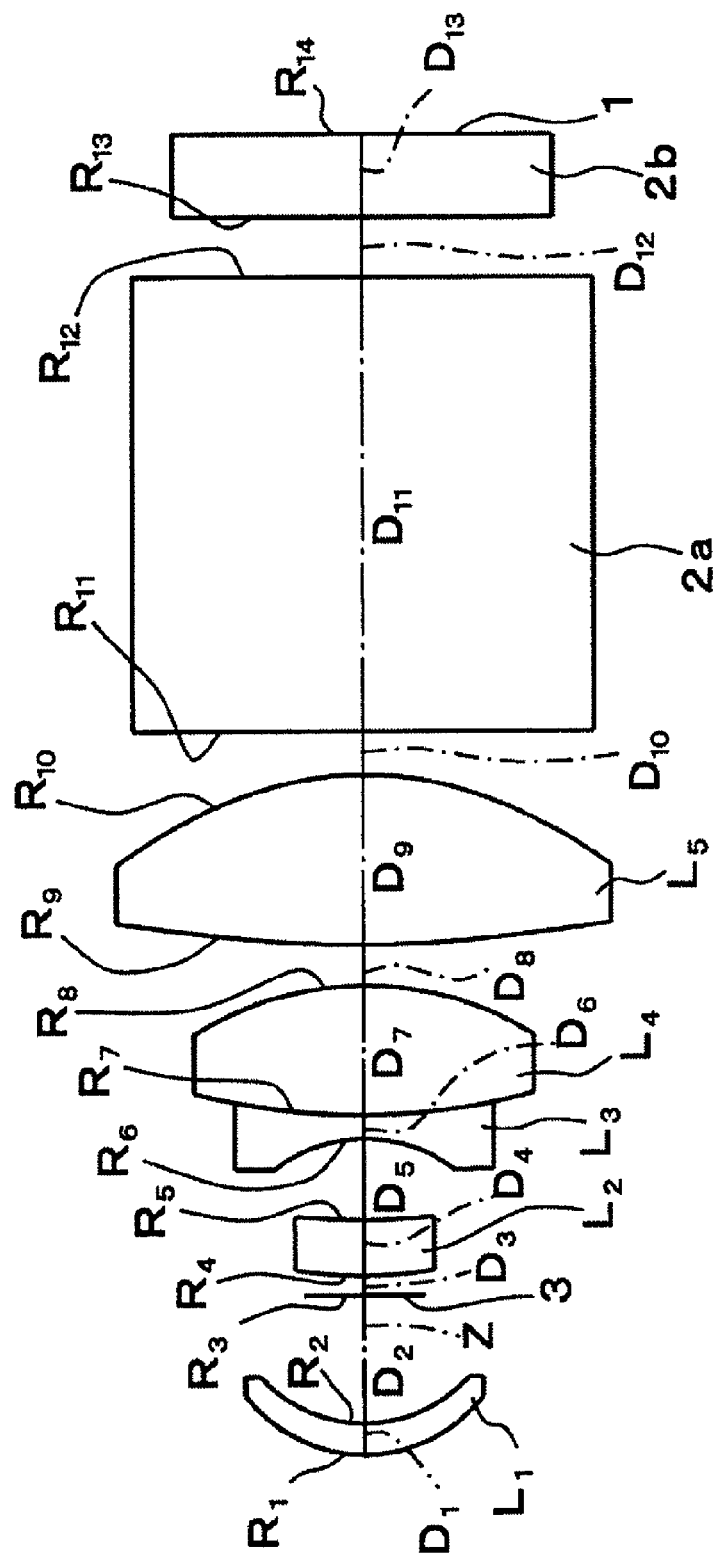
FIG. 11 is a diagram illustrating the structure of a small projection lens according to Example 11 of the invention.
Figure 12:
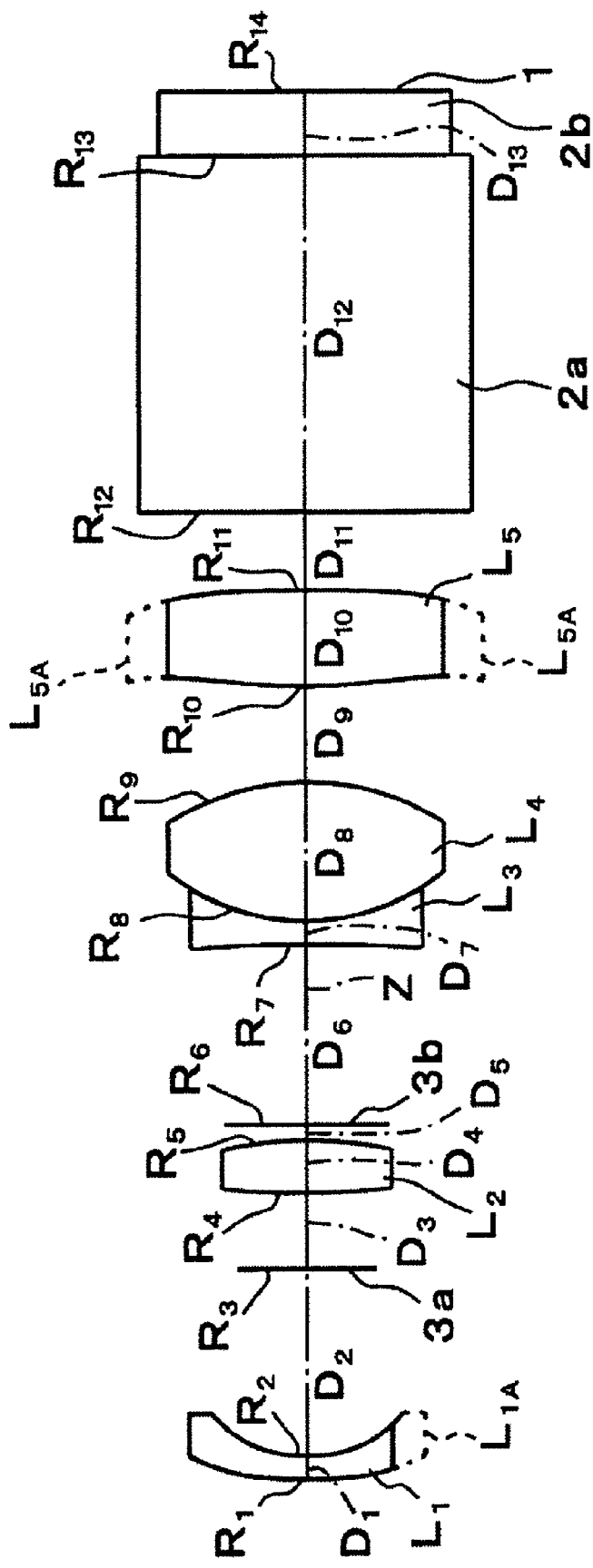
FIG. 12 is a diagram illustrating the structure of a small projection lens according to Example 12 of the invention.

Next, for example, as shown in FIGS. 11 and 12, a third aspect includes a meniscus-shaped first lens $L_1$ that has a positive refractive power and includes a convex surface facing a magnification side, a second lens $L_2$ having a positive refractive power, a third lens $L_3$ that has a negative refractive power and includes a concave surface facing the magnification side, a fourth lens $L_4$ that has a positive refractive power and includes a convex surface facing a reduction side, and a fifth lens $L_5$ having a positive refractive power arranged in this order from the magnification side.

In this case, an aperture that restricts the transmission of a light beam may be provided between the first lens $L_1$ and the second lens $L_2$.

The first lens $L_1$ may have an aspheric surface.

The fifth lens $L_5$ may have an aspheric surface.

The third lens $L_3$ and the fourth lens $L_4$ may be bonded to each other.

The third aspect may satisfy Conditional expression 10 given below:

$$\nu_{d4}-\nu_{d3}>35 \qquad \text{[Conditional expression 10]}$$

(where $\nu_{d4}$ indicates the Abbe number of the fourth lens $L_4$ and $\nu_{d3}$ indicates the Abbe number of the third lens $L_3$).

Figure 13:
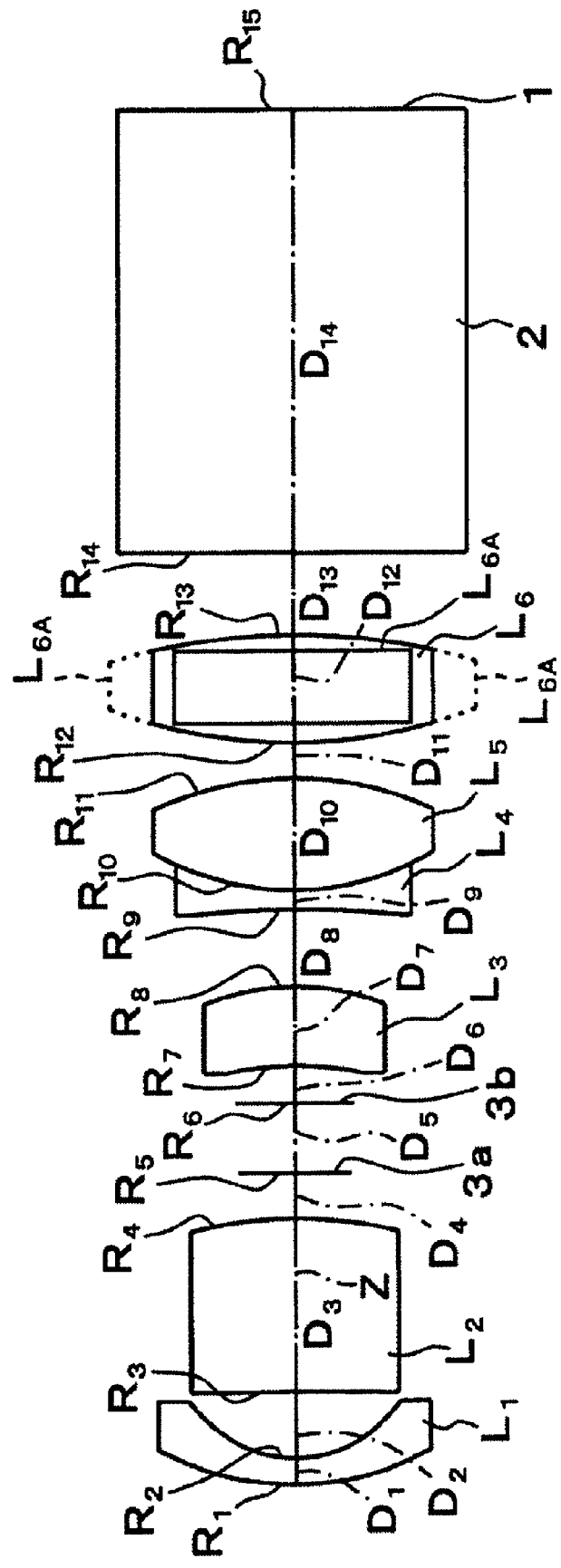
FIG. 13 is a diagram illustrating the structure of a small projection lens according to Example 13 of the invention.
Figure 14:
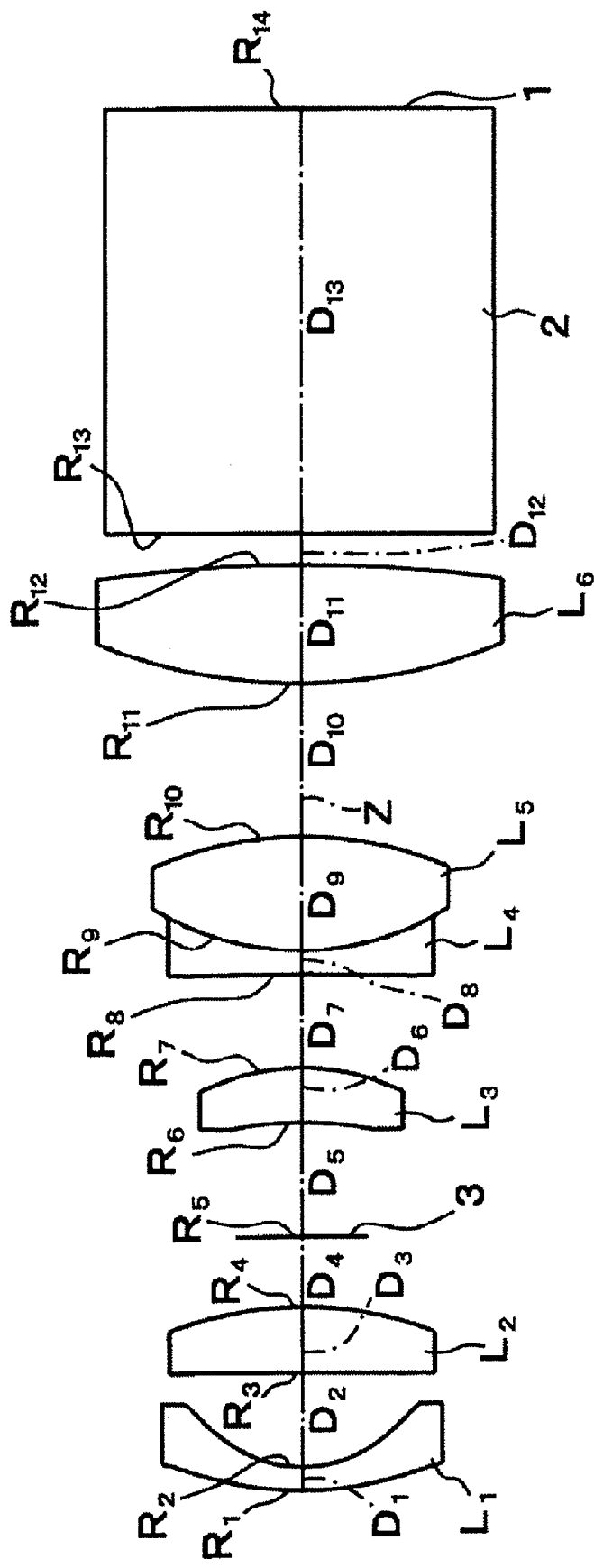
FIG. 14 is a diagram illustrating the structure of a small projection lens according to Example 14 of the invention.
Figure 15:
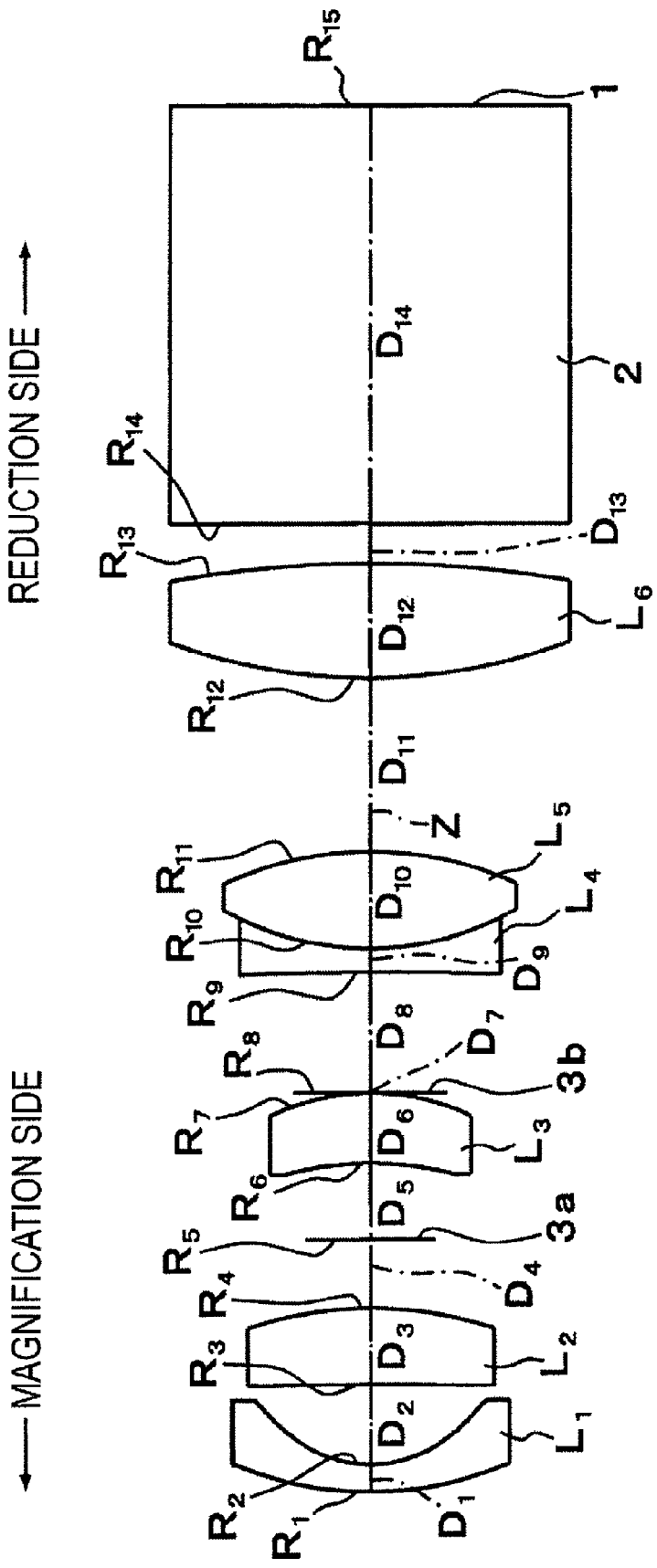
FIG. 15 is a diagram illustrating the structure of a small projection lens according to Example 15 of the invention.

Next, for example, as shown in FIGS. 13 to 15, a fourth aspect includes a first lens $L_1$ that has a negative refractive power and includes a concave surface facing a reduction side, a second lens $L_2$ that has a positive refractive power and includes a convex surface facing the reduction side, a third lens $L_3$ that has a positive refractive power and includes a convex surface facing the reduction side, a fourth lens $L_4$ having a negative refractive power, a fifth lens $L_5$ that has a positive refractive power and includes a convex surface facing the reduction side, and a sixth lens $L_6$ that has a positive refractive power and includes a convex surface facing the magnification side arranged in this order from a magnification side.

In this case, an aperture that restricts the transmission of a light beam may be provided between the second lens $L_2$ and the third lens $L_3$.

The first lens $L_1$ may have an aspheric surface.

The fourth lens $L_4$ and the fifth lens $L_5$ may be bonded to each other.

Figure 16:
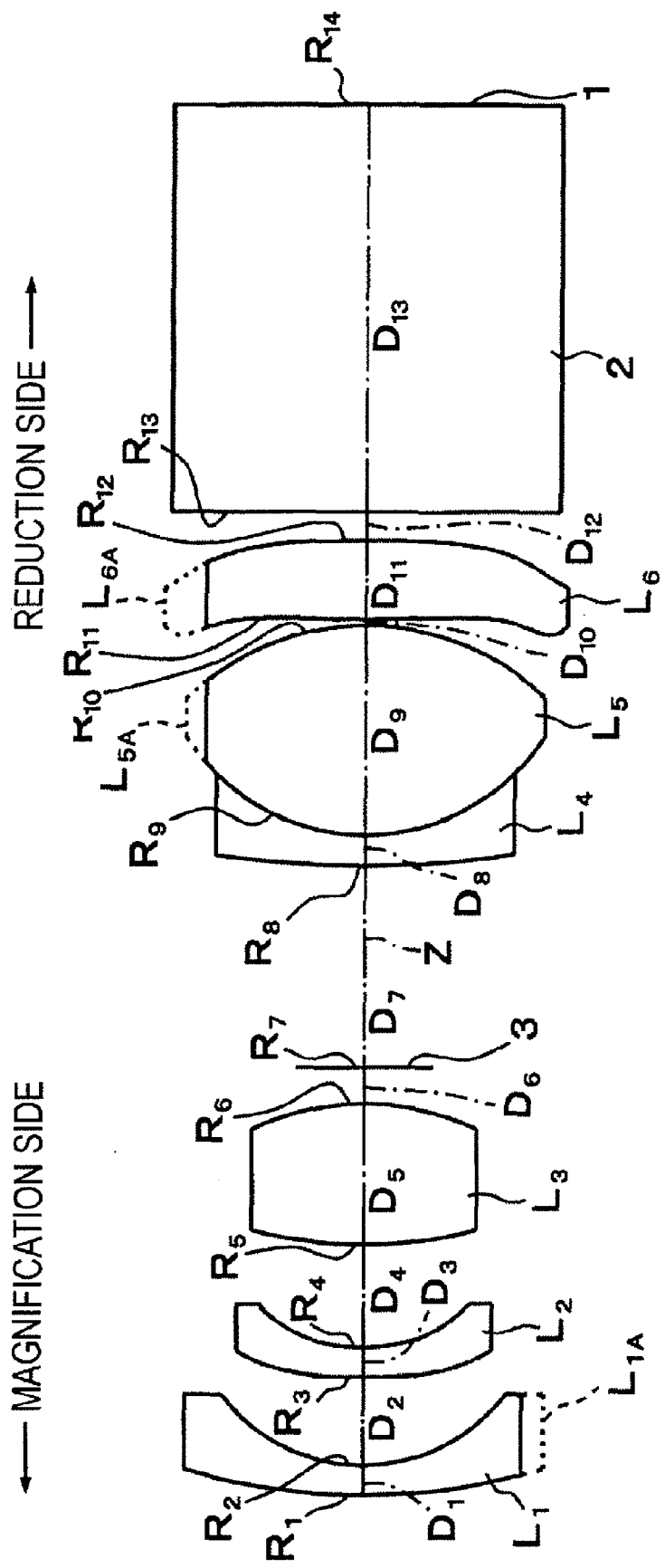
FIG. 16 is a diagram illustrating the structure of a small projection lens according to Example 16 of the invention.
Figure 17:
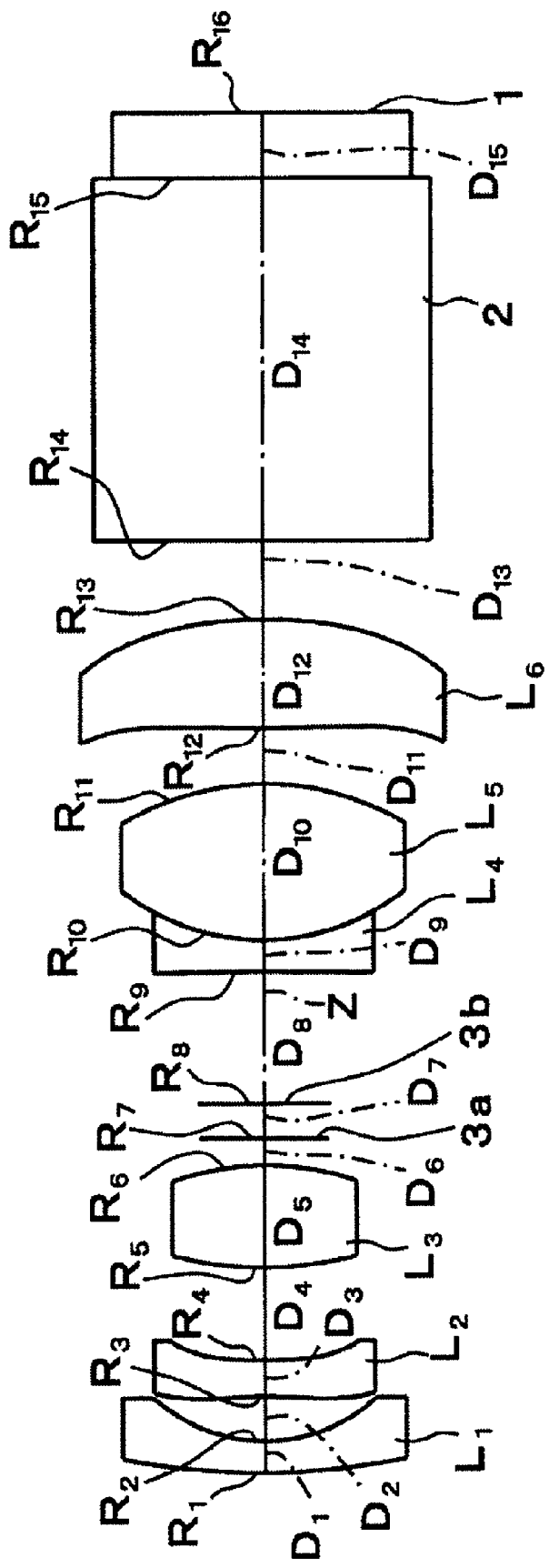
FIG. 17 is a diagram illustrating the structure of a small projection lens according to Example 17 of the invention.
Figure 18:
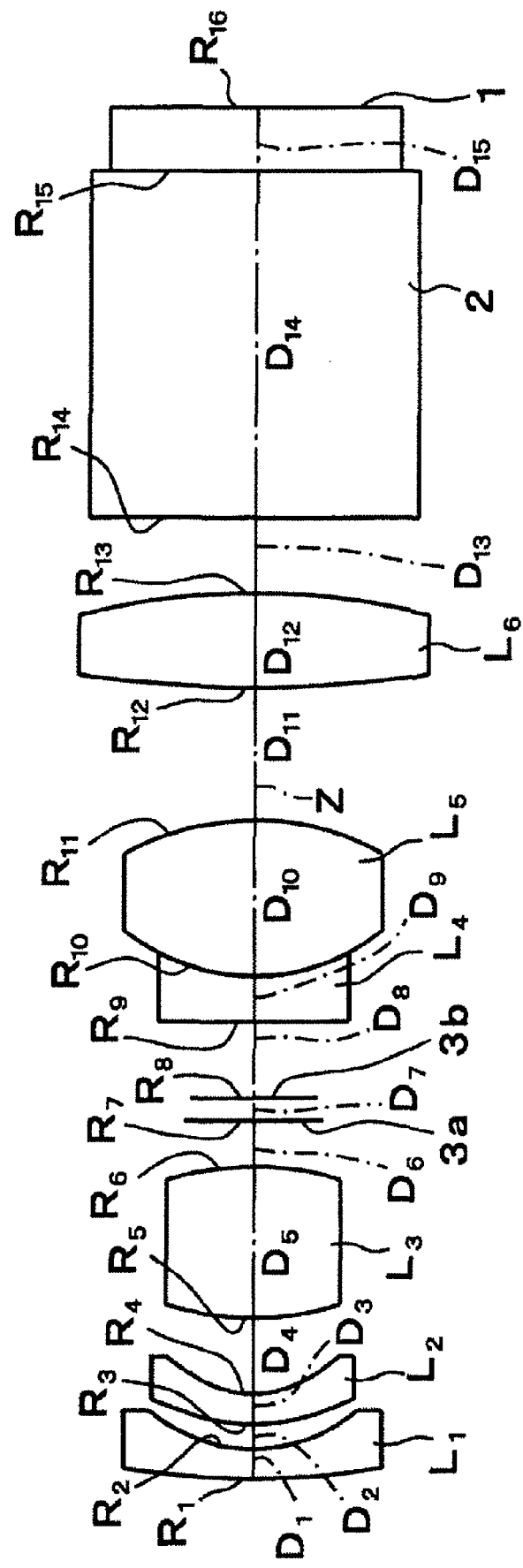
FIG. 18 is a diagram illustrating the structure of a small projection lens according to Example 18 of the invention.

Next, for example, as shown in FIGS. 16 to 18, a fifth aspect includes a first lens $L_1$ that has a negative refractive power and includes a concave surface facing a reduction side, a second lens $L_2$ that has a negative refractive power and includes a concave surface facing the reduction side, a third lens $L_3$ that has a positive refractive power and includes a convex surface facing the reduction side, a fourth lens $L_4$ having a negative refractive power, a fifth lens $L_5$ that has a positive refractive power and includes a convex surface facing the reduction side, and a sixth lens $L_6$ having a positive refractive power arranged in this order from a magnification side.

In this case, an aperture that restricts the transmission of a light beam may be provided between the third lens $L_3$ and the fourth lens $L_4$.

The second lens $L_2$ may have an aspheric surface.

The sixth lens $L_6$ may have an aspheric surface.

The fourth lens $L_4$ and the fifth lens $L_5$ may be bonded to each other.

The fourth and fifth aspects may satisfy Conditional expression 11 give below:

$$\nu_{d5}-\nu_{d4}>35 \qquad \text{[Conditional expression 11]}$$

(where $\nu_{d5}$ indicates the Abbe number of the fifth lens $L_5$ and $\nu_{d4}$ indicates the Abbe number of the fourth lens $L_4$).

Figure 19:
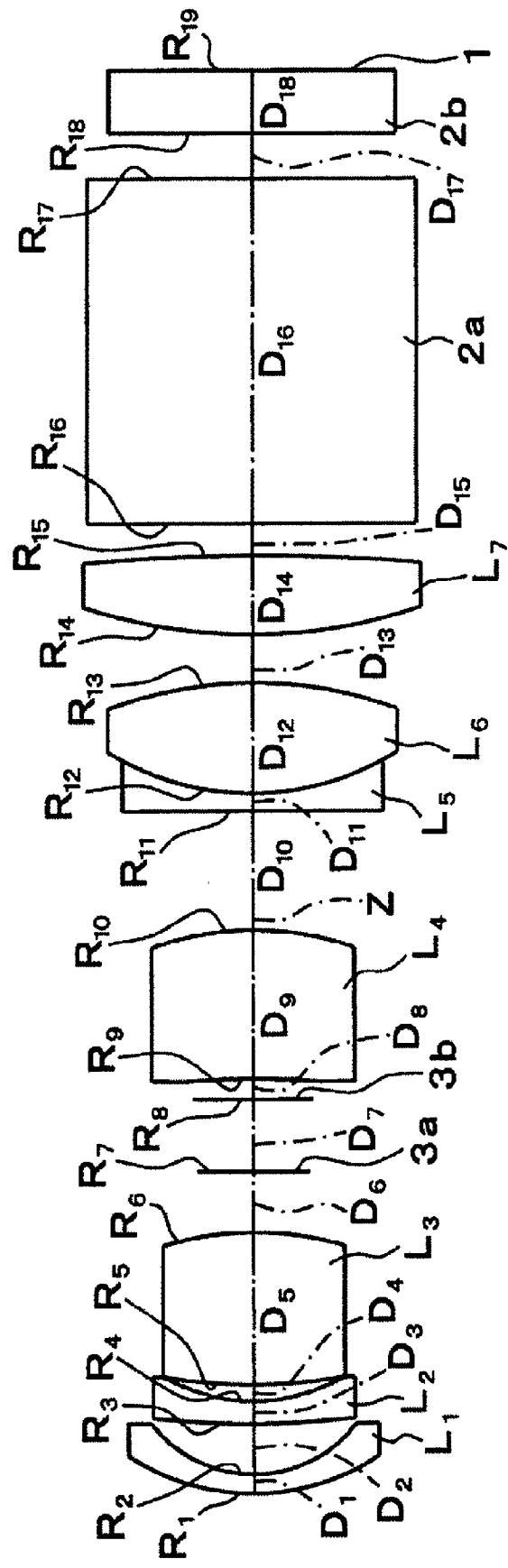
FIG. 19 is a diagram illustrating the structure of a small projection lens according to Example 19 of the invention.
Figure 20:
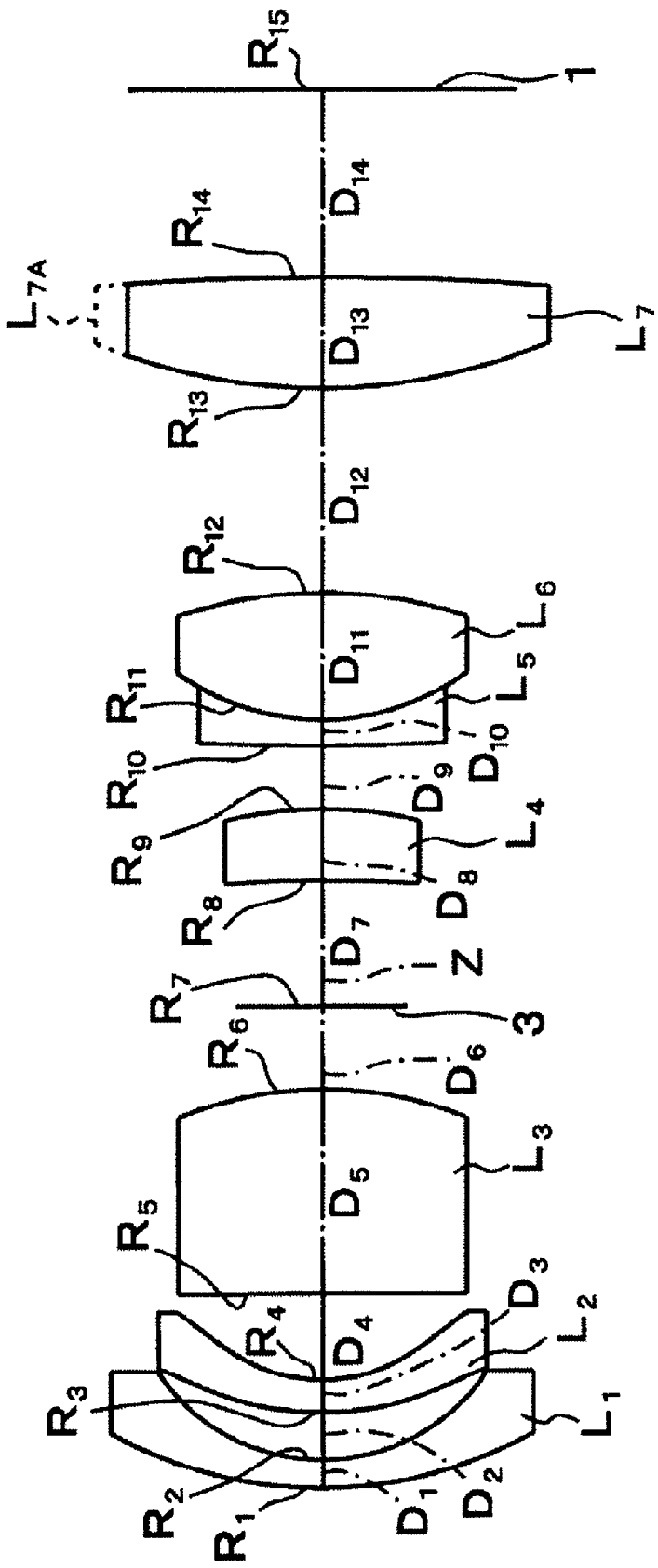
FIG. 20 is a diagram illustrating the structure of a small projection lens according to Example 20 of the invention.
Figure 21:
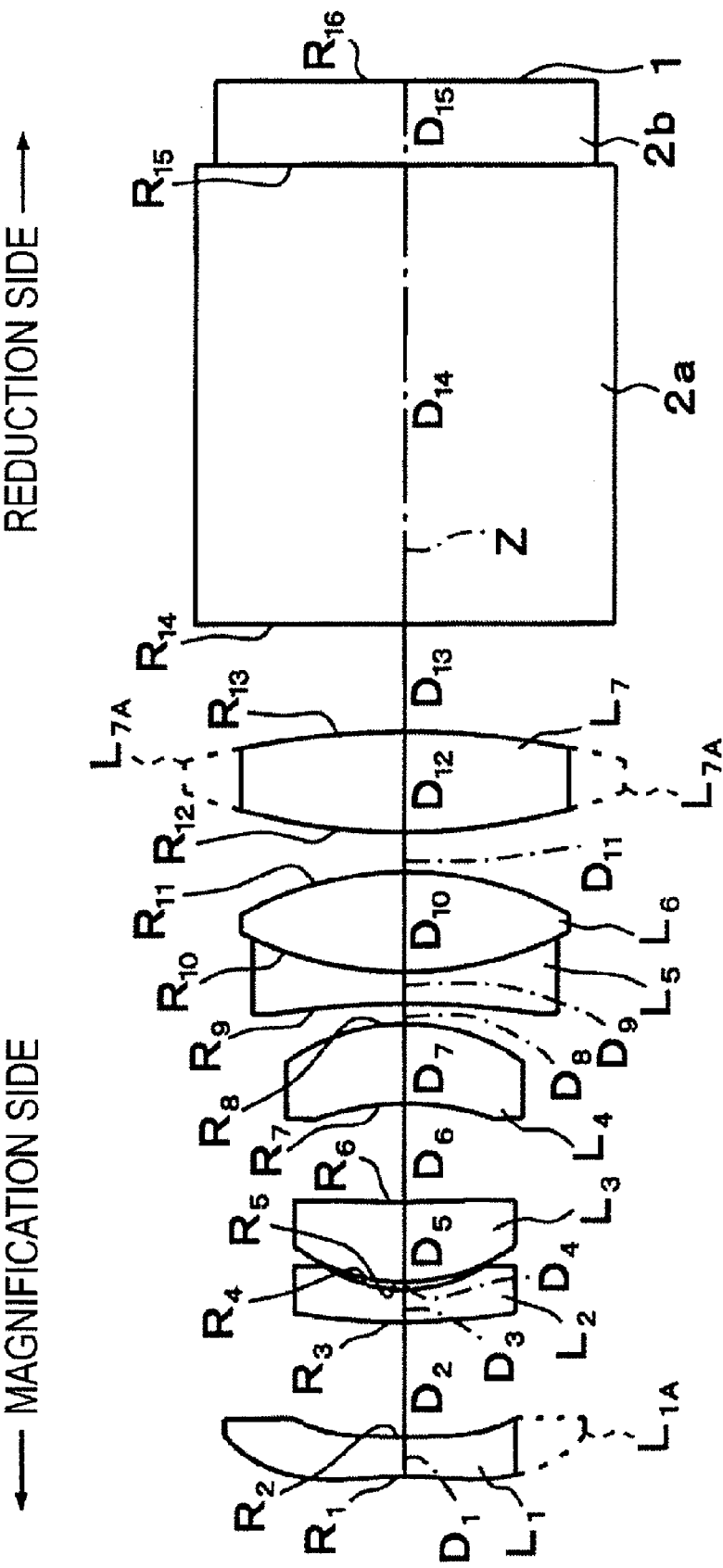
FIG. 21 is a diagram illustrating the structure of a small projection lens according to Example 21 of the invention.

Next, for example, as shown in FIGS. 19 to 21, a sixth aspect includes a first lens $L_1$ that has a negative refractive power and includes a concave surface facing a reduction side, a second lens $L_2$ that has a negative refractive power and includes a concave surface facing the reduction side, a third lens $L_3$ having a positive refractive power, a fourth lens $L_4$ that has a positive refractive power and includes a convex surface facing the reduction side, a fifth lens $L_5$ having a negative refractive power, a sixth lens $L_6$ that has a positive refractive power and includes a convex surface facing the reduction side, and a seventh lens $L_7$ that has a positive refractive power and includes a convex surface facing a magnification side. The first to seventh lenses are arranged in this order from the magnification side.

In this case, an aperture that restricts the transmission of a light beam may be provided between the third lens $L_3$ and the fourth lens $L_4$.

The second lens $L_2$ may have an aspheric surface.

The fifth lens $L_5$ and the sixth lens $L_6$ may be bonded to each other.

Figure 22:
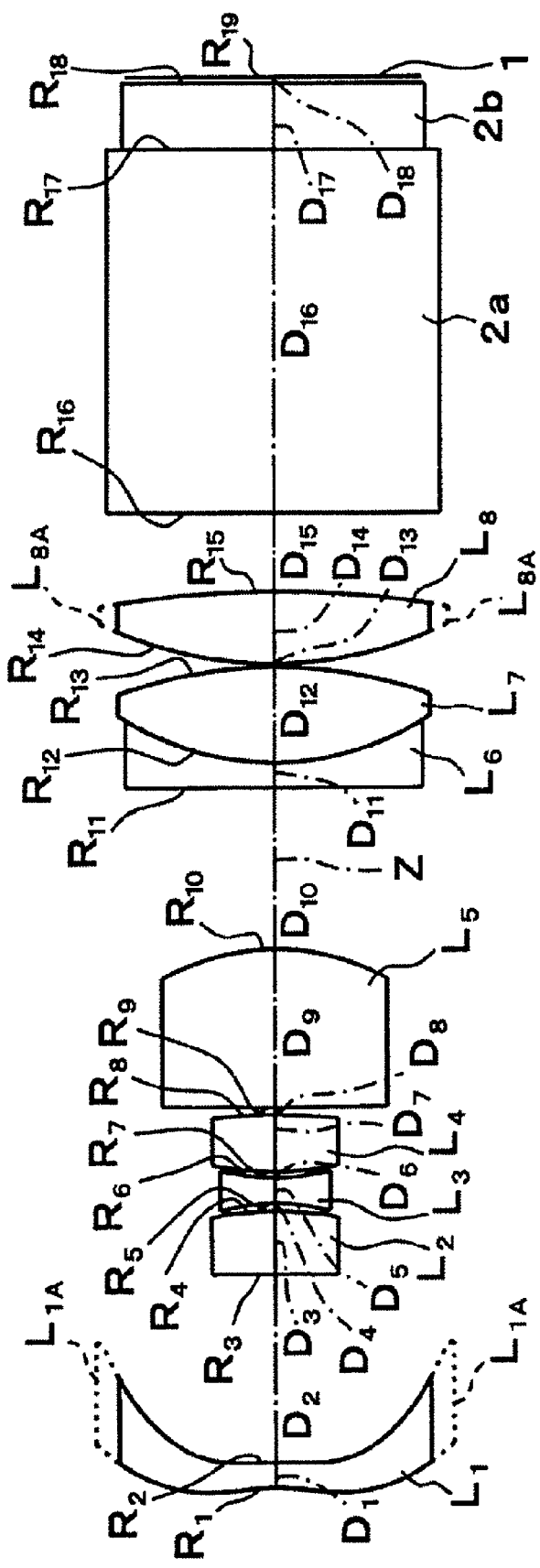
FIG. 22 is a diagram illustrating the structure of a small projection lens according to Example 22 of the invention.
Figure 23:
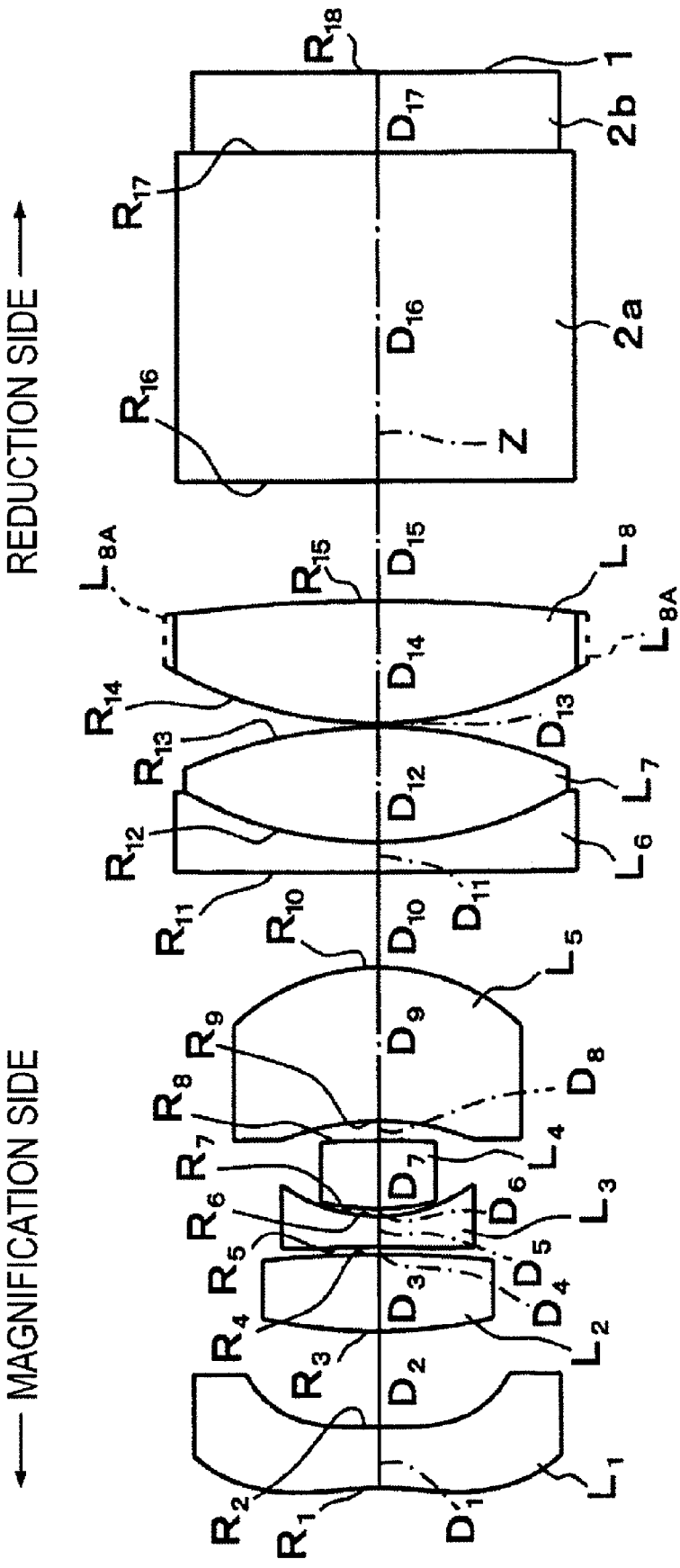
FIG. 23 is a diagram illustrating the structure of a small projection lens according to Example 23 of the invention.
Figure 24:
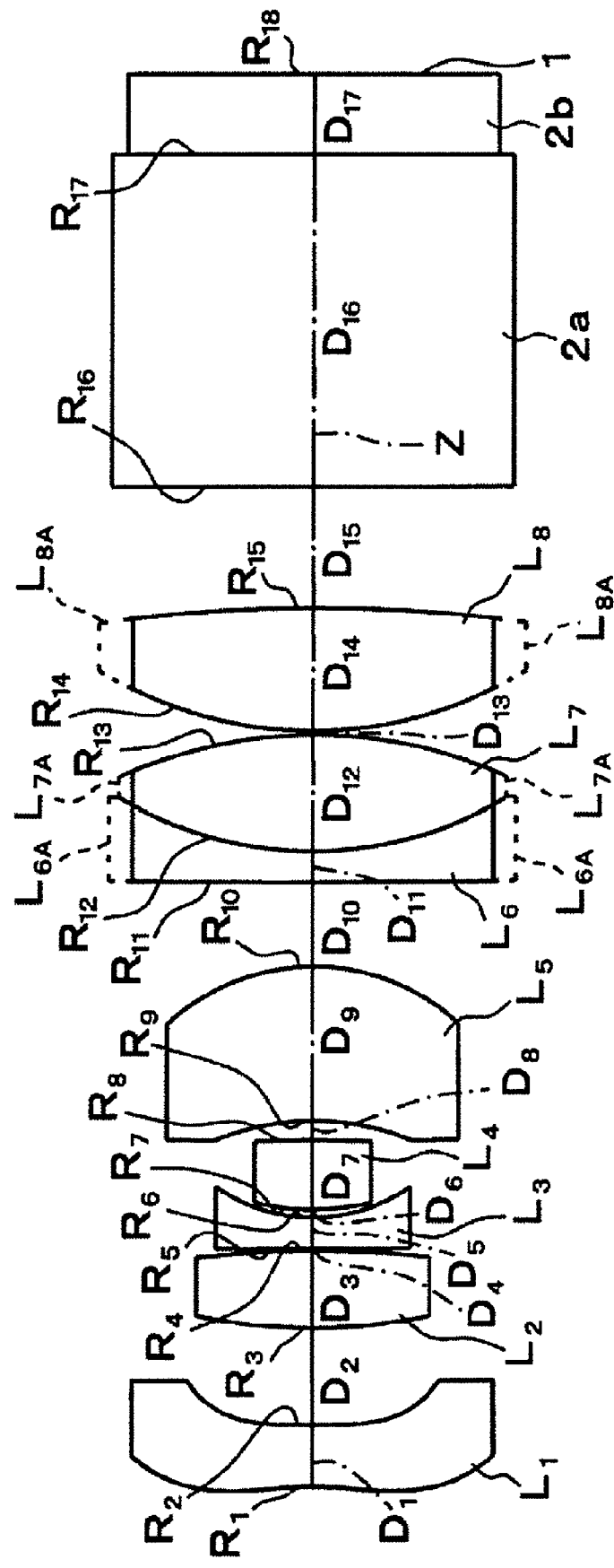
FIG. 24 is a diagram illustrating the structure of a small projection lens according to Example 24 of the invention.

Next, for example, as shown in FIGS. 22 to 24, a seventh aspect includes a first lens $L_1$ having a negative refractive power, a second lens $L_2$ having a positive refractive power, a third lens $L_3$ having a negative refractive power, a fourth lens $L_4$ having a positive refractive power, a fifth lens $L_5$ having a positive refractive power, a sixth lens $L_6$ having a negative refractive power, a seventh lens $L_7$ having a positive refractive power, and an eighth lens $L_8$ having a positive refractive power arranged in this order from a magnification side.

In this case, the first lens $L_1$ may be an aspheric lens made of plastic.

An aperture that restricts the transmission of a light beam may be provided between the second lens $L_2$ and the fifth lens $L_5$.

The sixth lens $L_6$ and the seventh lens $L_7$ may be bonded to each other.

Next, for example, as shown in FIGS. 25 to 28, an eighth aspect includes a first lens $L_1$ having a negative refractive power, a second lens $L_2$ having a negative refractive power, a third lens $L_3$ having a positive refractive power, a fourth lens $L_4$ having a negative refractive power, a fifth lens $L_5$ having a positive refractive power, a sixth lens $L_6$ having a negative refractive power, a seventh lens $L_7$ having a positive refractive power, and an eighth lens $L_8$ having a positive refractive power arranged in this order from a magnification side.

In this case, the second lens $L_2$ may be an aspheric lens made of plastic.

An aperture that restricts the transmission of a light beam may be provided between the third lens $L_3$ and the fourth lens $L_4$.

The sixth lens $L_6$ and the seventh lens $L_7$ may be bonded to each other.

Figure 57:
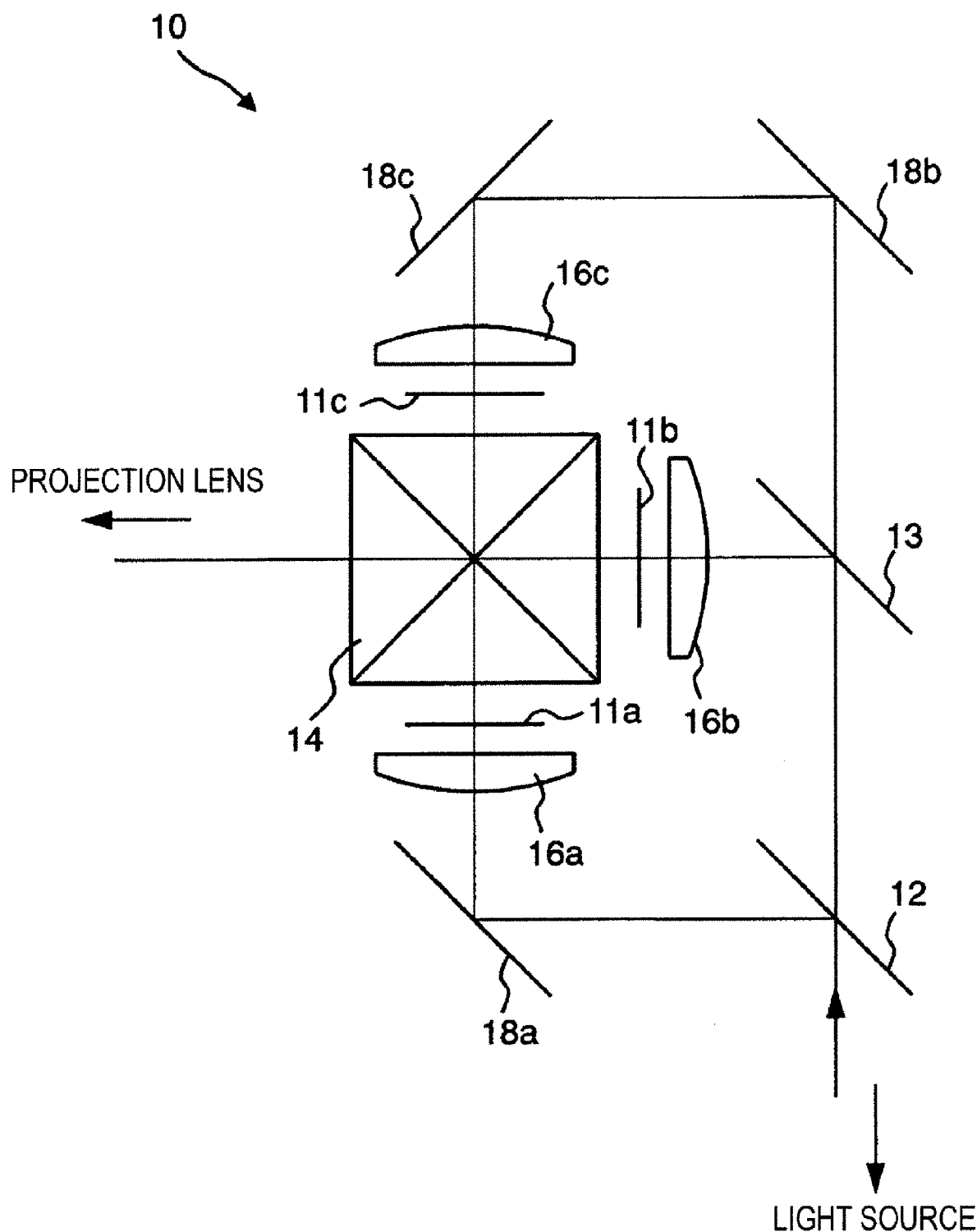
FIG. 57 is a diagram schematically illustrating the structure of a main part of a projection display device according to an embodiment of the invention.
Figure 58A:
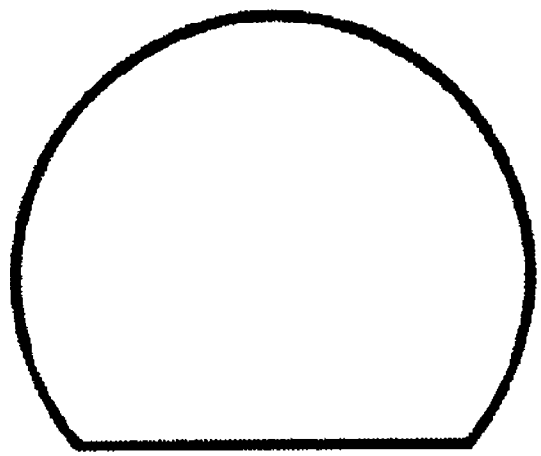
FIGS. 58A to 58C are diagrams schematically illustrating detailed examples of non-circular lenses as viewed in the traveling direction of a light beam.
Figure 58B:
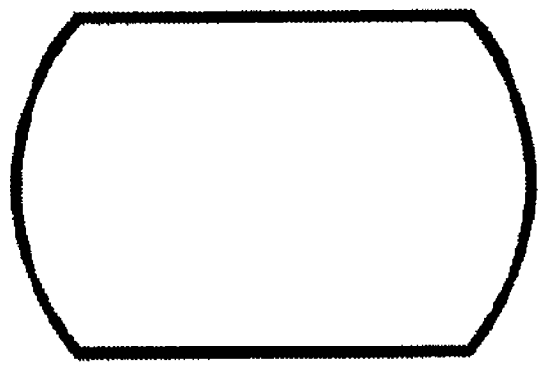
Figure 58C:

Next, a projection display device according to an embodiment of the invention will be described. FIG. 57 is a diagram illustrating an example of the structure of a main part (illumination optical system 10) of the projection display device according to the embodiment of the invention.

As shown in FIG. 57, the illumination optical system 10 includes transmissive liquid crystal panels 11a to 11c, serving as light valves, dichroic mirrors 12 and 13 for color separation, a cross dichroic prism 14 for color composition, condenser lenses 16a to 16c, and total reflecting mirrors 18a to 18c. The previous stage of the dichroic mirror 12 is not shown in FIG. 57. White light emitted from the light source is incident on the liquid crystal panels 11a to 11c corresponding to three color light beams (G light, B light, and R light) through the illumination optical unit and then modulated. Then, the modulated light beams are projected onto a screen by the small projection lens.

Since the projection display device uses the small projection lens according the embodiment of the invention, it is possible to effectively correct all aberrations and obtain a large high-resolution screen with compact size.

In order to further reduce the size of the projection display device, a single light valve may be provided, RGB color images may be sequentially displayed on the light valve, and a light source including RGB color LEDs may emit corresponding color light in synchronization with the display of the color images. In this way, it is possible to omit, for example, the dichroic mirrors 12 and 13 for color separation, the cross dichroic prism 14 for color composition, and the total reflecting mirrors 18a to 18c.

EXAMPLES

Next, detailed examples of the small projection lens according to the embodiment of the invention will be described. In the following examples, members having the same operation and effect are denoted by the same reference numerals.

First Aspect

Example 1

As shown in FIG. 1, a projection lens according to Example 1 includes a first lens $L_1$, which is a biconvex lens, an aperture 3a, an aperture diaphragm (or an aperture) 3b, a second lens $L_2$, which is a negative meniscus lens having a concave surface facing a magnification side, a third lens $L_3$, which is a positive meniscus lens having a convex surface facing a reduction side, and a fourth lens $L_4$, which is a biconvex lens having aspheric surfaces at both surfaces on the optical axis Z. The first to fourth lenses are arranged in this order from the magnification side.

The fourth lens $L_4$ arranged closest to the reduction side is formed in a non-circular shape including an effective light beam transmission area to remove an unnecessary lens portion (a portion disposed at an upper part of FIG. 1) $L_{4A}$ (a so-called D-cut is performed), in order to prevent the outside diameter of a reduction-side lens from being excessively large.

The aspheric shapes of both surfaces of the fourth lens $L_4$ are defined by an aspheric expression given below:

$$Z = \frac{Y^2/R}{1+\sqrt{1-K \times Y^2/R^2}} + \sum_{i=3}^{20} A_i Y^i \quad \text{[Expression 1]}$$

(where Z indicates the length of a perpendicular line that drops from a point on an aspheric surface at a distance Y from the optical axis to a tangent plane to the top of the aspheric surface (a plane vertical to the optical axis), Y indicates a distance from the optical axis, R indicates the curvature radius of an aspheric surface near the optical axis, K indicates eccentricity, and $A_i$ indicates an aspheric coefficient (i=3 to 20)).

In addition, FIG. 1 shows the image display surface 1 of the light valve, the glass block 2a, and the cover glass 2b of the light valve.

In Table 1, an upper part shows the curvature radius R of each lens surface in the projection lens according to Example 1, the thickness of the center of each lens, an air space (hereinafter, referred to as an on-axis surface spacing) D between the lenses, the refractive index $N_d$ of each lens with respect to the d-line, and the Abbe number $v_d$ thereof. In Table 1 and the following tables, a surface number is sequentially increased from the magnification side, and a surface with the surface number having symbol '*' added to the right side thereof is an aspheric surface. In addition, in Table 1, a lower part shows an aspheric coefficient indicating each aspheric surface.

In Example 1 and the following Examples 2 to 28, each table shows the curvature radius R of each of the aspheric surfaces on the optical axis Z. However, in the corresponding diagrams illustrating the lens structures, for easy viewing of the drawings, a line is not necessarily drawn from an intersection point with the optical axis Z.

TABLE 1

| Surface Number | R | D | Nd | νd |
|---|---|---|---|---|
| OBJ | ∞ | 600.000 | | |
| 1 | 35.292 | 1.587 | 1.8467 | 23.8 |
| 2 | −57.959 | 1.600 | | |
| 3 (mask) | ∞ | 1.573 | | |
| 4 (mask) | ∞ | 2.710 | | |
| 5 | −4.598 | 0.600 | 1.8467 | 23.8 |
| 6 | −176.127 | 0.369 | | |
| 7 | −15.853 | 3.356 | 1.7292 | 54.7 |
| 8 | −5.538 | 0.200 | | |
| 9* | 12.719 | 3.735 | 1.7292 | 54.7 |
| 10* | −27.956 | 1.120 | | |
| 11 | ∞ | 11.500 | 1.9037 | 31.3 |
| 12 | ∞ | 1.500 | | |
| 13 | ∞ | 2.100 | 1.5163 | 64.1 |
| 14 | ∞ | | | |

| | K | $A_3$ | $A_4$ | $A_5$ | $A_6$ |
|---|---|---|---|---|---|
| 9 | 1.0000 | 0.0000E+00 | −1.0511E−04 | 0.0000E+00 | −2.0677E−06 |
| 10 | 1.0000 | 0.0000E+00 | 2.4747E−06 | 0.0000E+00 | −2.0036E−06 |

| | $A_7$ | $A_8$ | $A_9$ | $A_{10}$ | $A_{11}$ | $A_{12}$ |
|---|---|---|---|---|---|---|
| 9 | 0.0000E+00 | 8.9228E−08 | 0.0000E+00 | 6.6687E−10 | 0.0000E+00 | 0.0000E+00 |
| 10 | 0.0000E+00 | 8.4753E−10 | 0.0000E+00 | 3.0023E−09 | 0.0000E+00 | 0.0000E+00 |

*aspheric surface

As shown in Table 29, the projection lens according to Example 1 satisfies Conditional expressions 1, 3 to 6, 8, 9, 2', and 6".

In Example 1, the focal length f of the entire lens system is 10.6, the F number Fno. is 3.01, and the total angle of view 2ω is 48.2 degrees.

Example 2

Figure 2:
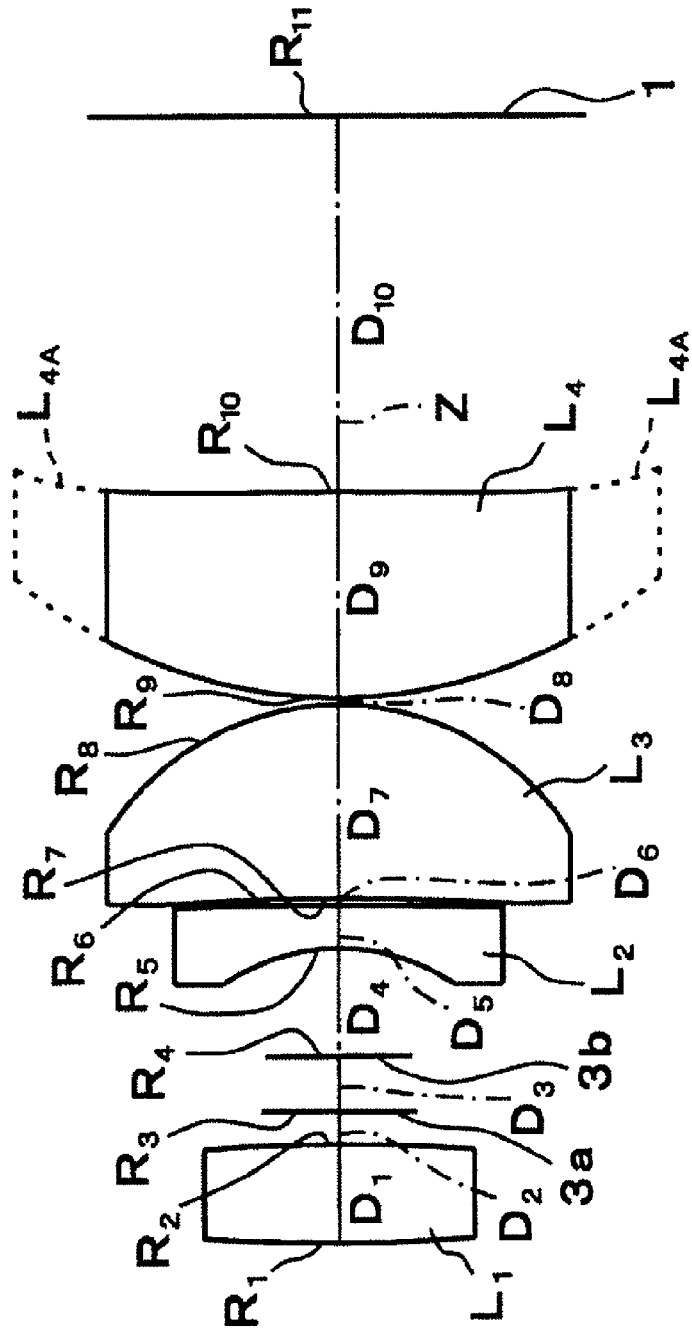
FIG. 2 is a diagram illustrating the structure of a small projection lens according to Example 2 of the invention.

The structure of a projection lens according to Example 2 is shown in FIG. 2, and the structure of the projection lens according to Example 2 is substantially similar to that according to Example 1. However, the projection lens is configured so as to correspond to one light valve. Therefore, the glass block 2a for color composition shown in Example 1 is not provided between the fourth lens $L_4$ and the image display surface 1 of the light valve. In addition, the illustration of the cover glass 2b of the light valve is also omitted.

The fourth lens $L_4$ arranged closest to the reduction side is formed in a non-circular shape including an effective light beam transmission area to remove an unnecessary lens portion (a portion disposed in the vertical direction of FIG. 2) $L_{4A}$ (a so-called D-cut is performed), in order to prevent the diameter of a reduction-side lens from being excessively large.

The aspheric shapes of both surfaces of the fourth lens $L_4$ are defined by the above-mentioned aspheric expression.

In Table 2, an upper part shows the curvature radius R of each lens surface in the projection lens according to Example 2, the on-axis surface spacing D between the lenses, the refractive index $N_d$ of each lens with respect to the d-line, and the Abbe number $ν_d$ thereof. In addition, in Table 2, a lower part shows an aspheric coefficient indicating each aspheric surface.

TABLE 2

| Surface Number | R | D | Nd | νd |
|---|---|---|---|---|
| OBJ | ∞ | 160.000 | | |
| 1 | 27.052 | 1.398 | 1.9037 | 31.3 |
| 2 | −25.369 | 0.450 | | |
| 3 (mask) | ∞ | 0.786 | | |
| 4 (mask) | ∞ | 1.524 | | |
| 5 | −2.912 | 0.600 | 1.8467 | 23.8 |
| 6 | −106.271 | 0.099 | | |
| 7 | −40.124 | 2.745 | 1.7292 | 54.7 |
| 8 | −3.869 | 0.100 | | |
| 9* | 7.115 | 2.896 | 1.7292 | 54.7 |
| 10* | −51.845 | 5.286 | | |
| 11 | ∞ | | | |

| | K | $A_3$ | $A_4$ | $A_5$ | $A_6$ |
|---|---|---|---|---|---|
| 9 | 1.0000 | 0.0000E+00 | 4.5316E−04 | 0.0000E+00 | −4.1082E−05 |
| 10 | 1.0000 | 0.0000E+00 | 1.8052E−03 | 0.0000E+00 | −7.7546E−05 |

TABLE 2-continued

|   | $A_7$ | $A_8$ | $A_9$ | $A_{10}$ | $A_{11}$ |
|---|---|---|---|---|---|
| 9 | 0.0000E+00 | 7.8541E−07 | 0.0000E+00 | 2.1112E−08 | 0.0000E+00 |
| 10 | 0.0000E+00 | 9.3483E−07 | 0.0000E+00 | 7.3722E−08 | 0.0000E+00 |

|   | $A_{12}$ | $A_{13}$ | $A_{14}$ | $A_{15}$ | $A_{16}$ |
|---|---|---|---|---|---|
| 9 | 0.0000E+00 | 0.0000E+00 | 0.0000E+00 | 0.0000E+00 | 0.0000E+00 |
| 10 | 0.0000E+00 | 0.0000E+00 | 0.0000E+00 | 0.0000E+00 | 0.0000E+00 |

*aspheric surface

As shown in Table 29, the projection lens according to Example 2 satisfies Conditional expressions 1 to 9, 2', 6', and 6".

In Example 2, the focal length f of the entire lens system is 5.9, the F number Fno. is 2.51, and the total angle of view $2\omega$ is 61.8 degrees.

Example 3

Figure 3:
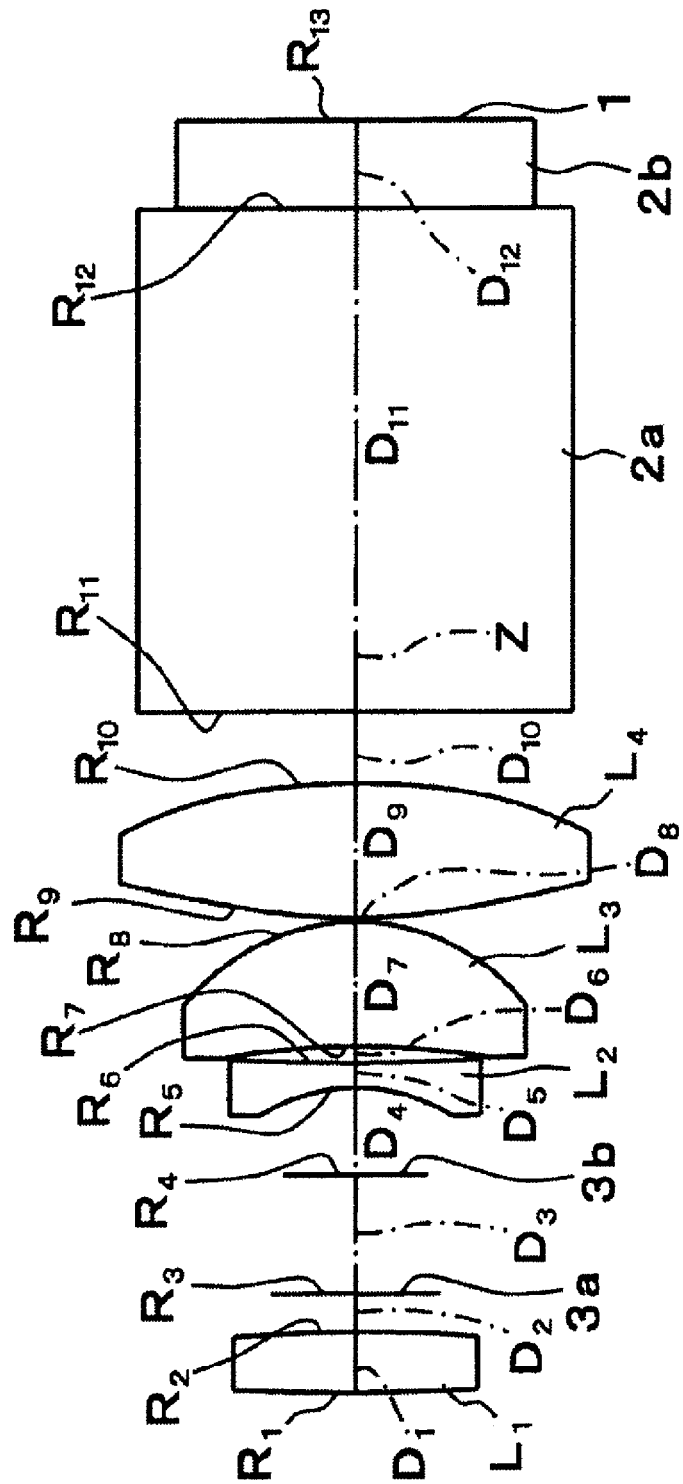
FIG. 3 is a diagram illustrating the structure of a small projection lens according to Example 3 of the invention.

The structure of a projection lens according to Example 3 is shown in FIG. 3, and is substantially similar to that according to Example 1 except that the second lens $L_2$ is biconcave lens.

The so-called D-cut according to Example 1 is not performed in Example 3.

The aspheric shapes of both surfaces of the fourth lens $L_4$ are defined by the above-mentioned aspheric expression.

In Table 3, an upper part shows the curvature radius R of each lens surface in the projection lens according to Example 3, the on-axis surface spacing D between the lenses, the refractive index $N_d$ of each lens with respect to the d-line, and the Abbe number $v_d$ thereof. In addition, in Table 3, a lower part shows an aspheric coefficient indicating each aspheric surface.

TABLE 3

| Surface Number | R | D | Nd | vd |
|---|---|---|---|---|
| OBJ | ∞ | 700.000 | | |
| 1 | 55.056 | 1.460 | 1.8467 | 23.8 |
| 2 | −35.362 | 0.900 | | |
| 3 (mask) | ∞ | 2.820 | | |
| 4 (mask) | ∞ | 2.090 | | |
| 5 | −4.332 | 0.600 | 1.8467 | 23.8 |
| 6 | 68.788 | 0.390 | | |
| 7 | −19.133 | 2.970 | 1.7725 | 49.6 |
| 8 | −5.213 | 0.100 | | |
| 9* | 14.091 | 3.210 | 1.6935 | 53.2 |
| 10* | −18.318 | 1.710 | | |
| 11 | ∞ | 12.000 | 1.7725 | 49.6 |
| 12 | ∞ | 2.100 | 1.5163 | 64.1 |
| 13 | ∞ | | | |

|   | K | $A_3$ | $A_4$ | $A_5$ | $A_6$ |
|---|---|---|---|---|---|
| 9 | 1.0000 | 0.0000E+00 | −1.5704E−04 | 0.0000E+00 | −2.0310E−05 |
| 10 | 1.0000 | 0.0000E+00 | −8.9793E−05 | 0.0000E+00 | −2.0432E−05 |

|   | $A_7$ | $A_8$ | $A_9$ | $A_{10}$ | $A_{11}$ |
|---|---|---|---|---|---|
| 9 | 0.0000E+00 | 6.7153E−07 | 0.0000E+00 | −6.0498E−09 | 0.0000E+00 |
| 10 | 0.0000E+00 | 5.4839E−07 | 0.0000E+00 | −4.3011E−09 | 0.0000E+00 |

|   | $A_{12}$ | $A_{13}$ | $A_{14}$ | $A_{15}$ | $A_{16}$ |
|---|---|---|---|---|---|
| 9 | 0.0000E+00 | 0.0000E+00 | 0.0000E+00 | 0.0000E+00 | 0.0000E+00 |
| 10 | 0.0000E+00 | 0.0000E+00 | 0.0000E+00 | 0.0000E+00 | 0.0000E+00 |

*aspheric surface

As shown in Table 29, the projection lens according to Example 3 satisfies Conditional expressions 1, 3 to 6, 8, 9, 2', and 6".

In Example 3, the focal length f of the entire lens system is 9.9, the F number Fno. is 2.51, and the total angle of view $2\omega$ is 45.4 degrees.

Example 4

Figure 4:
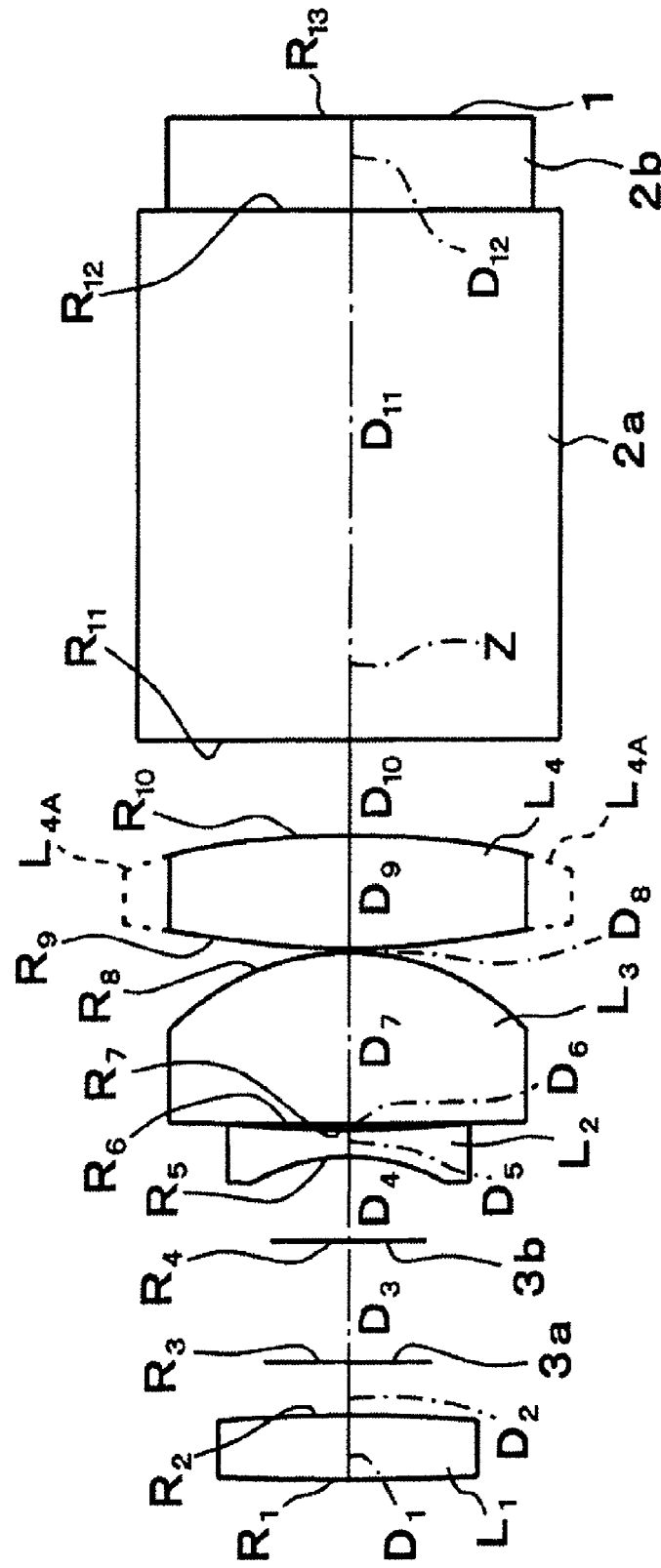
FIG. 4 is a diagram illustrating the structure of a small projection lens according to Example 4 of the invention.

The structure of a projection lens according to Example 4 is shown in FIG. 4, and is substantially similar to that according to Example 1 except that the second lens $L_2$ is a biconcave lens and the third lens $L_3$ is a biconvex lens.

The fourth lens $L_4$ arranged closest to the reduction side is formed in a non-circular shape including an effective light beam transmission area to remove an unnecessary lens portion (a portion disposed in the vertical direction of FIG. 4) $L_{4A}$ (a so-called D-cut is performed), in order to prevent the diameter of a reduction-side lens from being excessively large.

The aspheric shapes of both surfaces of the fourth lens $L_4$ are defined by the above-mentioned aspheric expression.

In Table 4, an upper part shows the curvature radius R of each lens surface in the projection lens according to Example 4, the on-axis surface spacing D between the lenses, the refractive index $N_d$ of each lens with respect to the d-line, and the Abbe number $\nu_d$ thereof. In addition, in Table 4, a lower part shows an aspheric coefficient indicating each aspheric surface.

As shown in Table 29, the projection lens according to Example 4 satisfies Conditional expressions 1, 3, 4, 6, 8, 9, 2', and 6".

In Example 4, the focal length f of the entire lens system is 9.9, the F number Fno. is 2.51, and the total angle of view $2\omega$ is 45.4 degrees.

Example 5

Figure 5:
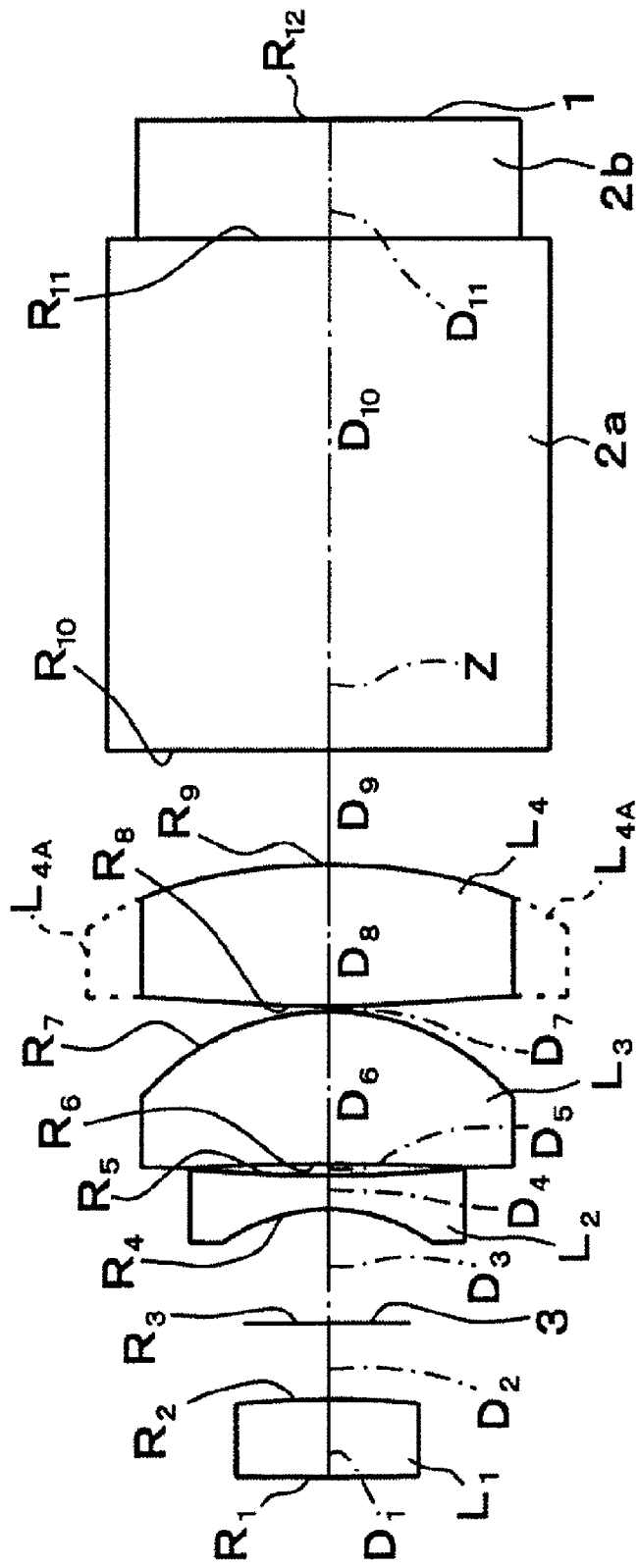
FIG. 5 is a diagram illustrating the structure of a small projection lens according to Example 5 of the invention.

The structure of a projection lens according to Example 5 is shown in FIG. 5, and is substantially similar to that according to Example 1 except that the second lens $L_2$ is a biconcave lens and only one mask 3 is provided between the first lens $L_1$ and the second lens $L_2$.

The fourth lens $L_4$ arranged closest to the reduction side is formed in a non-circular shape including an effective light beam transmission area to remove an unnecessary lens portion (a portion disposed in the vertical direction of FIG. 4) $L_{4A}$ (a so-called D-cut is performed), in order to prevent the diameter of a reduction-side lens from being excessively large.

The aspheric shapes of both surfaces of the fourth lens $L_4$ are defined by the above-mentioned aspheric expression.

In Table 5, an upper part shows the curvature radius R of each lens surface in the projection lens according to Example 5, the on-axis surface spacing D between the lenses, the refractive index $N_d$ of each lens with respect to the d-line, and the Abbe number $\nu_d$ thereof. In addition, in Table 5, a lower part shows an aspheric coefficient indicating each aspheric surface.

TABLE 4

| Surface Number | R | D | Nd | νd |
|---|---|---|---|---|
| OBJ | ∞ | 700.000 | | |
| 1 | 69.822 | 1.460 | 1.8467 | 23.8 |
| 2 | −34.545 | 1.200 | | |
| 3 (mask) | ∞ | 2.730 | | |
| 4 (mask) | ∞ | 1.910 | | |
| 5 | −4.496 | 0.600 | 1.8467 | 23.8 |
| 6 | 25.212 | 0.140 | | |
| 7 | 200.003 | 3.900 | 1.7725 | 49.6 |
| 8 | −5.723 | 0.100 | | |
| 9* | 16.985 | 2.560 | 1.7680 | 49.2 |
| 10* | −24.797 | 2.160 | | |
| 11 | ∞ | 12.000 | 1.7725 | 49.6 |
| 12 | ∞ | 2.100 | 1.5163 | 64.1 |
| 13 | ∞ | | | |

| | K | $A_3$ | $A_4$ | $A_5$ | $A_6$ |
|---|---|---|---|---|---|
| 9 | 1.0000 | 0.0000E+00 | −1.1144E−04 | 0.0000E+00 | −2.2527E−05 |
| 10 | 1.0000 | 0.0000E+00 | −6.3742E−05 | 0.0000E+00 | −2.3335E−05 |

| | $A_7$ | $A_8$ | $A_9$ | $A_{10}$ | $A_{11}$ |
|---|---|---|---|---|---|
| 9 | 0.0000E+00 | 5.1184E−07 | 0.0000E+00 | 1.1023E−09 | 0.0000E+00 |
| 10 | 0.0000E+00 | 4.9603E−07 | 0.0000E+00 | −9.3911E−10 | 0.0000E+00 |

| | $A_{12}$ | $A_{13}$ | $A_{14}$ | $A_{15}$ | $A_{16}$ |
|---|---|---|---|---|---|
| 9 | 0.0000E+00 | 0.0000E+00 | 0.0000E+00 | 0.0000E+00 | 0.0000E+00 |
| 10 | 0.0000E+00 | 0.0000E+00 | 0.0000E+00 | 0.0000E+00 | 0.0000E+00 |

*aspheric surface

TABLE 5

| Surface Number | R | D | Nd | vd |
|---|---|---|---|---|
| OBJ | ∞ | 600.000 | | |
| 1 | 137.562 | 1.370 | 1.8467 | 23.8 |
| 2 | −15.813 | 1.340 | | |
| 3 (mask) | ∞ | 2.010 | | |
| 4 | −3.239 | 0.600 | 1.8467 | 23.8 |
| 5 | 27.575 | 0.190 | | |
| 6 | −57.519 | 2.690 | 1.7725 | 49.6 |
| 7 | −4.345 | 0.100 | | |
| 8* | 21.377 | 2.500 | 1.6935 | 53.2 |
| 9* | −10.589 | 2.030 | | |
| 10 | ∞ | 9.000 | 1.7725 | 49.6 |
| 11 | ∞ | 2.100 | 1.5163 | 64.1 |
| 12 | ∞ | | | |

| | K | $A_3$ | $A_4$ | $A_5$ | $A_6$ |
|---|---|---|---|---|---|
| 8 | 1.0000 | 0.0000E+00 | −4.1930E−04 | 0.0000E+00 | −4.3348E−05 |
| 9 | 1.0000 | 0.0000E+00 | −1.5557E−04 | 0.0000E+00 | −4.4574E−05 |

| | $A_7$ | $A_8$ | $A_9$ | $A_{10}$ | $A_{11}$ |
|---|---|---|---|---|---|
| 8 | 0.0000E+00 | 6.5887E−07 | 0.0000E+00 | 2.5844E−08 | 0.0000E+00 |
| 9 | 0.0000E+00 | 8.6221E−07 | 0.0000E+00 | −7.6348E−09 | 0.0000E+00 |

| | $A_{12}$ | $A_{13}$ | $A_{14}$ | $A_{15}$ | $A_{16}$ |
|---|---|---|---|---|---|
| 8 | 0.0000E+00 | 0.0000E+00 | 0.0000E+00 | 0.0000E+00 | 0.0000E+00 |
| 9 | 0.0000E+00 | 0.0000E+00 | 0.0000E+00 | 0.0000E+00 | 0.0000E+00 |

*aspheric surface

As shown in Table 29, the projection lens according to Example 5 satisfies Conditional expressions 1, 3, 4, 6, 8, 9, 2', and 6'.

In Example 5, the focal length f of the entire lens system is 7.8, the F number Fno. is 2.40, and the total angle of view 2ω is 45.8 degrees.

Example 6

Figure 6:
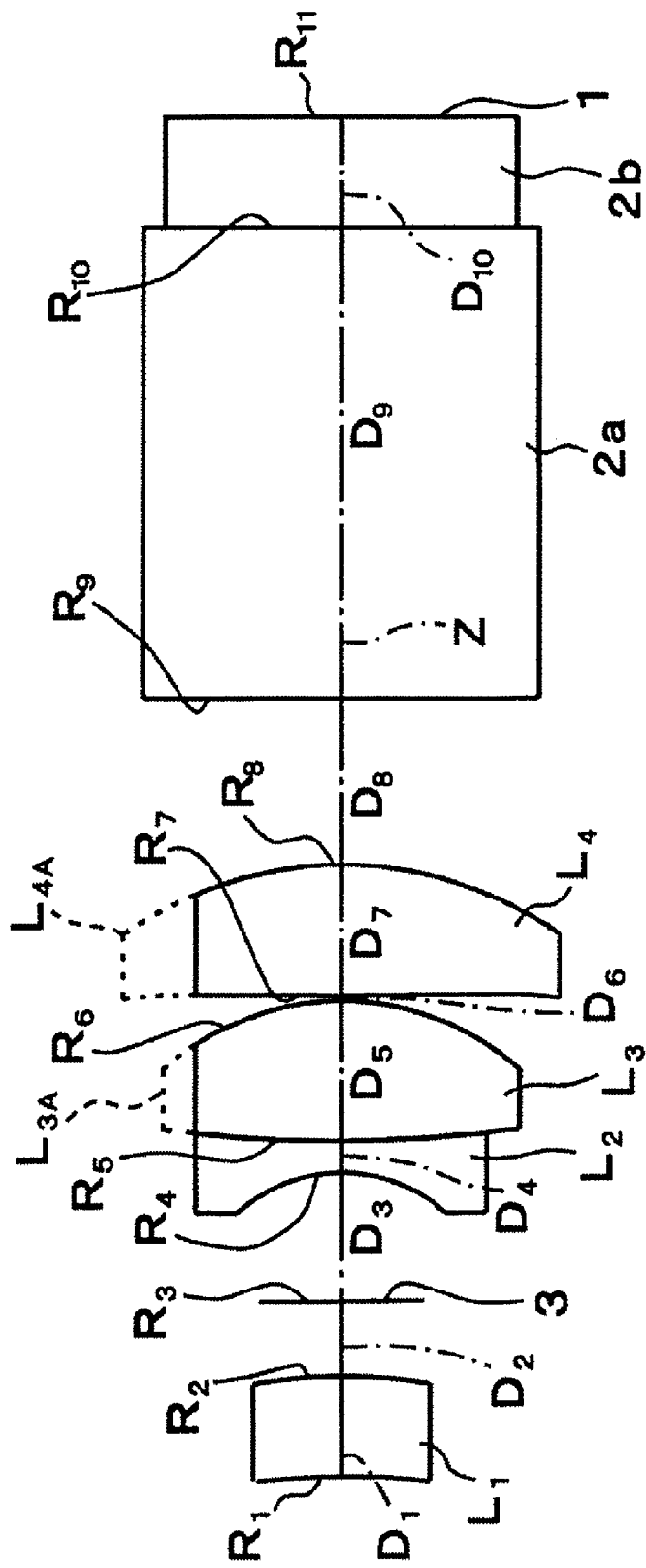
FIG. 6 is a diagram illustrating the structure of a small projection lens according to Example 6 of the invention.

The structure of a projection lens according to Example 6 is shown in FIG. 6, and is substantially similar to that according to Example 1 except that the first lens $L_1$ is a positive meniscus lens having a concave surface facing the magnification side, the second lens $L_2$ is a biconcave lens, the third lens $L_3$ is a biconvex lens, and the second lens $L_2$ and the third lens $L_3$ are bonded to each other.

The fourth lens $L_4$ arranged closest to the reduction side and the third lens $L_3$ adjacent to the magnification side of the fourth lens $L_4$ are each formed in a non-circular shape including an effective light beam transmission area to remove unnecessary lens portions (portions disposed in the vertical direction of FIG. 6) $L_{3A}$ and $L_{4A}$ (a so-called D-cut is performed), in order to prevent the diameter of a reduction-side lens from being excessively large.

The aspheric shapes of both surfaces of the fourth lens $L_4$ are defined by the above-mentioned aspheric expression.

In Table 6, an upper part shows the curvature radius R of each lens surface in the projection lens according to Example 6, the on-axis surface spacing D between the lenses, the refractive index $N_d$ of each lens with respect to the d-line, and the Abbe number $v_d$ thereof. In addition, in Table 6, a lower part shows an aspheric coefficient indicating each aspheric surface.

TABLE 6

| Surface Number | R | D | Nd | vd |
|---|---|---|---|---|
| OBJ | ∞ | 600.000 | | |
| 1 | −17.477 | 1.930 | 1.8467 | 23.8 |
| 2 | −9.687 | 1.430 | | |
| 3 (mask) | ∞ | 2.470 | | |
| 4 | −3.001 | 0.610 | 1.8052 | 25.4 |
| 5 | 26.588 | 2.680 | 1.8040 | 46.6 |
| 6 | −5.179 | 0.110 | | |
| 7* | 103.568 | 2.510 | 1.6935 | 53.2 |
| 8* | −6.977 | 3.190 | | |
| 9 | ∞ | 9.000 | 1.7725 | 49.6 |
| 10 | ∞ | 2.100 | 1.5163 | 64.1 |
| 11 | ∞ | | | |

TABLE 6-continued

|   | K | $A_3$ | $A_4$ | $A_5$ | $A_6$ |
|---|---|---|---|---|---|
| 7 | 1.0000 | 0.0000E+00 | −2.5869E−04 | 0.0000E+00 | −3.2104E−06 |
| 8 | 1.0000 | 0.0000E+00 | 3.3175E−04 | 0.0000E+00 | −1.2454E−06 |

|   | $A_7$ | $A_8$ | $A_9$ | $A_{10}$ | $A_{11}$ |
|---|---|---|---|---|---|
| 7 | 0.0000E+00 | 1.4273E−08 | 0.0000E+00 | −2.7853E−08 | 0.0000E+00 |
| 8 | 0.0000E+00 | 2.2629E−07 | 0.0000E+00 | −2.5652E−08 | 0.0000E+00 |

|   | $A_{12}$ | $A_{13}$ | $A_{14}$ | $A_{15}$ | $A_{16}$ |
|---|---|---|---|---|---|
| 7 | 0.0000E+00 | 0.0000E+00 | 0.0000E+00 | 0.0000E+00 | 0.0000E+00 |
| 8 | 0.0000E+00 | 0.0000E+00 | 0.0000E+00 | 0.0000E+00 | 0.0000E+00 |

*aspheric surface

As shown in Table 29, the projection lens according to Example 6 satisfies Conditional expressions 1, 3, 4, 6, 8, 9, 2', and 6'.

In Example 6, the focal length f of the entire lens system is 7.8, the F number Fno. is 2.40, and the total angle of view 2ω is 45.6 degrees.

Second Aspect

Example 7

Figure 7:
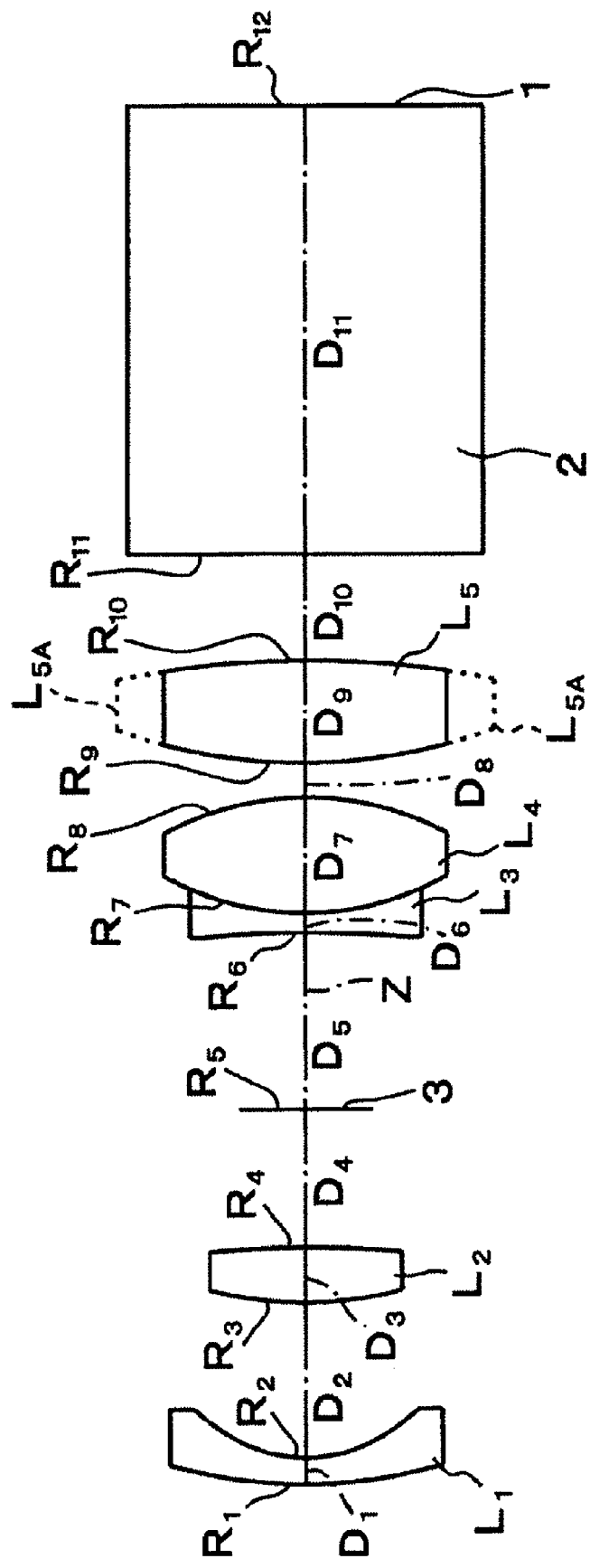
FIG. 7 is a diagram illustrating the structure of a small projection lens according to Example 7 of the invention.

As shown in FIG. 7, a projection lens according to Example 7 includes a first lens $L_1$, which is a negative meniscus lens that has a convex surface facing a magnification side and includes aspheric surfaces at both sides, a second lens $L_2$, which is a biconvex lens, an aperture (or a variable aperture diaphragm) 3, a cemented lens of a third lens $L_3$, which is a biconcave lens, and a fourth lens $L_4$, which is a biconvex lens, a fifth lens $L_5$, which is a biconvex lens. The first to fifth lenses are arranged in this order from the magnification side.

The fifth lens $L_5$ arranged closest to the reduction side is formed in a non-circular shape including an effective light beam transmission area to remove an unnecessary lens portion (a portion disposed in the vertical direction of FIG. 7) $L_{5A}$ (a so-called D-cut is performed), in order to prevent the outside diameter of a reduction-side lens from being excessively large.

The aspheric shapes of both surfaces of the first lens $L_1$ are defined by the above-mentioned aspheric expression.

FIG. 7 shows the image display surface 1 of a light valve and a glass block 2.

In Table 7, an upper part shows the curvature radius R of each lens surface in the projection lens according to Example 7, the on-axis surface spacing D between the lenses, the refractive index $N_d$ of each lens with respect to the d-line, and the Abbe number $\nu_d$ thereof.

TABLE 7

| Surface Number | R | D | Nd | νd |
|---|---|---|---|---|
| OBJ | ∞ | 900.000 | | |
| 1* | 16.291 | 0.800 | 1.8061 | 40.9 |
| 2* | 4.399 | 4.706 | | |
| 3 | 12.074 | 1.660 | 1.8000 | 29.8 |
| 4 | −35.988 | 4.188 | | |
| 5 (mask) | ∞ | 5.366 | | |
| 6 | −35.656 | 0.600 | 1.8467 | 23.8 |
| 7 | 8.863 | 3.512 | 1.4875 | 70.2 |
| 8 | −9.287 | 1.049 | | |
| 9 | 16.769 | 3.107 | 1.8040 | 46.6 |
| 10 | −29.533 | 3.219 | | |
| 11 | ∞ | 13.600 | 1.5163 | 64.1 |
| 12 | ∞ | | | |

|   | K | $A_3$ | $A_4$ | $A_5$ | $A_6$ |
|---|---|---|---|---|---|
| 1 | 1.0000 | 0.0000E+00 | 5.8389E−04 | 0.0000E+00 | −3.4706E−05 |
| 2 | 1.0000 | 0.0000E+00 | −4.9670E−05 | 0.0000E+00 | −7.8966E−05 |

|   | $A_7$ | $A_8$ | $A_9$ | $A_{10}$ | $A_{11}$ | $A_{12}$ |
|---|---|---|---|---|---|---|
| 1 | 0.0000E+00 | 5.8161E−07 | 0.0000E+00 | −5.3789E−09 | 0.0000E+00 | 0.0000E+00 |
| 2 | 0.0000E+00 | 3.5963E−07 | 0.0000E+00 | −2.2732E−07 | 0.0000E+00 | 0.0000E+00 |

*aspheric surface

As shown in Table 29, the projection lens according to Example 7 satisfies Conditional expressions 1 to 6, 10, 2', 6', and 6".

In Example 7, the focal length f of the entire lens system is 7.8, the F number Fno. is 3.00, and the total angle of view 2ω is 62.0 degrees.

Example 8

Figure 8:
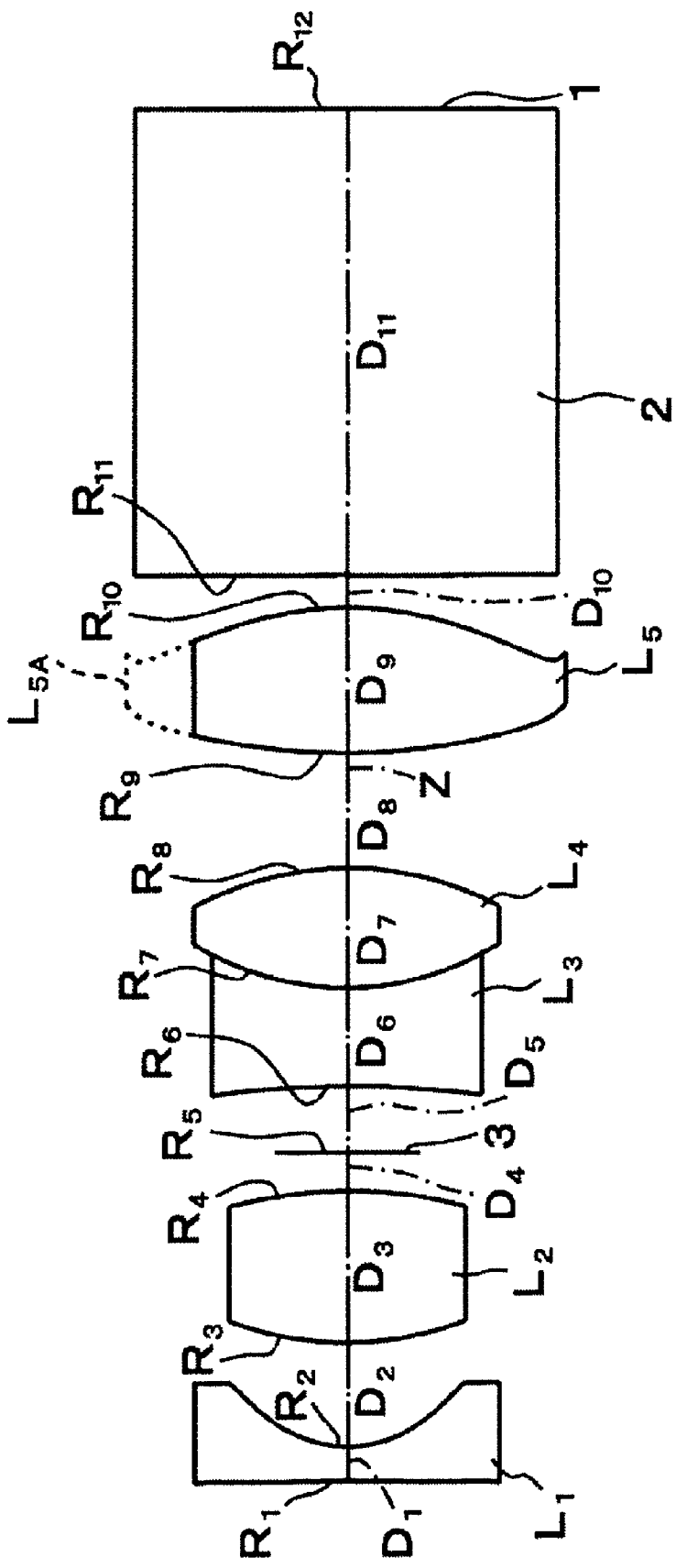
FIG. 8 is a diagram illustrating the structure of a small projection lens according to Example 8 of the invention.

The structure of a projection lens according to Example 8 is shown in FIG. 8, and is substantially similar to that according to Example 7 except that the first lens $L_1$ is a biconcave lens having aspheric surfaces at both sides and, in addition to the first lens $L_1$, the fifth lens $L_5$ is a lens having aspheric surfaces at both sides.

The fifth lens $L_5$ arranged closest to the reduction side is formed in a non-circular shape including an effective light beam transmission area to remove an unnecessary lens portion (a portion disposed on the upper side of FIG. 8) $L_{5A}$ (a so-called D-cut is performed), in order to prevent the diameter of a reduction-side lens from being excessively large.

The aspheric shapes of both surfaces of each of the first lens $L_1$ and the fifth lens $L_5$ are defined by the above-mentioned aspheric expression.

In Table 8, an upper part shows the curvature radius R of each lens surface in the projection lens according to Example 8, the on-axis surface spacing D between the lenses, the refractive index $N_d$ of each lens with respect to the d-line, and the Abbe number $v_d$ thereof. In addition, in Table 8, a lower part shows an aspheric coefficient indicating each aspheric surface.

TABLE 8

| Surface Number | R | D | Nd | vd |
|---|---|---|---|---|
| OBJ | ∞ | 712.000 | | |
| 1* | −26.282 | 1.000 | 1.5687 | 58.6 |
| 2* | 3.871 | 3.039 | | |
| 3 | 9.878 | 4.431 | 1.7283 | 28.5 |
| 4 | −13.691 | 1.107 | | |
| 5 (mask) | ∞ | 1.935 | | |
| 6 | −32.170 | 2.884 | 1.8467 | 23.8 |
| 7 | 8.622 | 3.506 | 1.4970 | 81.5 |
| 8 | −9.630 | 3.356 | | |
| 9* | 20.777 | 4.249 | 1.5687 | 58.6 |
| 10* | −9.474 | 0.944 | | |
| 11 | ∞ | 13.600 | 1.5163 | 64.1 |
| 12 | ∞ | | | |

| | K | $A_3$ | $A_4$ | $A_5$ | $A_6$ |
|---|---|---|---|---|---|
| 1 | 0.0000 | 7.2134E−03 | 5.0189E−05 | −6.2914E−04 | 3.8302E−04 |
| 2 | 0.0000 | 1.6354E−02 | −1.5431E−02 | 1.5172E−02 | −7.8508E−03 |
| 9 | 0.0000 | 1.8502E−03 | −2.9779E−04 | −4.3158E−04 | 1.7281E−04 |
| 10 | 0.0000 | 1.8419E−03 | −5.4729E−04 | 2.5258E−04 | −1.4370E−04 |

| | $A_7$ | $A_8$ | $A_9$ | $A_{10}$ | $A_{11}$ |
|---|---|---|---|---|---|
| 1 | −9.7742E−05 | −1.8169E−05 | 9.3853E−06 | 6.8920E−07 | −3.0041E−07 |
| 2 | 1.9537E−03 | −3.9272E−05 | −7.7878E−05 | −1.3784E−06 | 9.1490E−06 |
| 9 | −3.8350E−06 | −5.5181E−06 | −6.2965E−08 | 1.0067E−07 | 2.2388E−08 |
| 10 | 3.9651E−05 | −1.8376E−06 | −4.4841E−07 | −3.3491E−08 | −3.9143E−09 |

| | $A_{12}$ | $A_{13}$ | $A_{14}$ | $A_{15}$ | $A_{16}$ |
|---|---|---|---|---|---|
| 1 | −9.8440E−08 | 1.0111E−08 | 6.3934E−09 | −9.2132E−10 | −1.9609E−24 |
| 2 | −3.6329E−06 | 1.0247E−06 | −1.3269E−07 | 7.5887E−22 | −3.5237E−22 |
| 9 | 2.5782E−10 | −6.5454E−10 | −1.2925E−10 | 6.0275E−12 | 5.5646E−12 |
| 10 | 2.1208E−09 | 5.7654E−10 | 1.3104E−11 | −1.5755E−11 | −3.1230E−12 |

| | $A_{17}$ | $A_{18}$ | $A_{19}$ | $A_{20}$ |
|---|---|---|---|---|
| 1 | −6.3418E−25 | −7.3302E−27 | −7.2763E−29 | −7.2763E−31 |
| 2 | −7.0010E−25 | −7.2763E−27 | −7.2763E−29 | −7.2763E−31 |
| 9 | −4.8643E−13 | 3.3540E−24 | 7.0703E−30 | −9.3310E−31 |
| 10 | 4.9574E−13 | 2.2098E−58 | −1.1834E−30 | −6.0605E−32 |

*aspheric surface

As shown in Table 29, the projection lens according to Example 8 satisfies Conditional expressions 1 to 6, 10, 2', 6', and 6".

In Example 8, the focal length f of the entire lens system is 6.4, the F number Fno. is 3.00, and the total angle of view $2\omega$ is 72.8 degrees.

Example 9

Figure 9:
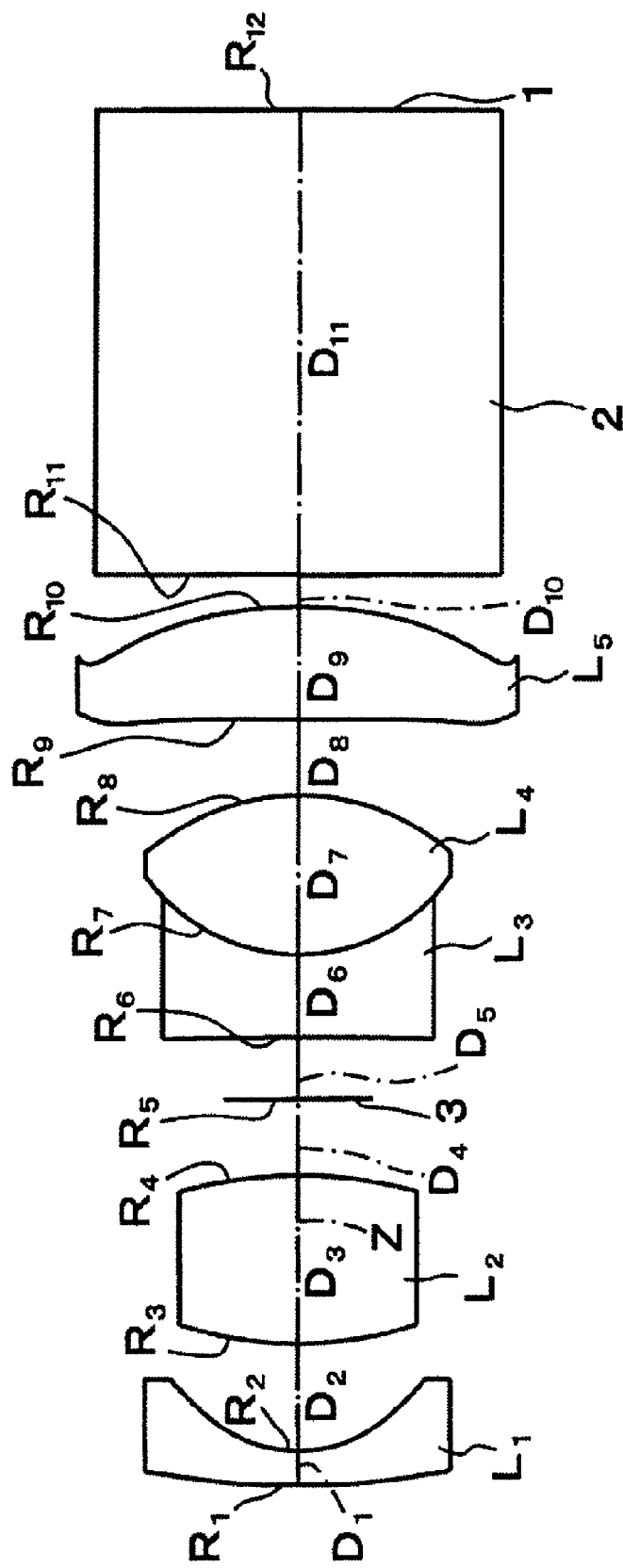
FIG. 9 is a diagram illustrating the structure of a small projection lens according to Example 9 of the invention.

The structure of a projection lens according to Example 9 is shown in FIG. 9, and is substantially similar to that according to Example 7 except that, in addition to the first lens $L_1$, the fifth lens $L_5$ has aspheric surfaces at both sides.

The aspheric shapes of both surfaces of each of the first lens $L_1$ and the fifth lens $L_5$ are defined by the above-mentioned aspheric expression.

In Table 9, an upper part shows the curvature radius R of each lens surface in the projection lens according to Example 9, the on-axis surface spacing D between the lenses, the refractive index $N_d$ of each lens with respect to the d-line, and the Abbe number $\nu_d$ thereof. In addition, in Table 9, a lower part shows an aspheric coefficient indicating each aspheric surface.

As shown in Table 29, the projection lens according to Example 9 satisfies Conditional expressions 1 to 6, 10, 2', 6', and 6".

In Example 9, the focal length f of the entire lens system is 6.4, the F number Fno. is 2.50, and the total angle of view $2\omega$ is 72.8 degrees.

Example 10

Figure 10:
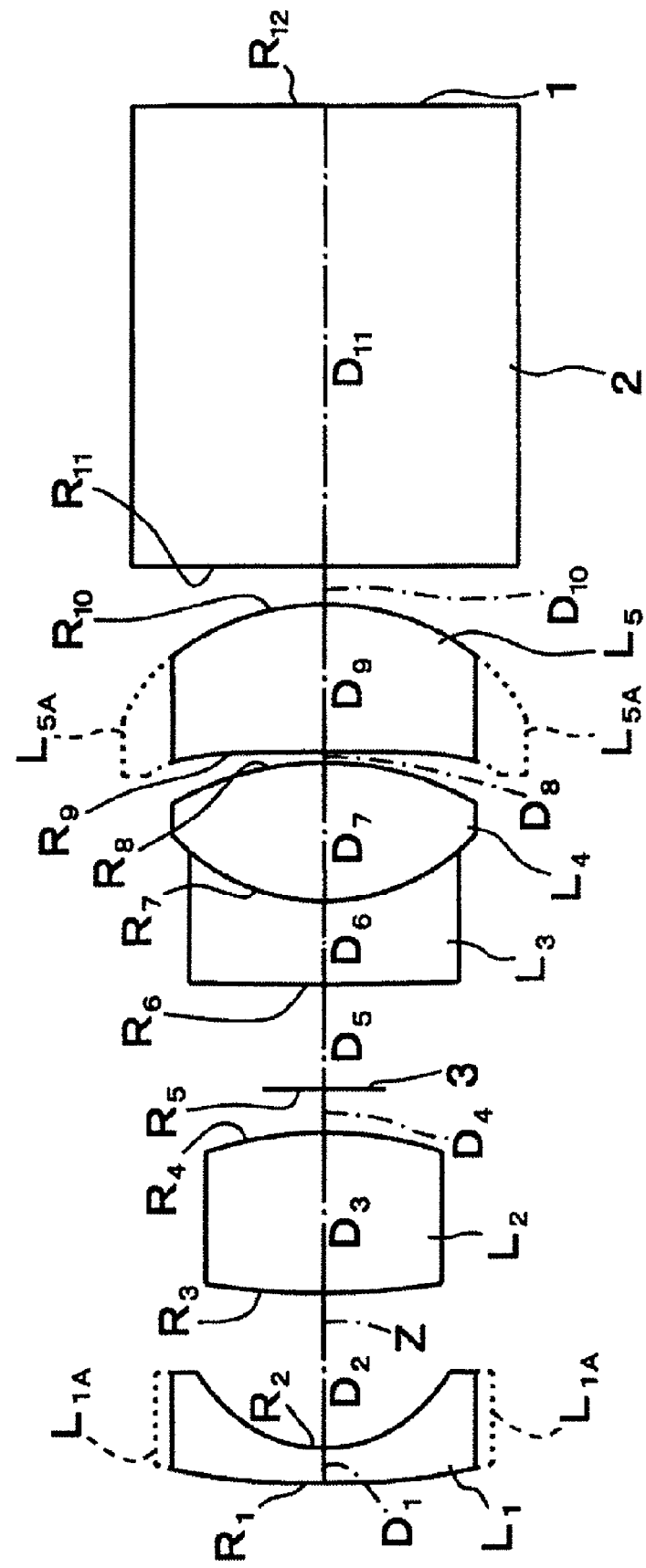
FIG. 10 is a diagram illustrating the structure of a small projection lens according to Example 10 of the invention.

The structure of a projection lens according to Example 10 is shown in FIG. 10, and is substantially similar to that according to Example 7 except that, in addition to the first lens $L_1$, the fifth lens $L_5$ also has aspheric surfaces at both sides, the first lens $L_1$ is a biconcave lens having aspheric surfaces at both sides on the optical axis Z, the third lens $L_3$ is a negative meniscus lens having a concave surface facing the reduction side, and the fifth lens $L_5$ is a positive meniscus lens that has a convex surface facing the reduction side on the optical axis Z and includes aspheric surfaces at both sides.

The first lens $L_1$ arranged closest to the magnification side and the fifth lens $L_5$ arranged closest to the reduction side are formed such that unnecessary lens portions (portions disposed in the vertical direction of FIG. 10) $L_{1A}$ and $L_{5A}$ are removed (a so-called D-cut is performed) in order to prevent the diameter of a reduction-side lens from being excessively large.

TABLE 9

| Surface Number | R | D | Nd | νd |
|---|---|---|---|---|
| OBJ | ∞ | 712.000 | | |
| 1* | 2026.430 | 1.000 | 1.8035 | 40.4 |
| 2* | 4.403 | 3.152 | | |
| 3 | 11.273 | 4.918 | 1.8052 | 25.4 |
| 4 | −13.209 | 2.227 | | |
| 5 (mask) | ∞ | 1.820 | | |
| 6 | −153.247 | 2.418 | 1.8467 | 23.8 |
| 7 | 5.548 | 4.664 | 1.4970 | 81.5 |
| 8 | −6.940 | 2.227 | | |
| 9* | 242.194 | 3.297 | 1.8035 | 40.4 |
| 10* | −13.355 | 0.944 | | |
| 11 | ∞ | 13.600 | 1.5163 | 64.1 |
| 12 | ∞ | | | |

| | K | $A_3$ | $A_4$ | $A_5$ | $A_6$ |
|---|---|---|---|---|---|
| 1 | 0.0000 | 6.4481E−03 | 3.2915E−03 | −1.6635E−03 | 3.3153E−04 |
| 2 | 0.0000 | 1.2704E−02 | −7.0925E−03 | 1.1001E−02 | −6.6638E−03 |
| 9 | 0.0000 | 4.0684E−04 | 2.8743E−04 | −5.4201E−04 | 1.4254E−04 |
| 10 | 0.0000 | 4.1112E−04 | −3.3608E−04 | 1.7852E−04 | −1.4546E−04 |

| | $A_7$ | $A_8$ | $A_9$ | $A_{10}$ | $A_{11}$ |
|---|---|---|---|---|---|
| 1 | −5.0548E−05 | −1.6658E−05 | 7.6248E−06 | 5.2088E−07 | −2.2960E−07 |
| 2 | 1.8277E−03 | −1.4041E−04 | −5.9933E−05 | 7.8544E−06 | 9.9523E−06 |
| 9 | 3.9426E−10 | −4.7804E−06 | −4.1107E−08 | 8.4864E−08 | 2.0203E−08 |
| 10 | 3.6509E−05 | −1.8342E−06 | −2.7615E−07 | −1.8384E−08 | −6.0706E−09 |

| | $A_{12}$ | $A_{13}$ | $A_{14}$ | $A_{15}$ | $A_{16}$ |
|---|---|---|---|---|---|
| 1 | −7.4240E−08 | 8.5661E−09 | 3.5031E−09 | −4.7383E−10 | −1.9609E−24 |
| 2 | −4.4349E−06 | 7.1120E−07 | −3.9908E−08 | 7.5887E−22 | −3.5237E−22 |
| 9 | −7.3131E−11 | −6.4894E−10 | −1.1536E−10 | 9.2552E−12 | 5.8774E−12 |
| 10 | 1.2639E−09 | 4.7553E−10 | 1.9518E−11 | −1.1379E−11 | −2.5897E−12 |

| | $A_{17}$ | $A_{18}$ | $A_{19}$ | $A_{20}$ |
|---|---|---|---|---|
| 1 | −6.3418E−25 | 2.8276E−27 | 2.7198E−29 | 2.7198E−31 |
| 2 | 2.9790E−25 | 2.7198E−27 | 2.7198E−29 | 2.7198E−31 |
| 9 | −6.0618E−13 | 3.3540E−24 | 7.0703E−30 | −9.3441E−31 |

*aspheric surface

The aspheric shapes of both surfaces of each of the first lens $L_1$ and the fifth lens $L_5$ are defined by the above-mentioned aspheric expression.

In Table 10, an upper part shows the curvature radius R of each lens surface in the projection lens according to Example 10, the on-axis surface spacing D between the lenses, the refractive index $N_d$ of each lens with respect to the d-line, and the Abbe number $v_d$ thereof. In addition, in Table 10, a lower part shows an aspheric coefficient indicating each aspheric surface.

$L_1$, which is a positive meniscus lens having a convex surface facing the magnification side, an aperture (or an aperture diaphragm) 3, a second lens $L_2$, which is a positive meniscus lens having a convex surface facing the magnification side, a cemented lens of a third lens $L_3$, which is a biconcave lens, and a fourth lens $L_4$, which is a biconvex lens, and a fifth lens $L_5$, which is a biconvex aspheric lens.

TABLE 10

| Surface Number | R | D | Nd | vd |
|---|---|---|---|---|
| OBJ | ∞ | 125.000 | | |
| 1* | −47.189 | 1.020 | 1.8035 | 40.4 |
| 2* | 4.943 | 4.586 | | |
| 3 | 23.728 | 4.711 | 1.8052 | 25.4 |
| 4 | −10.990 | 1.295 | | |
| 5 (mask) | ∞ | 3.096 | | |
| 6 | 174.208 | 2.464 | 1.8467 | 23.8 |
| 7 | 6.163 | 4.099 | 1.4970 | 81.5 |
| 8 | −9.040 | 0.329 | | |
| 9* | −146.146 | 4.344 | 1.5687 | 58.6 |
| 10* | −7.370 | 1.123 | | |
| 11 | ∞ | 13.600 | 1.5163 | 64.1 |
| 12 | ∞ | | | |

| | K | $A_3$ | $A_4$ | $A_5$ | $A_6$ |
|---|---|---|---|---|---|
| 1 | 0.0000 | 5.7351E−03 | 7.4606E−03 | −3.7709E−03 | 6.2994E−04 |
| 2 | 0.0000 | 1.4208E−02 | −6.4363E−03 | 1.1221E−02 | −6.6982E−03 |
| 9 | 0.0000 | 1.4934E−03 | −8.7648E−05 | −5.0750E−04 | 5.2215E−05 |
| 10 | 0.0000 | 3.6851E−04 | 5.5457E−04 | −3.8292E−04 | −1.3459E−05 |

| | $A_7$ | $A_8$ | $A_9$ | $A_{10}$ | $A_{11}$ |
|---|---|---|---|---|---|
| 1 | −2.7394E−06 | −2.1608E−05 | 5.4335E−06 | 3.3048E−07 | −2.0347E−07 |
| 2 | 1.5783E−03 | −7.0219E−05 | −3.6921E−05 | 7.2058E−06 | 7.2865E−06 |
| 9 | 3.0917E−05 | −2.8042E−06 | −1.3774E−06 | −9.0030E−08 | 3.7219E−08 |
| 10 | 2.9870E−05 | −3.1470E−06 | −5.3783E−07 | 2.2632E−08 | 8.4887E−09 |

| | $A_{12}$ | $A_{13}$ | $A_{14}$ | $A_{15}$ | $A_{16}$ |
|---|---|---|---|---|---|
| 1 | −5.7428E−08 | 1.2638E−08 | 3.5689E−09 | −1.0390E−09 | 6.9624E−11 |
| 2 | −4.7841E−06 | 9.5714E−07 | −5.8873E−08 | 7.5887E−22 | −3.5236E−22 |
| 9 | 1.0919E−08 | 3.9370E−10 | −3.4796E−10 | −8.9059E−11 | 1.7768E−11 |
| 10 | 1.5557E−09 | 4.0942E−12 | −6.6117E−11 | −4.2202E−12 | 2.1451E−12 |

| | $A_{17}$ | $A_{18}$ | $A_{19}$ | $A_{20}$ |
|---|---|---|---|---|
| 1 | −6.3417E−25 | 6.8210E−26 | 6.7382E−28 | 6.7382E−30 |
| 2 | 6.7658E−24 | 6.7382E−26 | 6.7382E−28 | 6.7382E−30 |
| 9 | −4.9916E−13 | 3.3540E−24 | 7.5361E−28 | 6.5353E−30 |
| 10 | −1.5305E−13 | −1.4483E−21 | −6.9814E−29 | 7.4079E−30 |

*aspheric surface

As shown in Table 29, the projection lens according to Example 10 satisfies Conditional expressions 1 to 5, 7, 10, 2', and 6'.

Since the projection lens according to Example 10 simultaneously satisfies Conditional expressions 6' and 7, the projection lens can be mounted to an ultra-miniature portable projection display device.

In Example 10, the focal length f of the entire lens system is 5.1, the F number Fno. is 3.00, and the total angle of view 2ω is 86.4 degrees.

Third Aspect

Example 11

The structure of a projection lens according to Example 11 is shown in FIG. 10. The projection lens includes a first lens The aspheric shapes of both surfaces of the fifth lens $L_5$ are defined by the above-mentioned aspheric expression.

In addition, FIG. 11 shows the image display surface 1 of a light valve, a glass block 2a, and a cover glass 2b of the light valve.

In Table 11, an upper part shows the curvature radius R of each lens surface in the projection lens according to Example 11, the on-axis surface spacing D between the lenses, the refractive index $N_d$ of each lens with respect to the d-line, and the Abbe number $v_d$ thereof. In addition, in Table 11, a lower part shows an aspheric coefficient indicating each aspheric surface.

TABLE 11

| Surface Number | R | D | Nd | vd |
|---|---|---|---|---|
| OBJ | ∞ | 600.000 | | |
| 1 | 3.812 | 0.800 | 1.8467 | 23.8 |
| 2 | 3.592 | 3.213 | | |
| 3 (mask) | ∞ | 0.500 | | |
| 4 | 10.563 | 1.412 | 1.8467 | 23.8 |
| 5 | 18.558 | 2.056 | | |
| 6 | −3.774 | 0.600 | 1.8467 | 23.8 |
| 7 | 16.949 | 3.274 | 1.8348 | 42.7 |
| 8 | −8.256 | 1.033 | | |
| 9* | 27.132 | 4.320 | 1.7550 | 52.3 |
| 10* | −8.454 | 1.097 | | |
| 11 | ∞ | 11.500 | 1.7130 | 53.9 |
| 12 | ∞ | 1.500 | | |
| 13 | ∞ | 2.100 | 1.5163 | 64.1 |
| 14 | ∞ | | | |

| | K | $A_3$ | $A_4$ | $A_5$ | $A_6$ |
|---|---|---|---|---|---|
| 9 | 1.0000 | 0.0000E+00 | −1.5954E−04 | 0.0000E+00 | 8.7617E−07 |
| 10 | 1.0000 | 0.0000E+00 | 2.6779E−04 | 0.0000E+00 | 6.7616E−07 |

| | $A_7$ | $A_8$ | $A_9$ | $A_{10}$ | $A_{11}$ | $A_{12}$ |
|---|---|---|---|---|---|---|
| 9 | 0.0000E+00 | 9.2452E−09 | 0.0000E+00 | −1.6296E−10 | 0.0000E+00 | 0.0000E+00 |
| 10 | 0.0000E+00 | 9.1987E−09 | 0.0000E+00 | 4.5472E−10 | 0.0000E+00 | 0.0000E+00 |

*aspheric surface

As shown in Table 29, the projection lens according to Example 11 satisfies Conditional expressions 1, 3 to 6, and 2'.

In Example 11, the focal length f of the entire lens system is 10.6, the F number Fno. is 3.00, and the total angle of view 2ω is 48.2 degrees. Therefore, it is possible to increase the angle of view using five lenses.

Example 12

The structure of a projection lens according to Example 12 is shown in FIG. 12, and is substantially similar to that according to Example 11 except that the first lens $L_1$ is a negative meniscus lens that has a convex surface facing the magnification side and includes aspheric surfaces at both sides, the second lens $L_2$ is a biconvex lens, and a mask (or a variable aperture diaphragm) 3b is provided between the second lens $L_2$ and the third lens $L_3$, in addition to the mask 3a.

The fifth lens $L_5$ arranged closest to the reduction side is formed in a non-circular shape including an effective light beam transmission area to remove an unnecessary lens portion (a portion disposed in the vertical direction of FIG. 12) $L_{5A}$ (a so-called D-cut is performed) and the first lens $L_1$ arranged closest to the magnification side is formed in a non-circular shape including an effective light beam transmission area to remove an unnecessary lens portion (a portion disposed on the lower side of FIG. 12) $L_{1A}$ (a so-called D-cut is performed), in order to prevent the diameter of a reduction-side lens from being excessively large.

The aspheric shapes of both surfaces of each of the first lens $L_1$ and the fifth lens $L_5$ are defined by the above-mentioned aspheric expression.

In Table 12, an upper part shows the curvature radius R of each lens surface in the projection lens according to Example 12, the on-axis surface spacing D between the lenses, the refractive index $N_d$ of each lens with respect to the d-line, and the Abbe number $v_d$ thereof. In addition, in Table 12, a lower part shows an aspheric coefficient indicating each aspheric surface.

TABLE 12

| Surface Number | R | D | Nd | vd |
|---|---|---|---|---|
| OBJ | ∞ | 890.000 | | |
| 1* | 675.607 | 0.750 | 1.8061 | 40.9 |
| 2* | 6.876 | 6.041 | | |
| 3 (mask) | ∞ | 2.449 | | |
| 4 | 27.382 | 1.707 | 1.8000 | 29.8 |
| 5 | −12.745 | 0.500 | | |
| 6 (mask) | ∞ | 5.833 | | |
| 7 | −52.038 | 0.750 | 1.8467 | 23.8 |
| 8 | 7.231 | 4.510 | 1.4970 | 81.5 |
| 9 | −8.522 | 3.122 | | |
| 10* | 19.968 | 3.093 | 1.7432 | 49.3 |
| 11* | −136.899 | 2.549 | | |
| 12 | ∞ | 11.500 | 1.9037 | 31.3 |
| 13 | ∞ | 2.100 | 1.5168 | 64.2 |
| 14 | ∞ | | | |

TABLE 12-continued

|    | K       | $A_3$      | $A_4$       | $A_5$      | $A_6$       |
|----|---------|------------|-------------|------------|-------------|
| 1  | 0.0000  | 3.0065E−02 | −2.1308E−02 | 1.0388E−02 | −1.0298E−03 |
| 2  | 0.0000  | 3.3509E−02 | −2.3026E−02 | 1.1119E−02 | −1.1464E−03 |
| 10 | 0.0000  | 9.9995E−04 | −1.5633E−03 | 6.0436E−04 | −1.5510E−04 |
| 11 | 0.0000  | 3.2641E−04 | −8.1800E−04 | 1.1126E−04 | −2.9772E−05 |

|    | $A_7$       | $A_8$       | $A_9$       | $A_{10}$    | $A_{11}$    |
|----|-------------|-------------|-------------|-------------|-------------|
| 1  | −7.5941E−04 | 2.5798E−04  | −2.3945E−05 | −2.0983E−06 | 3.8468E−07  |
| 2  | −4.2879E−04 | 4.5694E−04  | −2.2118E−04 | −6.4569E−06 | 2.0080E−05  |
| 10 | 5.9293E−06  | 3.4696E−06  | −7.4904E−09 | −1.3559E−07 | 6.2793E−09  |
| 11 | 3.6189E−06  | −3.8343E−07 | 1.5346E−08  | 4.5822E−08  | −1.2373E−08 |

|    | $A_{12}$    | $A_{13}$    | $A_{14}$    | $A_{15}$   | $A_{16}$    |
|----|-------------|-------------|-------------|------------|-------------|
| 1  | −2.9431E−08 | 8.1667E−08  | −2.7393E−08 | 2.5079E−09 | −1.2707E−30 |
| 2  | 1.2501E−06  | −1.7752E−06 | 1.9987E−07  | 5.4854E−29 | 1.4228E−32  |
| 10 | 1.9028E−09  | −1.6003E−10 | 0.0000E+00  | 0.0000E+00 | 0.0000E+00  |
| 11 | 8.6853E−10  | 0.0000E+00  | 0.0000E+00  | 0.0000E+00 | 0.0000E+00  |

|    | $A_{17}$    | $A_{18}$    | $A_{19}$    | $A_{20}$    |
|----|-------------|-------------|-------------|-------------|
| 1  | −1.2679E−33 | −3.7070E−27 | −4.5932E−29 | −4.5932E−31 |
| 2  | −6.0386E−25 | −4.5932E−27 | −4.5932E−29 | −4.5932E−31 |
| 10 | 0.0000E+00  | 0.0000E+00  | 0.0000E+00  | 0.0000E+00  |
| 11 | 0.0000E+00  | 0.0000E+00  | 0.0000E+00  | 0.0000E+00  |

*aspheric surface

As shown in Table 29, the projection lens according to Example 12 satisfies Conditional expressions 1 to 6, 10, 2', 6', and 6".

In Example 12, the focal length f of the entire lens system is 7.9, the F number Fno. is 2.99, and the total angle of view 2ω is 60.8 degrees. Therefore, it is possible to increase the angle of view at each stage using five lenses.

Fourth Aspect

Example 13

A projection lens according to Example 13 is shown in FIG. 13, and includes a first lens $L_1$, which is a negative meniscus lens that has a convex surface facing a magnification side and includes aspheric surfaces at both sides, a second lens $L_2$, which is a positive meniscus lens having a convex surface facing a reduction side, an aperture 3a, an aperture diaphragm (or an aperture) 3b, a third lens $L_3$, which is a positive meniscus lens having a convex surface facing the reduction side, a cemented lens of a fourth lens $L_4$, which is a biconcave lens, and a fifth lens $L_5$, which is a biconvex lens, and a sixth lens $L_6$, which is a biconvex lens. The first to sixth lenses are arranged in this order from the magnification side.

The sixth lens $L_6$ arranged closest to the reduction side is formed in a non-circular shape including an effective light beam transmission area to remove unnecessary lens portions (portions disposed in the vertical direction of FIG. 13 and both side portions disposed in the depth direction of FIG. 13) $L_{6A}$ (a so-called D-cut is performed on portions in four directions), in order to prevent the diameter of a reduction-side lens from being excessively large.

The aspheric shapes of both surfaces of the first lens $L_1$ are defined by the above-mentioned aspheric expression.

In addition, FIG. 13 shows the image display surface 1 of a light valve and a glass block 2.

In Table 13, an upper part shows the curvature radius R of each lens surface in the projection lens according to Example 13, the on-axis surface spacing D between the lenses, the refractive index $N_d$ of each lens with respect to the d-line, and the Abbe number $v_d$ thereof. In addition, in Table 13, a lower part shows an aspheric coefficient indicating each aspheric surface.

TABLE 13

| Surface Number | R        | D       | Nd     | vd   |
|----------------|----------|---------|--------|------|
| OBJ            | ∞        | 720.000 |        |      |
| 1*             | 11.558   | 0.800   | 1.8061 | 40.9 |
| 2*             | 4.023    | 2.041   |        |      |
| 3              | −186.258 | 5.306   | 1.8467 | 23.8 |
| 4              | −13.106  | 1.388   |        |      |
| 5 (mask)       | ∞        | 2.150   |        |      |
| 6 (mask)       | ∞        | 1.149   |        |      |
| 7              | −10.202  | 2.425   | 1.8052 | 25.4 |
| 8              | −7.483   | 2.368   |        |      |
| 9              | −33.603  | 0.600   | 1.8467 | 23.8 |
| 10             | 8.578    | 3.420   | 1.4875 | 70.2 |
| 11             | −10.343  | 1.102   |        |      |
| 12             | 16.016   | 3.296   | 1.6516 | 58.5 |
| 13             | −20.277  | 2.544   |        |      |

TABLE 13-continued

| | | | | | |
|---|---|---|---|---|---|
| 14 | | ∞ | 13.600 | 1.5163 | 64.1 |
| 15 | | ∞ | | | |

| | K | $A_3$ | $A_4$ | $A_5$ | $A_6$ |
|---|---|---|---|---|---|
| 1 | 1.0000 | 0.0000E+00 | 2.3296E−03 | 0.0000E+00 | −1.1367E−04 |
| 2 | 1.0000 | 0.0000E+00 | 2.6351E−03 | 0.0000E+00 | −9.7837E−05 |

| | $A_7$ | $A_8$ | $A_9$ | $A_{10}$ | $A_{11}$ | $A_{12}$ |
|---|---|---|---|---|---|---|
| 1 | 0.0000E+00 | 2.2620E−06 | 0.0000E+00 | −3.1367E−08 | 0.0000E+00 | 0.0000E+00 |
| 2 | 0.0000E+00 | 1.6675E−06 | 0.0000E+00 | −9.1805E−07 | 0.0000E+00 | 0.0000E+00 |

*aspheric surface

In this example and the following examples, each table shows the curvature radius R of each of the aspheric surfaces on the optical axis Z. However, in the corresponding diagrams illustrating the lens structures, for easy viewing of the drawings, a line is not necessarily drawn from an intersection point with the optical axis Z.

As shown in Table 29, the projection lens according to Example 13 satisfies Conditional expressions 1 to 6, 11, and 2'.

In Example 13, the focal length f of the entire lens system is 6.4, the F number Fno. is 3.00, and the total angle of view 2ω is 73.2 degrees.

Example 14

The structure of a projection lens according to Example 14 is shown in FIG. 14, and is substantially similar to that according to Example 13 except that only one aperture (or an aperture diaphragm) 3 is provided.

The aspheric shapes of both surfaces of the first lens $L_1$ are defined by the above-mentioned aspheric expression.

In Table 14, an upper part shows the curvature radius R of each lens surface in the projection lens according to Example 14, the on-axis surface spacing D between the lenses, the refractive index $N_d$ of each lens with respect to the d-line, and the Abbe number $\nu_d$ thereof. In addition, in Table 14, a lower part shows an aspheric coefficient indicating each aspheric surface.

TABLE 14

| Surface Number | R | D | Nd | νd |
|---|---|---|---|---|
| OBJ | ∞ | 890.000 | | |
| 1* | 11.618 | 0.750 | 1.8035 | 40.4 |
| 2* | 3.941 | 3.030 | | |
| 3 | −172.649 | 2.081 | 1.8467 | 23.8 |
| 4 | −11.937 | 2.234 | | |
| 5 (mask) | ∞ | 3.669 | | |
| 6 | −11.097 | 1.742 | 1.8000 | 29.8 |
| 7 | −7.338 | 3.003 | | |
| 8 | −149.682 | 0.750 | 1.8467 | 23.8 |
| 9 | 8.873 | 3.674 | 1.4970 | 81.5 |
| 10 | −12.026 | 4.889 | | |
| 11 | 17.335 | 3.808 | 1.7130 | 53.9 |
| 12 | −46.158 | 0.994 | | |
| 13 | ∞ | 13.600 | 1.5163 | 64.1 |
| 14 | ∞ | | | |

| | K | $A_3$ | $A_4$ | $A_5$ | $A_6$ |
|---|---|---|---|---|---|
| 1 | 0.0000 | −5.4337E−03 | 5.6526E−03 | −9.7086E−04 | −4.7799E−04 |
| 2 | 0.0000 | −1.4025E−03 | −4.7886E−03 | 1.5640E−02 | −1.1623E−02 |

| | $A_7$ | $A_8$ | $A_9$ | $A_{10}$ | $A_{11}$ |
|---|---|---|---|---|---|
| 1 | 1.0731E−04 | 5.2504E−05 | −1.0431E−05 | −3.5676E−06 | 3.0675E−07 |
| 2 | 3.1116E−03 | 2.6686E−04 | −2.0116E−04 | −3.4798E−05 | 1.5997E−05 |

| | $A_{12}$ | $A_{13}$ | $A_{14}$ | $A_{15}$ | $A_{16}$ |
|---|---|---|---|---|---|
| 1 | 2.0881E−07 | 1.0748E−08 | −1.4097E−08 | 1.3345E−09 | 0.0000E+00 |
| 2 | 2.7001E−06 | −1.3161E−06 | 1.1050E−07 | 0.0000E+00 | 0.0000E+00 |

| | $A_{17}$ | $A_{18}$ | $A_{19}$ | $A_{20}$ |
|---|---|---|---|---|
| 1 | 0.0000E+00 | −3.7070E−27 | −4.6588E−29 | −4.6588E−31 |
| 2 | −6.0386E−25 | −4.6588E−27 | −4.6588E−29 | −4.6588E−31 |

*aspheric surface

As shown in Table 29, the projection lens according to Example 14 satisfies Conditional expressions 1 to 6, 11, 2', 6', and 6'.

In Example 14, the focal length f of the entire lens system is 7.9, the F number Fno. is 3.00, and the total angle of view $2\omega$ is 61.6 degrees.

Example 15

The structure of a projection lens according to Example 15 is shown in FIG. 15, and is substantially similar to that according to Example 13 except that the aperture (or an aperture diaphragm) 3b is provided between the third lens $L_3$ and the fourth lens $L_4$.

The aspheric shapes of both surfaces of the first lens $L_1$ are defined by the above-mentioned aspheric expression.

In addition, FIG. 15 shows the image display surface 1 of a light valve and a glass block 2.

In Table 15, an upper part shows the curvature radius R of each lens surface in the projection lens according to Example 15, the on-axis surface spacing D between the lenses, the refractive index $N_d$ of each lens with respect to the d-line, and the Abbe number $\nu_d$ thereof. In addition, in Table 15, a lower part shows an aspheric coefficient indicating each aspheric surface.

As shown in Table 29, the projection lens according to Example 15 satisfies Conditional expressions 1 to 7, 11, 2', 6', and 6''.

Since the projection lens according to Example 15 simultaneously satisfies Conditional expressions 6' and 7, the projection lens can be mounted to an ultra-miniature portable projection display device.

In Example 15, the focal length f of the entire lens system is 8.0, the F number Fno. is 3.01, and the total angle of view $2\omega$ is 61.6 degrees.

Fifth Aspect

Example 16

A projection lens according to Example 16 is shown in FIG. 16, and includes a first lens $L_1$, which is a negative meniscus lens having a convex surface facing a magnification side, a second lens $L_2$, which is a negative meniscus lens that has a concave surface facing a reduction side and includes aspheric surfaces at both sides, a third lens $L_3$, which is a biconvex lens, an aperture 3 (or a variable aperture diaphragm), a cemented lens of a fourth lens $L_4$, which is a negative meniscus lens having a concave surface facing the reduction side, and a fifth lens $L_5$, which is a biconvex lens,

TABLE 15

| Surface Number | R | D | Nd | νd |
|---|---|---|---|---|
| OBJ | ∞ | 200.000 | | |
| 1* | 14.269 | 0.892 | 1.8035 | 40.4 |
| 2* | 4.239 | 2.599 | | |
| 3 | −162.787 | 2.473 | 1.8467 | 23.8 |
| 4 | −12.513 | 2.233 | | |
| 5 (mask) | ∞ | 2.469 | | |
| 6 | −10.863 | 2.293 | 1.8000 | 29.8 |
| 7 | −7.392 | 0.000 | | |
| 8 (mask) | ∞ | 3.927 | | |
| 9 | −112.978 | 0.761 | 1.8467 | 23.8 |
| 10 | 9.470 | 3.187 | 1.4970 | 81.5 |
| 11 | −11.383 | 5.609 | | |
| 12 | 18.755 | 3.726 | 1.7130 | 53.9 |
| 13 | −37.347 | 1.293 | | |
| 14 | ∞ | 13.600 | 1.5163 | 64.1 |
| 15 | ∞ | | | |

| | K | $A_3$ | $A_4$ | $A_5$ | $A_6$ |
|---|---|---|---|---|---|
| 1 | 7.2297 | −1.5722E−03 | 2.9996E−03 | −4.5749E−04 | −8.6309E−05 |
| 2 | 0.4035 | −5.8270E−05 | 1.7781E−03 | 1.5505E−03 | −6.3307E−04 |

| | $A_7$ | $A_8$ | $A_9$ | $A_{10}$ | $A_{11}$ |
|---|---|---|---|---|---|
| 1 | 2.0006E−06 | 2.7884E−06 | 3.5630E−07 | 3.8120E−09 | −4.8195E−08 |
| 2 | −1.2882E−06 | 2.1714E−05 | −2.2774E−06 | 1.1914E−06 | −7.8052E−07 |

| | $A_{12}$ | $A_{13}$ | $A_{14}$ | $A_{15}$ | $A_{16}$ |
|---|---|---|---|---|---|
| 1 | 4.9639E−09 | 9.0705E−10 | −1.8973E−10 | 0.0000E+00 | 0.0000E+00 |
| 2 | 2.7517E−07 | −3.9745E−08 | 0.0000E+00 | 0.0000E+00 | 4.4873E−25 |

| | $A_{17}$ | $A_{18}$ | $A_{19}$ | $A_{20}$ |
|---|---|---|---|---|
| 1 | 4.4873E−27 | 4.4616E−29 | 1.6121E−29 | 1.6121E−31 |
| 2 | 1.6474E−25 | 1.6121E−27 | 1.6121E−29 | 1.6121E−31 |

*aspheric surface and a sixth lens $L_6$, which is a positive lens having aspheric surfaces at both sides. The first to sixth lenses are arranged in this order from the magnification side.

The sixth lens $L_6$ arranged closest to the reduction side, the first lens $L_1$ arranged closest to the magnification side, and the fifth lens $L_5$ are each formed in a non-circular shape including an effective light beam transmission region to remove unnecessary lens portions (portions disposed at the upper or lower side of FIG. 16) $L_{6A}$, $L_{1A}$, and $L_{5A}$ (a so-called D-cut is performed), in order to prevent the diameter of a reduction-side lens from being excessively large.

The aspheric shapes of both surfaces of each of the second lens $L_2$ and the sixth lens $L_6$ are defined by the above-mentioned aspheric expression.

In addition, FIG. 16 shows the image display surface 1 of a light valve and a glass block 2.

In Table 16, an upper part shows the curvature radius R of each lens surface in the projection lens according to Example 16, the on-axis surface spacing D between the lenses, the refractive index $N_d$ of each lens with respect to the d-line, and the Abbe number $v_d$ thereof. In addition, in Table 16, a lower part shows an aspheric coefficient indicating each aspheric surface.

As shown in Table 29, the projection lens according to Example 16 satisfies Conditional expressions 1 to 4, 6, 11, 2', 6', and 6".

In Example 16, the focal length f of the entire lens system is 6.4, the F number Fno. is 3.00, and the total angle of view $2\omega$ is 73.0 degrees.

Example 17

The structure of a projection lens according to Example 17 is shown in FIG. 17, and is substantially similar to that according to Example 16 except that the second lens $L_2$ is a biconcave lens having aspheric surface at both sides, the fourth lens $L_4$ is a biconcave lens, and two apertures (or variable aperture diaphragms) 3a and 3b are provided between the third lens $L_3$ and the fourth lens $L_4$.

The aspheric shapes of both surfaces of each of the second lens $L_2$ and the sixth lens $L_6$ are defined by the above-mentioned aspheric expression.

In Table 17, an upper part shows the curvature radius R of each lens surface in the projection lens according to Example 17, the on-axis surface spacing D between the lenses, the refractive index $N_d$ of each lens with respect to the d-line, and the Abbe number $v_d$ thereof. In addition, in Table 17, a lower part shows an aspheric coefficient indicating each aspheric surface.

TABLE 16

| Surface Number | R | D | Nd | vd |
|---|---|---|---|---|
| OBJ | ∞ | 712.000 | | |
| 1 | 20.724 | 1.000 | 1.5891 | 61.1 |
| 2 | 5.922 | 2.946 | | |
| 3* | 60.287 | 1.000 | 1.8061 | 40.9 |
| 4* | 7.405 | 3.436 | | |
| 5 | 14.999 | 4.679 | 1.6200 | 36.3 |
| 6 | −8.793 | 1.212 | | |
| 7 (mask) | ∞ | 6.753 | | |
| 8 | 34.598 | 1.006 | 1.8467 | 23.8 |
| 9 | 7.125 | 7.014 | 1.4970 | 81.5 |
| 10 | −8.624 | 0.200 | | |
| 11* | 39.485 | 2.646 | 1.8061 | 40.9 |
| 12* | −71.592 | 0.944 | | |
| 13 | ∞ | 13.600 | 1.5163 | 64.1 |
| 14 | ∞ | | | |

| | K | $A_3$ | $A_4$ | $A_5$ | $A_6$ |
|---|---|---|---|---|---|
| 3 | −4381.0041 | 1.3740E−02 | −4.2667E−03 | 1.7178E−03 | 5.1697E−06 |
| 4 | −6.5033 | 1.5023E−02 | −6.1064E−03 | 3.3714E−03 | 2.4609E−04 |
| 11 | −218.0914 | −5.9354E−04 | 3.3178E−04 | −2.3141E−04 | 2.1536E−05 |
| 12 | −884.7652 | −8.7947E−04 | −3.8181E−04 | −7.6683E−05 | −4.1170E−06 |

| | $A_7$ | $A_8$ | $A_9$ | $A_{10}$ | $A_{11}$ |
|---|---|---|---|---|---|
| 3 | −5.6601E−05 | −6.3660E−06 | 3.7446E−07 | −1.1938E−07 | −6.4456E−08 |
| 4 | −1.0935E−04 | −6.0411E−05 | −1.0029E−05 | 3.5250E−06 | 1.8579E−06 |
| 11 | −9.4797E−07 | −9.9913E−08 | 6.1194E−08 | 1.5727E−08 | −6.9289E−10 |
| 12 | 3.7916E−06 | 3.5196E−07 | −4.6215E−08 | −1.8260E−08 | −2.0656E−09 |

| | $A_{12}$ | $A_{13}$ | $A_{14}$ | $A_{15}$ | $A_{16}$ |
|---|---|---|---|---|---|
| 3 | 3.0639E−08 | 2.3035E−08 | −4.8784E−09 | 1.5632E−11 | 0.0000E+00 |
| 4 | 7.7310E−08 | −2.2504E−07 | 3.1866E−08 | 1.3191E−10 | −1.0634E−23 |
| 11 | −8.2852E−10 | −2.2182E−10 | −8.2158E−12 | 6.8343E−12 | 1.9891E−12 |
| 12 | 8.7341E−11 | 5.3850E−11 | 8.1216E−12 | −1.9018E−14 | −1.2708E−13 |

| | $A_{17}$ | $A_{18}$ | $A_{19}$ | $A_{20}$ |
|---|---|---|---|---|
| 3 | −2.4726E−24 | −5.2902E−26 | −9.8365E−28 | −9.8365E−30 |
| 4 | −5.2902E−24 | −1.0373E−25 | −9.8365E−28 | −9.8365E−30 |
| 11 | −2.7372E−13 | −5.9200E−26 | −2.9846E−28 | −1.0373E−29 |
| 12 | −7.8064E−16 | −5.9200E−26 | −2.8410E−28 | 6.7005E−30 |

*aspheric surface

TABLE 17

| Surface Number | R | D | Nd | vd |
|---|---|---|---|---|
| OBJ | ∞ | 712.000 | | |
| 1 | 23.062 | 1.000 | 1.5891 | 61.1 |
| 2 | 5.362 | 1.417 | | |
| 3* | −10.686 | 1.147 | 1.8061 | 40.9 |
| 4* | 45.051 | 2.926 | | |
| 5 | 11.610 | 3.247 | 1.6477 | 33.8 |
| 6 | −9.299 | 0.854 | | |
| 7 (mask) | ∞ | 1.100 | | |
| 8 (mask) | ∞ | 4.198 | | |
| 9 | −118.837 | 1.002 | 1.8467 | 23.8 |
| 10 | 7.361 | 4.951 | 1.4970 | 81.5 |
| 11 | −8.903 | 1.771 | | |
| 12* | 50.613 | 3.457 | 1.7432 | 49.3 |
| 13* | −15.145 | 2.499 | | |
| 14 | ∞ | 11.500 | 1.9037 | 31.3 |
| 15 | ∞ | 2.100 | 1.5168 | 64.2 |
| 16 | ∞ | | | |

| | K | $A_3$ | $A_4$ | $A_5$ | $A_6$ |
|---|---|---|---|---|---|
| 3 | 0.0000 | 9.5550E−03 | 1.9658E−04 | 1.4200E−03 | −8.2732E−05 |
| 4 | 0.0000 | 1.1073E−02 | −6.1848E−03 | 6.9221E−03 | −1.2690E−03 |
| 12 | 0.0000 | 3.6383E−04 | −1.1092E−03 | 1.5984E−04 | −1.0931E−05 |
| 13 | 0.0000 | −1.9563E−04 | −2.6369E−04 | −1.0179E−04 | 6.8166E−06 |

| | $A_7$ | $A_8$ | $A_9$ | $A_{10}$ | $A_{11}$ |
|---|---|---|---|---|---|
| 3 | −1.0599E−06 | −4.2375E−05 | −4.0825E−06 | 4.5691E−06 | 3.3941E−07 |
| 4 | −4.4392E−04 | 1.9501E−04 | 9.9850E−06 | −1.2028E−05 | −3.5231E−06 |
| 12 | 4.0357E−07 | −9.5456E−07 | 2.9388E−07 | −5.5147E−09 | −7.4846E−10 |
| 13 | 3.0449E−06 | 4.1543E−07 | −8.2617E−08 | −1.8699E−08 | −2.3562E−09 |

| | $A_{12}$ | $A_{13}$ | $A_{14}$ | $A_{15}$ | $A_{16}$ |
|---|---|---|---|---|---|
| 3 | −1.1158E−07 | −7.4452E−08 | 1.4226E−08 | 1.5630E−11 | −3.6142E−32 |
| 4 | 2.0149E−06 | −2.3425E−07 | 9.3573E−09 | 1.3191E−10 | −1.4126E−23 |
| 12 | −2.6624E−09 | 3.2020E−11 | 5.8790E−11 | 6.7488E−12 | −1.2403E−12 |
| 13 | 2.3755E−10 | 9.7100E−11 | 5.4163E−12 | −1.7550E−12 | −7.1336E−15 |

| | $A_{17}$ | $A_{18}$ | $A_{19}$ | $A_{20}$ |
|---|---|---|---|---|
| 3 | −1.5165E−24 | 6.3674E−27 | −3.9099E−28 | −3.9099E−30 |
| 4 | 6.3697E−25 | −4.4460E−26 | −3.9099E−28 | −3.9099E−30 |
| 12 | 4.8921E−33 | 1.3561E−36 | −2.9587E−40 | 5.9245E−32 |
| 13 | 3.8715E−15 | 1.0866E−36 | −2.0163E−39 | −3.4922E−32 |

*aspheric surface

As shown in Table 29, the projection lens according to Example 17 satisfies Conditional expressions 1 to 6, 11, 2', 6', and 6".

In Example 17, the focal length f of the entire lens system is 6.5, the F number Fno. is 3.00, and the total angle of view 2ω is 71.8 degrees.

Example 18

The structure of a projection lens according to Example 18 is shown in FIG. 18, and is similar to that according to Example 17 except that the second lens $L_2$ is a negative meniscus lens that has a concave surface facing the reduction side and includes aspheric surfaces at both sides.

The aspheric shapes of both surfaces of each of the second lens $L_2$ and the sixth lens $L_6$ are defined by the above-mentioned aspheric expression.

In Table 18, an upper part shows the curvature radius R of each lens surface in the projection lens according to Example 18, the on-axis surface spacing D between the lenses, the refractive index $N_d$ of each lens with respect to the d-line, and the Abbe number $v_d$ thereof. In addition, in Table 18, a lower part shows an aspheric coefficient indicating each aspheric surface.

TABLE 18

| Surface Number | R | D | Nd | vd |
|---|---|---|---|---|
| OBJ | ∞ | 165.000 | | |
| 1 | 25.866 | 1.000 | 1.5163 | 64.1 |
| 2 | 5.393 | 0.818 | | |
| 3* | 6.668 | 1.000 | 1.8061 | 40.9 |
| 4* | 3.422 | 2.504 | | |
| 5 | 9.852 | 5.009 | 1.6889 | 31.1 |
| 6 | −9.629 | 0.059 | | |

TABLE 18-continued

| | | | | |
|---|---|---|---|---|
| 7 (mask) | ∞ | 2.200 | | |
| 8 (mask) | ∞ | 2.546 | | |
| 9 | −345.401 | 1.498 | 1.8467 | 23.8 |
| 10 | 6.905 | 5.174 | 1.4970 | 81.5 |
| 11 | −8.813 | 4.381 | | |
| 12* | 34.603 | 3.124 | 1.8640 | 40.6 |
| 13* | −25.189 | 2.499 | | |
| 14 | ∞ | 11.500 | 1.9037 | 31.3 |
| 15 | ∞ | 2.100 | 1.5168 | 64.2 |
| 16 | ∞ | | | |

| | K | $A_3$ | $A_4$ | $A_5$ | $A_6$ |
|---|---|---|---|---|---|
| 3 | 0.0000 | 7.0790E−04 | −3.4524E−05 | −2.2329E−05 | −8.4515E−06 |
| 4 | 0.0000 | 1.1337E−03 | 4.2847E−04 | 3.5354E−05 | −1.4238E−05 |
| 12 | 0.0000 | −2.1563E−04 | −3.2194E−05 | −2.1313E−06 | −1.4660E−07 |
| 13 | 0.0000 | −2.0286E−04 | −8.3469E−06 | −1.8188E−06 | −2.2621E−07 |

| | $A_7$ | $A_8$ | $A_9$ | $A_{10}$ | $A_{11}$ |
|---|---|---|---|---|---|
| 3 | −2.6330E−06 | −6.8978E−07 | −1.4229E−07 | −1.7318E−08 | −7.6115E−08 |
| 4 | −8.9885E−06 | −3.1622E−06 | −8.7759E−07 | −5.2167E−07 | −3.3457E−07 |
| 12 | −9.9762E−09 | −1.4682E−10 | 1.9193E−10 | 6.0224E−11 | 7.7088E−12 |
| 13 | −2.3875E−08 | −2.4830E−09 | −2.5615E−10 | −1.6115E−11 | 9.3212E−12 |

| | $A_{12}$ | $A_{13}$ | $A_{14}$ | $A_{15}$ | $A_{16}$ |
|---|---|---|---|---|---|
| 3 | 8.8888E−09 | 4.0078E−09 | 0.0000E+00 | 0.0000E+00 | 0.0000E+00 |
| 4 | 1.7491E−07 | 0.0000E+00 | 0.0000E+00 | 0.0000E+00 | 0.0000E+00 |
| 12 | −5.7597E−12 | −5.3935E−12 | 3.1651E−12 | −2.2898E−13 | 0.0000E+00 |
| 13 | 1.1361E−11 | 7.1500E−12 | −3.9671E−12 | 5.1507E−13 | 0.0000E+00 |

| | $A_{17}$ | $A_{18}$ | $A_{19}$ | $A_{20}$ |
|---|---|---|---|---|
| 3 | 0.0000E+00 | 4.2661E−26 | 4.2661E−28 | 4.2661E−30 |
| 4 | 4.2661E−24 | 4.2661E−26 | 4.2661E−28 | 4.2661E−30 |
| 12 | 0.0000E+00 | 0.0000E+00 | 0.0000E+00 | 0.0000E+00 |
| 13 | 0.0000E+00 | 0.0000E+00 | 0.0000E+00 | 0.0000E+00 |

*aspheric surface

As shown in Table 29, the projection lens according to Example 18 satisfies Conditional expressions 1 to 7, 11, 2', 6', and 6".

Since the projection lens according to Example 18 simultaneously satisfies Conditional expressions 6' and 7, the projection lens can be mounted to an ultra-miniature portable projection display device.

In Example 18, the focal length f of the entire lens system is 7.6, the F number Fno. is 3.00, and the total angle of view 2ω is 63.6 degrees.

Sixth Aspect

Example 19

A projection lens according to Example 19 is shown in FIG. 19, and includes a first lens $L_1$, which is a negative meniscus lens having a convex surface facing a magnification side, a second lens $L_2$, which is a negative meniscus lens that has a concave surface facing a reduction side and includes aspheric surfaces at both sides, a third lens $L_3$, which is a biconvex lens, apertures (or variable aperture diaphragms) 3a and 3b, a fourth lens $L_4$, which is a positive meniscus lens having a convex surface facing the reduction side, a cemented lens of a fifth lens $L_5$, which is a plano-concave lens having a concave surface facing the reduction side, and a sixth lens $L_6$, which is a biconvex lens, and a seventh lens $L_7$, which is a biconvex lens. The first to seventh lenses are arranged in this order from the magnification side.

The aspheric shapes of both surfaces of the second lens $L_2$ are defined by the above-mentioned aspheric expression.

In addition, FIG. 19 shows the image display surface 1 of a light valve, a glass block 2a, and a cover glass 2b.

In Table 19, an upper part shows the curvature radius R of each lens surface in the projection lens according to Example 19, the on-axis surface spacing D between the lenses, the refractive index $N_d$ of each lens with respect to the d-line, and the Abbe number $v_d$ thereof. In addition, in Table 19, a lower part shows an aspheric coefficient indicating each aspheric surface.

TABLE 19

| Surface Number | R | D | Nd | vd |
|---|---|---|---|---|
| OBJ | ∞ | 712.000 | | |
| 1 | 7.594 | 0.650 | 1.7859 | 44.2 |
| 2 | 4.352 | 1.675 | | |
| 3* | 29.643 | 0.750 | 1.8061 | 40.9 |
| 4* | 5.495 | 0.557 | | |
| 5 | 16.773 | 5.077 | 1.6990 | 30.1 |

TABLE 19-continued

| | | | | |
|---|---|---|---|---|
| 6 | −10.786 | 2.017 | | |
| 7 (mask) | ∞ | 2.400 | | |
| 8 (mask) | ∞ | 0.691 | | |
| 9 | −25.343 | 4.984 | 1.8340 | 37.2 |
| 10 | −10.158 | 3.962 | | |
| 11 | ∞ | 0.600 | 1.8467 | 23.8 |
| 12 | 9.181 | 3.696 | 1.4875 | 70.2 |
| 13 | −14.207 | 1.602 | | |
| 14 | 17.841 | 2.641 | 1.7550 | 52.3 |
| 15 | −65.100 | 1.071 | | |
| 16 | ∞ | 11.500 | 1.9037 | 31.3 |
| 17 | ∞ | 1.500 | | |
| 18 | ∞ | 2.100 | 1.5163 | 64.1 |
| 19 | ∞ | | | |

| | K | $A_3$ | $A_4$ | $A_5$ | $A_6$ |
|---|---|---|---|---|---|
| 3 | 1.0000 | 0.0000E+00 | 4.6844E−04 | 0.0000E+00 | −6.5699E−05 |
| 4 | 1.0000 | 0.0000E+00 | −3.5489E−04 | 0.0000E+00 | −1.0600E−04 |

| | $A_7$ | $A_8$ | $A_9$ | $A_{10}$ | $A_{11}$ | $A_{12}$ |
|---|---|---|---|---|---|---|
| 3 | 0.0000E+00 | 2.5540E−06 | 0.0000E+00 | −7.7769E−08 | 0.0000E+00 | 0.0000E+00 |
| 4 | 0.0000E+00 | 5.3610E−07 | 0.0000E+00 | −2.9771E−08 | 0.0000E+00 | 0.0000E+00 |

*aspheric surface

As shown in Table 29, the projection lens according to Example 19 satisfies Conditional expressions 1 to 4, 6, 2', 6', and 6".

In Example 19, the focal length f of the entire lens system is 6.4, the F number Fno. is 3.00, and the total angle of view 2ω is 73.0 degrees.

Example 20

The structure of a projection lens according to Example 20 is shown in FIG. 20, and is substantially similar to that according to Example 19 except that the third lens $L_3$ is a positive meniscus lens having a convex surface facing the reduction side, the fifth lens $L_5$ is a negative meniscus lens having a concave surface facing the reduction side, and only one aperture (or a variable aperture diaphragm) 3 is provided between the third lens $L_3$ and the fourth lens $L_4$.

The seventh lens $L_7$ arranged closest to the reduction side is formed in a non-circular shape including an effective light beam transmission area to remove an unnecessary lens portion (a portion disposed in the vertical direction of FIG. 20) $L_{7A}$ (a so-called D-cut is performed), in order to prevent the diameter of a reduction-side lens from being excessively large.

The aspheric shapes of both surfaces of the second lens $L_2$ are defined by the above-mentioned aspheric expression.

FIG. 20 shows the image display surface 1 of a light valve, but no glass block is provided between the image display surface 1 and the seventh lens $L_7$.

In Table 20, an upper part shows the curvature radius R of each lens surface in the projection lens according to Example 20, the on-axis surface spacing D between the lenses, the refractive index $N_d$ of each lens with respect to the d-line, and the Abbe number $v_d$ thereof. In addition, in Table 20, a lower part shows an aspheric coefficient indicating each aspheric surface.

TABLE 20

| Surface Number | R | D | Nd | vd |
|---|---|---|---|---|
| OBJ | ∞ | 150.000 | | |
| 1 | 9.938 | 0.650 | 1.8160 | 46.6 |
| 2 | 4.534 | 1.122 | | |
| 3* | 8.892 | 0.750 | 1.8340 | 37.2 |
| 4* | 4.091 | 2.005 | | |
| 5 | −1003.332 | 4.742 | 1.9037 | 31.3 |
| 6 | −8.889 | 1.936 | | |
| 7 (mask) | ∞ | 2.925 | | |
| 8 | −34.416 | 1.662 | 1.8830 | 40.8 |
| 9 | −9.555 | 1.479 | | |
| 10 | 77.780 | 0.600 | 1.8467 | 23.8 |
| 11 | 5.696 | 2.945 | 1.4970 | 81.5 |
| 12 | −10.401 | 4.769 | | |
| 13 | 13.645 | 2.582 | 1.8348 | 42.7 |
| 14 | −67.435 | 4.373 | | |
| 15 | ∞ | | | |

TABLE 20-continued

| | K | $A_3$ | $A_4$ | $A_5$ | $A_6$ |
|---|---|---|---|---|---|
| 3 | 1.0000 | 0.0000E+00 | 5.0854E−03 | 0.0000E+00 | −4.9964E−04 |
| 4 | 1.0000 | 0.0000E+00 | 6.1793E−03 | 0.0000E+00 | −8.0880E−04 |

| | $A_7$ | $A_8$ | $A_9$ | $A_{10}$ | $A_{11}$ |
|---|---|---|---|---|---|
| 3 | 0.0000E+00 | 2.1028E−05 | 0.0000E+00 | −5.0122E−07 | 0.0000E+00 |
| 4 | 0.0000E+00 | 2.1413E−05 | 0.0000E+00 | −7.9539E−07 | 0.0000E+00 |

| | $A_{12}$ | $A_{13}$ | $A_{14}$ | $A_{15}$ | $A_{16}$ |
|---|---|---|---|---|---|
| 3 | 0.0000E+00 | 0.0000E+00 | 0.0000E+00 | 0.0000E+00 | 0.0000E+00 |
| 4 | 0.0000E+00 | 0.0000E+00 | 0.0000E+00 | 0.0000E+00 | 0.0000E+00 |

*aspheric surface

As shown in Table 29, the projection lens according to Example 20 satisfies Conditional expressions 1 to 4, 6, 7, 2', 6', and 6". Since the projection lens according to Example 20 simultaneously satisfies Conditional expressions 6' and 7, the projection lens can be mounted to an ultra-miniature portable projection display device.

In Example 20, the focal length f of the entire lens system is 4.8, the F number Fno. is 2.50, and the total angle of view 2ω is 86.6 degrees.

Example 21

The structure of a projection lens according to Example 21 is shown in FIG. 21, and is substantially similar to that according to Example 19 except that the first lens $L_1$ has aspheric surfaces at both sides, the third lens $L_3$ is a positive meniscus lens having a convex surface facing the magnification side, the fifth lens $L_5$ is a biconcave lens, and the aperture (or the variable aperture diaphragm) is not provided.

The seventh lens $L_7$ arranged closest to the reduction side and the first lens $L_1$ arranged closest to the magnification side are each formed in a non-circular shape including an effective light beam transmission area to remove unnecessary lens portions (a portion $L_{7A}$ of the seventh lens disposed in the vertical direction of FIG. 21 and a portion $L_{1A}$ of the first lens disposed on the lower side of FIG. 21) (a so-called D-cut is performed), in order to prevent the diameter of a reduction-side lens from being excessively large.

The aspheric shapes of both surfaces of the first lens $L_1$ are defined by the above-mentioned aspheric expression.

In Table 21, an upper part shows the curvature radius R of each lens surface in the projection lens according to Example 21, the on-axis surface spacing D between the lenses, the refractive index $N_d$ of each lens with respect to the d-line, and the Abbe number $v_d$ thereof. In addition, in Table 21, a lower part shows an aspheric coefficient indicating each aspheric surface.

TABLE 21

| Surface Number | R | D | Nd | vd |
|---|---|---|---|---|
| OBJ | ∞ | 680.000 | | |
| 1* | −10.870 | 1.000 | 1.4910 | 57.6 |
| 2* | −1063.593 | 2.860 | | |
| 3 | 16.949 | 0.800 | 1.8348 | 42.7 |
| 4 | 3.690 | 0.200 | | |
| 5 | 4.684 | 2.000 | 1.8467 | 23.8 |
| 6 | 33.361 | 2.450 | | |
| 7 | −6.759 | 2.000 | 1.8340 | 37.2 |
| 8 | −5.040 | 0.500 | | |
| 9 | −21.280 | 0.800 | 1.8467 | 23.8 |
| 10 | 9.005 | 2.500 | 1.4970 | 81.5 |
| 11 | −8.452 | 1.000 | | |
| 12 | 15.820 | 2.500 | 1.7725 | 49.6 |
| 13 | −20.890 | 2.690 | | |
| 14 | ∞ | 11.500 | 1.9037 | 31.3 |
| 15 | ∞ | 2.100 | 1.5163 | 64.1 |
| 16 | ∞ | | | |

| | K | $A_3$ | $A_4$ | $A_5$ | $A_6$ |
|---|---|---|---|---|---|
| 1 | 4.0975 | 0.0000E+00 | 1.2541E−02 | −2.1932E−03 | −2.6920E−05 |
| 2 | −1.1384E+06 | 0.0000E+00 | 1.1279E−02 | −6.6282E−04 | −2.5233E−04 |

| | $A_7$ | $A_8$ | $A_9$ | $A_{10}$ | $A_{11}$ |
|---|---|---|---|---|---|
| 1 | 2.1360E−05 | 6.4975E−06 | 2.7751E−08 | −1.1562E−07 | −2.0856E−08 |
| 2 | −8.0203E−05 | 2.1792E−05 | 9.3111E−06 | 4.7662E−07 | −3.3828E−07 |

TABLE 21-continued

|   | $A_{12}$ | $A_{13}$ | $A_{14}$ | $A_{15}$ | $A_{16}$ |
|---|---|---|---|---|---|
| 1 | −1.1623E−09 | 2.1241E−10 | 8.3189E−11 | −3.0606E−13 | 2.6808E−12 |
| 2 | −1.2945E−07 | −2.1756E−08 | 2.0520E−09 | 4.2117E−09 | −4.5874E−10 |

*aspheric surface

As shown in Table 29, the projection lens according to Example 21 satisfies Conditional expressions 1 to 6, 2', 6', and 6".

In Example 21, the focal length f of the entire lens system is 6.2, the F number Fno. is 3.00, and the total angle of view 2ω is 74.8 degrees.

Seventh Aspect

Example 22

A projection lens according to Example 22 is shown in FIG. 22 and includes a first lens $L_1$, which is a negative plastic lens having aspheric surfaces at both sides, a second lens $L_2$, which is a positive meniscus lens having a convex surface facing a reduction side, a third lens $L_3$, which is a biconcave lens, a fourth lens $L_4$, which is a biconvex lens, a fifth lens $L_5$, which is a biconvex lens, a cemented lens of a sixth lens $L_6$, which is a negative lens having a concave surface facing the reduction side, and a seventh lens $L_7$, which is a biconvex lens, and an eighth lens $L_8$, which is a biconvex lens. The first to eighth lenses are arranged in this order from the magnification side.

The aspheric shapes of both surfaces of the first lens $L_1$ are defined by the above-mentioned aspheric expression.

In addition, FIG. 22 shows the image display surface 1 of a light valve, a glass block 2a, and a cover glass 2b of the light valve.

In Table 22, an upper part shows the curvature radius R of each lens surface in the projection lens according to Example 22, the on-axis surface spacing D between the lenses, the refractive index $N_d$ of each lens with respect to the d-line, and the Abbe number $v_d$ thereof. In addition, in Table 22, a lower part shows an aspheric coefficient indicating each aspheric surface.

TABLE 22

| Surface Number | R | D | Nd | vd |
|---|---|---|---|---|
| OBJ | ∞ | 680.000 | | |
| 1* | −6.278 | 0.800 | 1.4910 | 57.5 |
| 2* | −16.868 | 5.938 | | |
| 3 | −108.889 | 2.000 | 1.8467 | 23.8 |
| 4 | −11.021 | 0.250 | | |
| 5 | −5.870 | 0.800 | 1.8340 | 37.2 |
| 6 | 6.476 | 0.200 | | |
| 7 | 9.587 | 1.800 | 1.5750 | 41.5 |
| 8 | −19.534 | 0.242 | | |
| 9 | 431.562 | 5.000 | 1.8340 | 37.2 |
| 10 | −7.366 | 5.100 | | |
| 11 | 22612.635 | 0.800 | 1.8467 | 23.8 |
| 12 | 8.989 | 3.000 | 1.4970 | 81.6 |
| 13 | −14.934 | 0.100 | | |
| 14 | 12.515 | 2.300 | 1.4875 | 70.2 |
| 15 | −33.060 | 2.500 | | |
| 16 | ∞ | 11.500 | 1.9037 | 31.3 |
| 17 | ∞ | 2.100 | 1.5163 | 64.1 |
| 18 | ∞ | 0.199 | | |
| 19 | ∞ | | | |

|   | K | $A_3$ | $A_4$ | $A_5$ | $A_6$ |
|---|---|---|---|---|---|
| 1 | 0.0000 | 0.0000E+00 | 1.9588E−02 | −4.9827E−03 | 2.4413E−04 |
| 2 | 0.0000 | 0.0000E+00 | 1.9191E−02 | −5.1422E−03 | 8.8385E−04 |

|   | $A_7$ | $A_8$ | $A_9$ | $A_{10}$ | $A_{11}$ |
|---|---|---|---|---|---|
| 1 | 5.9265E−05 | −1.0185E−06 | −1.1003E−06 | −7.2421E−08 | 8.3668E−09 |
| 2 | −1.1695E−04 | −8.8397E−06 | 4.6430E−06 | 5.9892E−07 | −9.0173E−08 |

|   | $A_{12}$ | $A_{13}$ | $A_{14}$ | $A_{15}$ | $A_{16}$ |
|---|---|---|---|---|---|
| 1 | 2.6983E−09 | 2.2473E−10 | −7.4684E−12 | −1.9011E−11 | 1.7363E−12 |
| 2 | −4.1461E−08 | −3.4133E−09 | 1.0835E−09 | 4.4459E−10 | −6.5512E−11 |

*aspheric surface

As shown in Table 29, the projection lens according to Example 22 satisfies Conditional expressions 1, 2, 4, 6, 2', 6', and 6".

In Example 22, the focal length f of the entire lens system is 6.0, the F number Fno. is 3.00, and the total angle of view 2ω is 76.0 degrees.

Example 23

The structure of a projection lens according to Example 23 is shown in FIG. 23, and is substantially similar to that according to Example 22 except that the second lens $L_2$ is a biconvex lens and the fifth lens $L_5$ is a positive meniscus lens having a convex surface facing the reduction side.

In addition, a so-called D-cut is performed on only the eighth lens $L_8$ arranged closest to the reduction side.

The aspheric shapes of both surfaces of the first lens $L_1$ are defined by the above-mentioned aspheric expression.

In Table 23, an upper part shows the curvature radius R of each lens surface in the projection lens according to Example 23, the on-axis surface spacing D between the lenses, the refractive index $N_d$ of each lens with respect to the d-line, and the Abbe number $v_d$ thereof. In addition, in Table 23, a lower part shows an aspheric coefficient indicating each aspheric surface.

In Example 23, the focal length f of the entire lens system is 6.2, the F number Fno. is 3.00, and the total angle of view 2ω is 74.2 degrees.

Example 24

The structure of a projection lens according to Example 24 is shown in FIG. 24, and is substantially similar to that according to Example 22 except that the second lens $L_2$ is a biconvex lens and the fifth lens $L_5$ is a positive meniscus lens having a convex surface facing the reduction side.

In addition to the eighth lens Le, the sixth lens $L_6$ and the seventh lens $L_7$ are each formed in a non-circular shape including an effective light beam transmission area to remove unnecessary lens portions (portions disposed in the vertical direction of FIG. 24) $L_{6A}$ and $L_{7A}$ (a so-called D-cut is performed), in order to prevent the diameter of a reduction-side lens from being excessively large.

The aspheric shapes of both surfaces of the first lens $L_1$ are defined by the above-mentioned aspheric expression.

In Table 24, an upper part shows the curvature radius R of each lens surface in the projection lens according to Example 24, the on-axis surface spacing D between the lenses, the refractive index $N_d$ of each lens with respect to the d-line, and the Abbe number $v_d$ thereof. In addition, in Table 24, a lower part shows an aspheric coefficient indicating each aspheric surface.

TABLE 23

| Surface Number | R | D | Nd | vd |
|---|---|---|---|---|
| OBJ | ∞ | 180.000 | | |
| 1* | −8.218 | 1.600 | 1.4910 | 57.6 |
| 2* | −1589.234 | 2.500 | | |
| 3 | 13.628 | 2.000 | 1.8467 | 23.8 |
| 4 | −29.306 | 0.200 | | |
| 5 | −35.554 | 0.800 | 1.8340 | 37.2 |
| 6 | 4.189 | 0.200 | | |
| 7 | 6.208 | 1.800 | 1.5750 | 41.5 |
| 8 | −24.027 | 0.500 | | |
| 9 | −6.585 | 4.000 | 1.8340 | 37.2 |
| 10 | −5.430 | 2.510 | | |
| 11 | 388.429 | 0.800 | 1.8467 | 23.8 |
| 12 | 10.198 | 3.000 | 1.4970 | 81.5 |
| 13 | −12.171 | 0.100 | | |
| 14 | 10.650 | 3.200 | 1.4875 | 70.2 |
| 15 | −43.434 | 3.140 | | |
| 16 | ∞ | 8.600 | 1.9037 | 31.3 |
| 17 | ∞ | 2.100 | 1.5163 | 64.1 |
| 18 | ∞ | | | |

| | K | $A_3$ | $A_4$ | $A_5$ | $A_6$ |
|---|---|---|---|---|---|
| 1 | 1.7985 | 0.0000E+00 | 1.3744E−02 | −2.6965E−03 | −1.6015E−05 |
| 2 | 1.5785E+05 | 0.0000E+00 | 1.5492E−02 | −3.7596E−03 | 1.0268E−03 |

| | $A_7$ | $A_8$ | $A_9$ | $A_{10}$ | $A_{11}$ |
|---|---|---|---|---|---|
| 1 | 5.2195E−05 | 1.9419E−06 | −8.5339E−07 | −9.2298E−08 | 2.3404E−09 |
| 2 | −1.6137E−04 | −1.5420E−05 | 5.5487E−06 | 9.8813E−07 | −2.1264E−08 |

| | $A_{12}$ | $A_{13}$ | $A_{14}$ | $A_{15}$ | $A_{16}$ |
|---|---|---|---|---|---|
| 1 | 2.4116E−09 | 3.2152E−10 | 1.7211E−11 | −1.7567E−11 | 9.8696E−13 |
| 2 | −3.2452E−08 | −2.1545E−09 | 1.3243E−09 | 5.1600E−10 | −4.2587E−11 |

*aspheric surface

As shown in Table 29, the projection lens according to Example 23 satisfies Conditional expressions 1 to 4, 6, 7, 2', 6', and 6". Since the projection lens according to Example 23 simultaneously satisfies Conditional expressions 6' and 7, the projection lens can be mounted to an ultra-miniature portable projection display device.

TABLE 24

| Surface Number | R | D | Nd | νd |
|---|---|---|---|---|
| OBJ | ∞ | 680.000 | | |
| 1* | −8.206 | 1.600 | 1.4910 | 57.6 |
| 2* | −854.287 | 2.500 | | |
| 3 | 14.407 | 2.000 | 1.8467 | 23.8 |
| 4 | −26.255 | 0.060 | | |
| 5 | −61.492 | 0.800 | 1.8340 | 37.2 |
| 6 | 4.340 | 0.200 | | |
| 7 | 6.109 | 1.800 | 1.5750 | 41.5 |
| 8 | −54.407 | 0.500 | | |
| 9 | −6.609 | 4.000 | 1.8340 | 37.2 |
| 10 | −5.485 | 2.200 | | |
| 11 | 479.799 | 0.800 | 1.8467 | 23.8 |
| 12 | 9.706 | 3.000 | 1.4970 | 81.5 |
| 13 | −12.037 | 0.100 | | |
| 14 | 10.428 | 3.200 | 1.4875 | 70.2 |
| 15 | −40.991 | 3.140 | | |
| 16 | ∞ | 8.600 | 1.9037 | 31.3 |
| 17 | ∞ | 2.100 | 1.5163 | 64.1 |
| 18 | ∞ | | | |

| | K | $A_3$ | $A_4$ | $A_5$ | $A_6$ |
|---|---|---|---|---|---|
| 1 | 1.7986 | 0.0000E+00 | 1.3729E−02 | −2.6533E−03 | −1.7033E−05 |
| 2 | 4.5613E+04 | 0.0000E+00 | 1.5484E−02 | −3.6993E−03 | 1.0665E−03 |

| | $A_7$ | $A_8$ | $A_9$ | $A_{10}$ | $A_{11}$ |
|---|---|---|---|---|---|
| 1 | 5.1555E−05 | 1.8965E−06 | −8.4746E−07 | −8.9919E−08 | 2.8009E−09 |
| 2 | −1.5997E−04 | −1.6658E−05 | 5.2724E−06 | 9.7924E−07 | −7.6163E−09 |

| | $A_{12}$ | $A_{13}$ | $A_{14}$ | $A_{15}$ | $A_{16}$ |
|---|---|---|---|---|---|
| 1 | 2.4766E−09 | 3.2774E−10 | 1.7242E−11 | −1.7730E−11 | 9.3789E−13 |
| 2 | −2.6070E−08 | −1.0043E−10 | 1.8972E−09 | 6.6535E−10 | −4.8110E−12 |

*aspheric surface

As shown in Table 29, the projection lens according to Example 24 satisfies Conditional expressions 1 to 6, 2', 6', and 6".

In Example 24, the focal length f of the entire lens system is 6.3, the F number Fno. is 2.80, and the total angle of view 2ω is 73.6 degrees.

Eighth Aspect

Example 25

Figure 25:
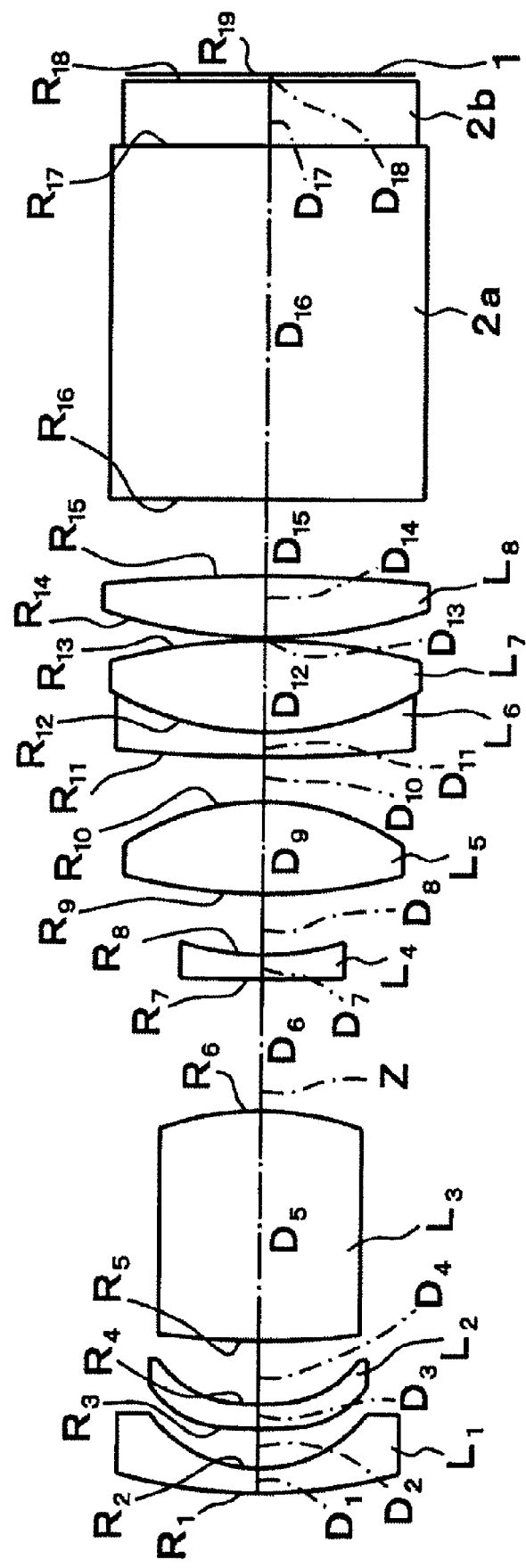
FIG. 25 is a diagram illustrating the structure of a small projection lens according to Example 25 of the invention.

A projection lens according to Example 25 is shown in FIG. 25, and includes a first lens $L_1$, which is a negative meniscus lens having a concave surface facing a reduction side, a second lens $L_2$, which is a negative plastic lens having aspheric surfaces at both sides, a third lens $L_3$, which is a biconvex lens, a fourth lens $L_4$, which is a negative meniscus lens having a concave surface facing the reduction side, a fifth lens $L_5$, which is a biconvex lens, a cemented lens of a sixth lens $L_6$, which is a negative lens having a concave surface facing the reduction side, and a seventh lens $L_7$, which is a biconvex lens, and an eighth lens $L_8$, which is a biconvex lens. The first to eighth lenses are arranged in this order from the magnification side.

The aspheric shapes of both surfaces of the second lens $L_2$ are defined by the above-mentioned aspheric expression.

In addition, FIG. 25 shows the image display surface of a light valve, a glass block $2a$, and a cover glass $2b$ of the light valve.

In Table 25, an upper part shows the curvature radius R of each lens surface in the projection lens according to Example 25, the on-axis surface spacing D between the lenses, the refractive index $N_d$ of each lens with respect to the d-line, and the Abbe number $\nu_d$ thereof. In addition, in Table 25, a lower part shows an aspheric coefficient indicating each aspheric surface.

TABLE 25

| Surface Number | R | D | Nd | νd |
|---|---|---|---|---|
| OBJ | ∞ | 680.000 | | |
| 1 | 16.705 | 0.800 | 1.7400 | 28.3 |
| 2 | 4.353 | 1.283 | | |
| 3* | 24.460 | 0.800 | 1.4910 | 57.5 |
| 4* | 9.115 | 2.066 | | |
| 5 | 25.576 | 7.467 | 1.7618 | 26.5 |
| 6 | −9.353 | 4.271 | | |
| 7 | 92.133 | 0.800 | 1.8348 | 42.7 |
| 8 | 8.567 | 2.000 | | |
| 9 | 17.311 | 3.000 | 1.4875 | 70.2 |

TABLE 25-continued

| | | | | |
|---|---|---|---|---|
| 10 | −7.889 | 1.450 | | |
| 11 | 48.501 | 0.800 | 1.8467 | 23.8 |
| 12 | 9.976 | 3.000 | 1.4970 | 81.6 |
| 13 | −18.390 | 0.100 | | |
| 14 | 16.077 | 2.000 | 1.4875 | 70.2 |
| 15 | −54.420 | 2.500 | | |
| 16 | ∞ | 11.500 | 1.9037 | 31.3 |
| 17 | ∞ | 2.100 | 1.5163 | 64.1 |
| 18 | ∞ | 0.199 | | |
| 19 | ∞ | | | |

| | K | $A_3$ | $A_4$ | $A_5$ | $A_6$ |
|---|---|---|---|---|---|
| 3 | 0.0000 | 0.0000E+00 | 1.1694E−02 | −7.6083E−04 | −3.7624E−04 |
| 4 | 0.0000 | 0.0000E+00 | 1.1261E−02 | −9.1131E−05 | −5.6267E−04 |

| | $A_7$ | $A_8$ | $A_9$ | $A_{10}$ | $A_{11}$ |
|---|---|---|---|---|---|
| 3 | −2.5041E−05 | 3.1362E−05 | 4.9472E−06 | −9.7992E−07 | −4.8235E−07 |
| 4 | 5.0774E−06 | 2.2289E−05 | 5.2798E−06 | −1.1635E−06 | −7.1628E−07 |

| | $A_{12}$ | $A_{13}$ | $A_{14}$ | $A_{15}$ | $A_{16}$ |
|---|---|---|---|---|---|
| 3 | −3.5286E−08 | 2.5192E−08 | 7.9011E−09 | −1.5843E−09 | 0.0000E+00 |
| 4 | −1.7200E−08 | 6.0047E−08 | 1.7823E−08 | −5.3066E−09 | 0.0000E+00 |

*aspheric surface

As shown in Table 29, the projection lens according to Example 25 satisfies Conditional expressions 1 to 4, 6, 2', 6', and 6".

In Example 25, the focal length f of the entire lens system is 6.0, the F number Fno. is 3.00, and the total angle of view 2ω is 76.2 degrees.

Example 26

Figure 26:
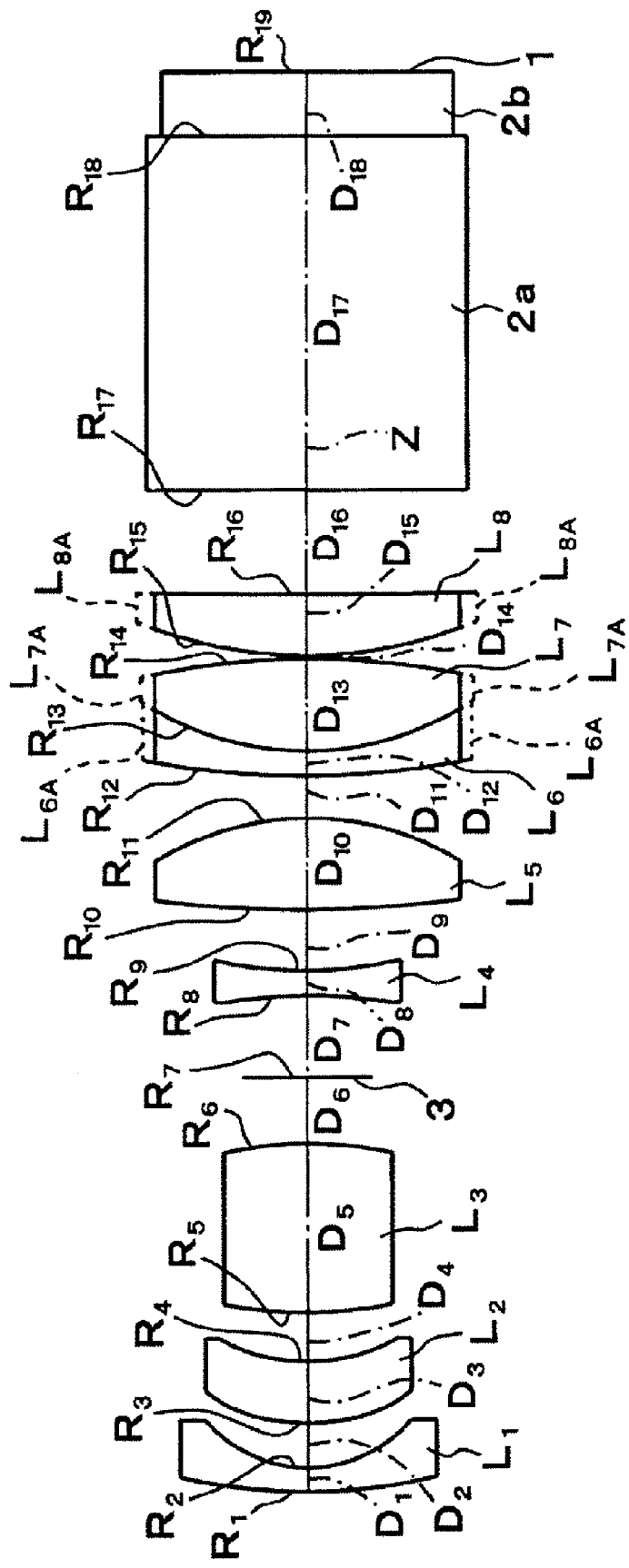
FIG. 26 is a diagram illustrating the structure of a small projection lens according to Example 26 of the invention.

The structure of a projection lens according to Example 26 is shown in FIG. 26, and is substantially similar to that according to Example 25 except that the fourth lens $L_4$ is a biconcave lens and the eighth lens $L_8$ is a positive meniscus lens having a convex surface facing the magnification side.

In addition, an aperture 3 is provided between the third lens $L_3$ and the fourth lens $L_4$.

The sixth lens $L_6$, the seventh lens $L_7$, and the eighth lens $L_8$ arranged on the reduction side are each formed in a non-circular shape including an effective light beam transmission area to remove unnecessary lens portions (portions disposed in the vertical direction of FIG. 26) $L_{6A}$, $L_{7A}$, and $L_{8A}$ (a so-called D-cut is performed), in order to prevent the diameter of a reduction-side lens from being excessively large.

The aspheric shapes of both surfaces of the second lens $L_2$ are defined by the above-mentioned aspheric expression.

In Table 26, an upper part shows the curvature radius R of each lens surface in the projection lens according to Example 26, the on-axis surface spacing D between the lenses, the refractive index $N_d$ of each lens with respect to the d-line, and the Abbe number $v_d$ thereof. In addition, in Table 26, a lower part shows an aspheric coefficient indicating each aspheric surface.

TABLE 26

| Surface Number | R | D | Nd | νd |
|---|---|---|---|---|
| OBJ | ∞ | 180.000 | | |
| 1 | 18.229 | 0.800 | 1.7400 | 28.3 |
| 2 | 4.450 | 1.460 | | |
| 3* | 7.800 | 2.000 | 1.4910 | 57.6 |
| 4* | 6.619 | 1.570 | | |
| 5 | 14.081 | 5.500 | 1.7847 | 25.7 |
| 6 | −12.532 | 2.150 | | |
| 7 (mask) | ∞ | 2.670 | | |
| 8 | −17.214 | 0.800 | 1.8061 | 33.3 |
| 9 | 13.525 | 2.000 | | |
| 10 | 40.568 | 3.000 | 1.7292 | 54.7 |
| 11 | −9.520 | 1.350 | | |
| 12 | 27.766 | 0.800 | 1.8467 | 23.8 |
| 13 | 9.839 | 3.000 | 1.4970 | 81.5 |
| 14 | −25.445 | 0.100 | | |
| 15 | 14.426 | 2.000 | 1.4875 | 70.2 |
| 16 | 301.906 | 3.400 | | |
| 17 | ∞ | 11.500 | 1.9037 | 31.3 |
| 18 | ∞ | 2.100 | 1.5163 | 64.1 |
| 19 | ∞ | | | |

TABLE 26-continued

|   | K | $A_3$ | $A_4$ | $A_5$ | $A_6$ |
|---|---|---|---|---|---|
| 3 | 0.0000 | 0.0000E+00 | 7.2078E−05 | 2.3139E−03 | −1.0333E−03 |
| 4 | 0.0000 | 0.0000E+00 | −1.3696E−03 | 3.9854E−03 | −1.7348E−03 |

|   | $A_7$ | $A_8$ | $A_9$ | $A_{10}$ | $A_{11}$ |
|---|---|---|---|---|---|
| 3 | 1.6107E−04 | 5.5693E−06 | −1.1862E−06 | 1.5435E−06 | 2.6429E−07 |
| 4 | −2.6760E−04 | 2.7567E−04 | 4.4089E−05 | −2.2054E−05 | −9.7358E−06 |

|   | $A_{12}$ | $A_{13}$ | $A_{14}$ | $A_{15}$ | $A_{16}$ |
|---|---|---|---|---|---|
| 3 | −1.8780E−07 | −9.9748E−08 | 2.7997E−09 | 1.4969E−08 | −2.2535E−09 |
| 4 | 6.5086E−07 | 1.0996E−06 | 6.8375E−08 | −9.6556E−08 | 1.0113E−08 |

*aspheric surface

As shown in Table 29, the projection lens according to Example 26 satisfies Conditional expressions 1 to 4, 6, 7, 2', 6', and 6". Since the projection lens according to Example 26 simultaneously satisfies Conditional expressions 6' and 7, the projection lens can be mounted to an ultra-miniature portable projection display device.

In Example 26, the focal length f of the entire lens system is 7.6, the F number Fno. is 2.80, and the total angle of view 2ω is 63.4 degrees.

Example 27

Figure 27:
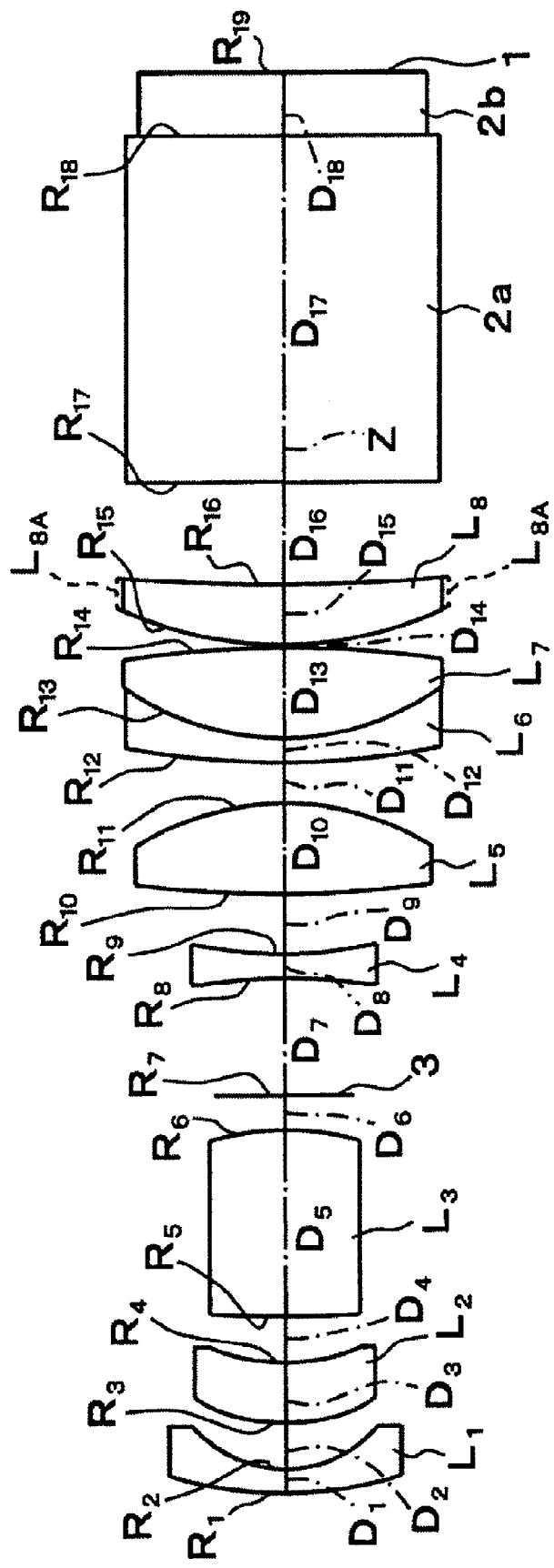
FIG. 27 is a diagram illustrating the structure of a small projection lens according to Example 27 of the invention.
Figure 37A:
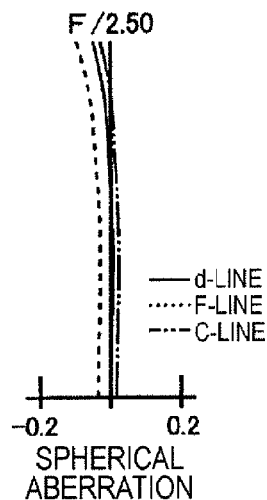
FIGS. 37A to 37D are diagrams illustrating all aberrations of the small projection lens according to Example 9.
Figure 37B:
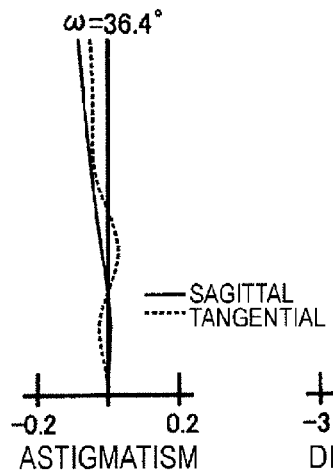
Figure 37C:
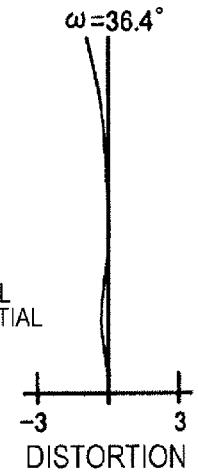
Figure 37D:
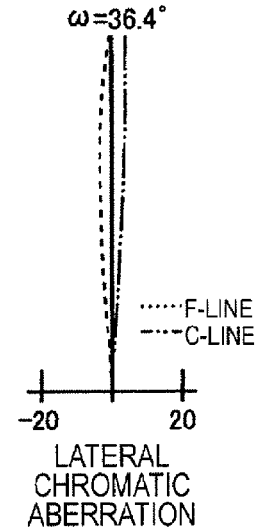
Figure 38A:
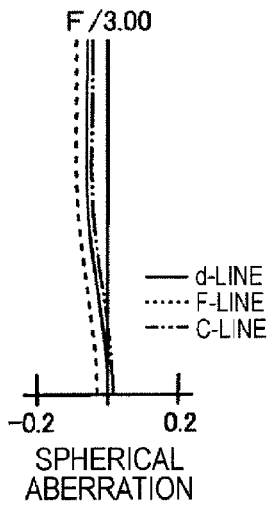
FIGS. 38A to 38D are diagrams illustrating all aberrations of the small projection lens according to Example 10.
Figure 38B:
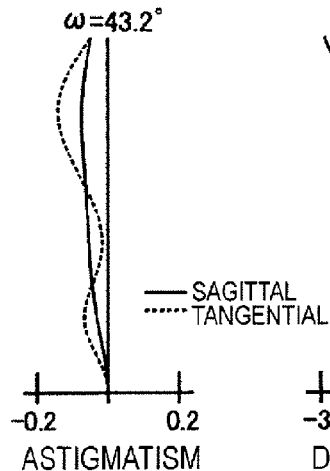
Figure 38C:
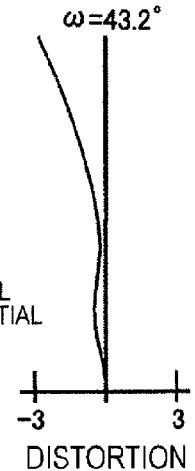
Figure 38D:
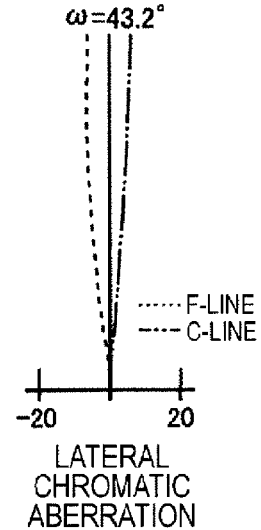
Figure 43A:
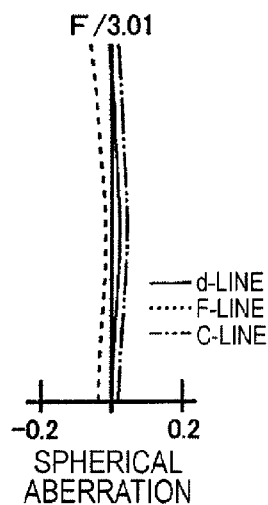
FIGS. 43A to 43D are diagrams illustrating all aberrations of the small projection lens according to Example 15.
Figure 43B:
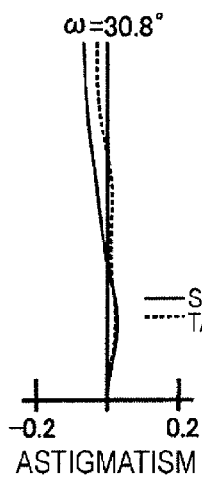
Figure 43C:
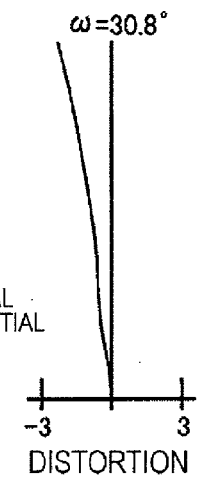
Figure 43D:
Figure 44A:
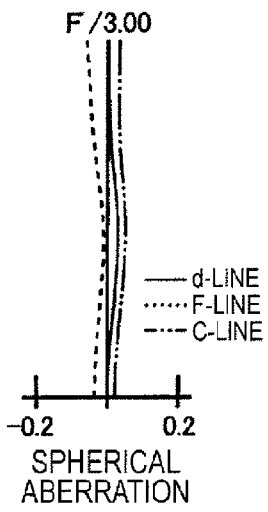
FIGS. 44A to 44D are diagrams illustrating all aberrations of the small projection lens according to Example 16.
Figure 44B:
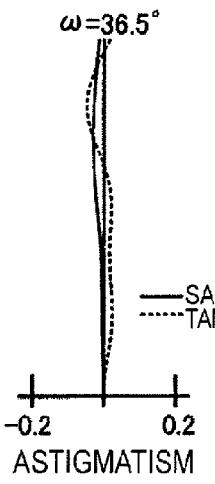
Figure 44C:
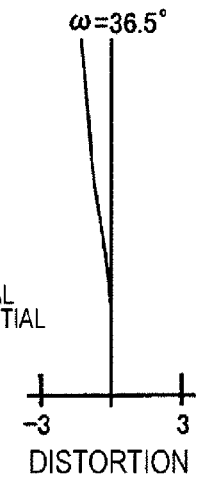
Figure 44D:
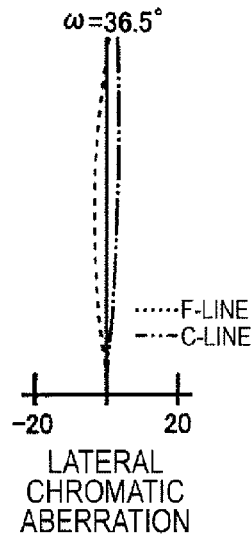
Figure 45A:
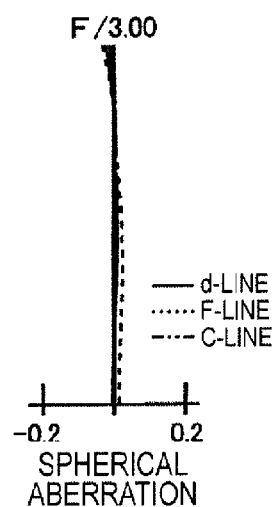
FIGS. 45A to 45D are diagrams illustrating all aberrations of the small projection lens according to Example 17.
Figure 45B:
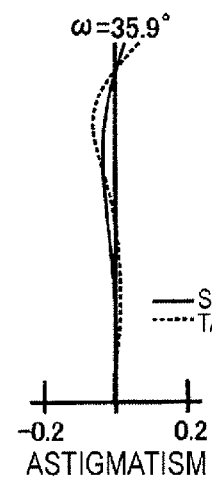
Figure 45C:
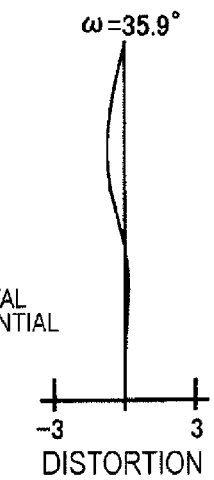
Figure 45D:
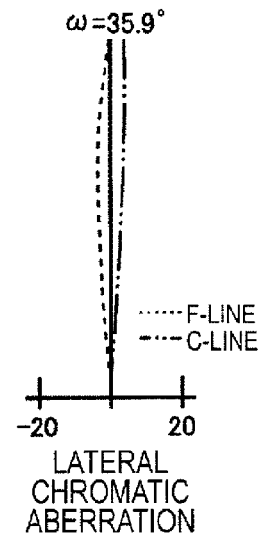
Figure 46A:
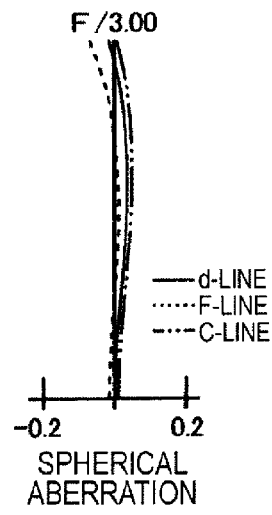
FIGS. 46A to 46D are diagrams illustrating all aberrations of the small projection lens according to Example 18.
Figure 46B:
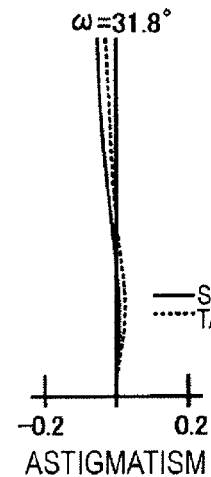
Figure 46C:
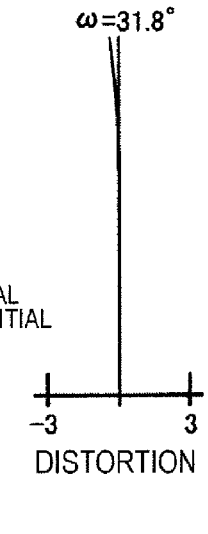
Figure 46D:
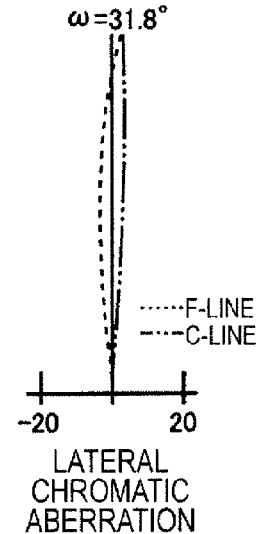
Figure 49A:
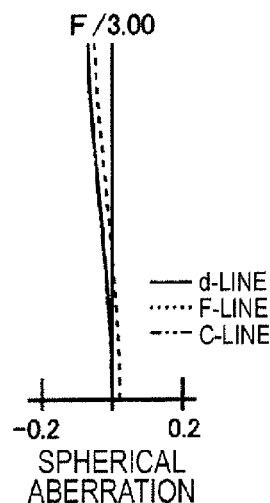
FIGS. 49A to 49D are diagrams illustrating all aberrations of the small projection lens according to Example 21.
Figure 49B:
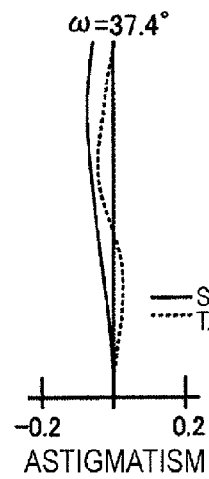
Figure 49C:
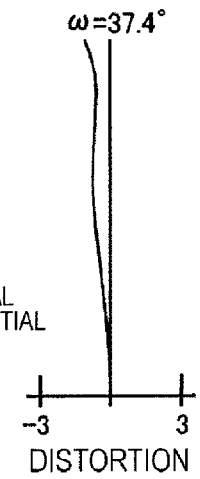
Figure 49D:
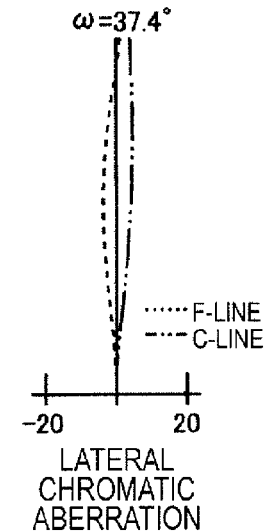
Figure 50A:
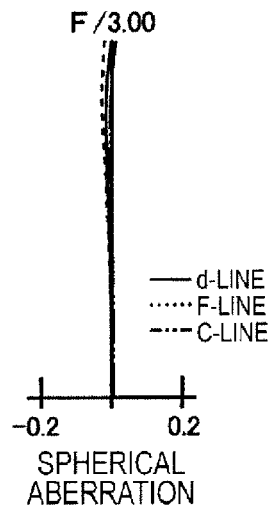
FIGS. 50A to 50D are diagrams illustrating all aberrations of the small projection lens according to Example 22.
Figure 50B:
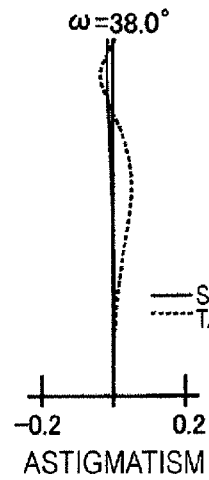
Figure 50C:
Figure 50D:
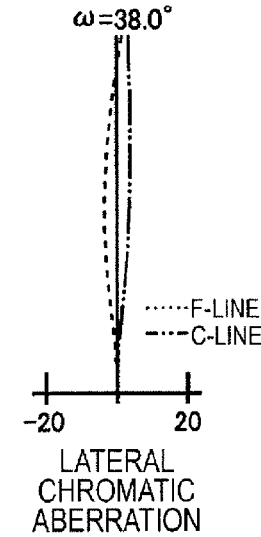
Figure 51A:
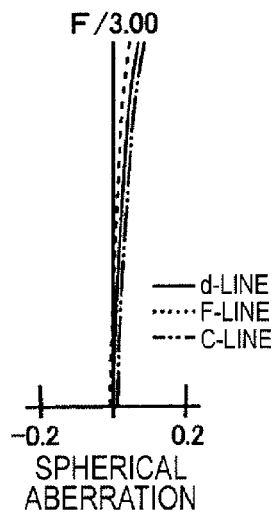
FIGS. 51A to 51D are diagrams illustrating all aberrations of the small projection lens according to Example 23.
Figure 51B:
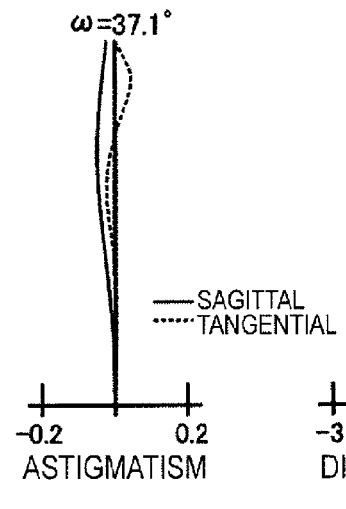
Figure 51C:
Figure 51D:
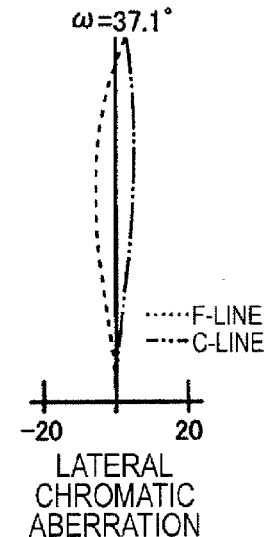
Figure 52A:
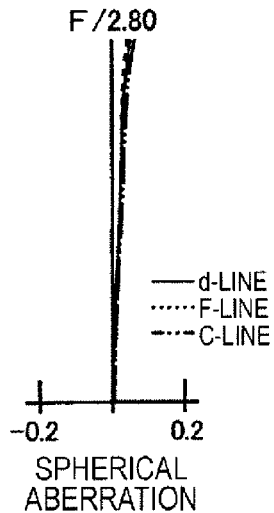
FIGS. 52A to 52D are diagrams illustrating all aberrations of the small projection lens according to Example 24.
Figure 52B:
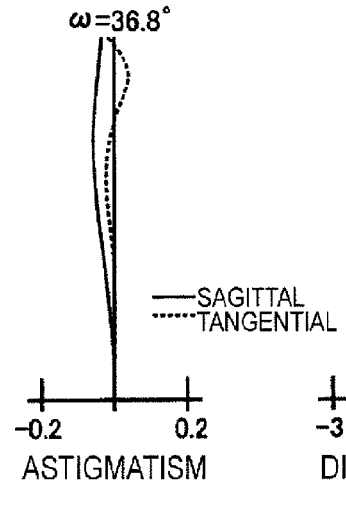
Figure 52C:
Figure 52D:
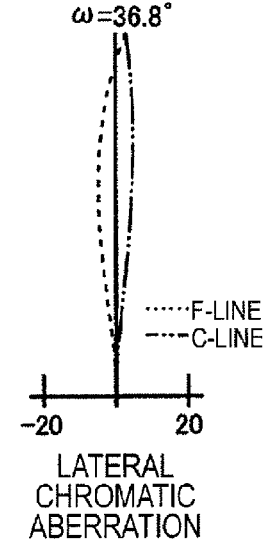

A projection lens according to Example 27 is shown in FIG. 27 and includes a first lens $L_1$, which is a negative meniscus lens having a concave surface facing a reduction side, a second lens $L_2$, which is a positive plastic lens having aspheric surfaces at both sides, a third lens $L_3$, which is a biconvex lens, an aperture 3, a fourth lens $L_4$, which is a biconcave lens, a fifth lens $L_5$, which is a biconvex lens, a cemented lens of a sixth lens $L_6$, which is a negative lens having a concave surface facing the reduction side, and a seventh lens $L_7$, which is a biconvex lens, and an eighth lens $L_8$, which is a positive meniscus lens having a convex surface facing a magnification side. The first to eighth lenses are arranged in this order from the magnification side.

The eighth lens $L_8$ arranged closest to the reduction side is formed in a non-circular shape including an effective light beam transmission area to remove an unnecessary lens portion (a portion disposed in the vertical direction of FIG. 27) $L_{8A}$ (a so-called D-cut is performed), in order to prevent the diameter of a reduction-side lens from being excessively large.

The aspheric shapes of both surfaces of the second lens $L_2$ are defined by the above-mentioned aspheric expression.

In Table 27, an upper part shows the curvature radius R of each lens surface in the projection lens according to Example 27, the on-axis surface spacing D between the lenses, the refractive index $N_d$ of each lens with respect to the d-line, and the Abbe number $v_d$ thereof. In addition, in Table 27, a lower part shows an aspheric coefficient indicating each aspheric surface.

TABLE 27

| Surface Number | R | D | Nd | vd |
|---|---|---|---|---|
| OBJ | ∞ | 180.000 | | |
| 1 | 13.154 | 0.800 | 1.7400 | 28.3 |
| 2 | 4.067 | 1.530 | | |
| 3* | 7.638 | 2.000 | 1.4910 | 57.6 |
| 4* | 7.463 | 1.520 | | |
| 5 | 43.555 | 6.180 | 1.7847 | 25.7 |
| 6 | −9.167 | 1.150 | | |
| 7 (mask) | ∞ | 3.900 | | |
| 8 | −18.505 | 0.800 | 1.8061 | 33.3 |
| 9 | 13.655 | 2.000 | | |
| 10 | 38.857 | 3.000 | 1.7292 | 54.7 |
| 11 | −9.290 | 1.350 | | |
| 12 | 27.472 | 0.800 | 1.8467 | 23.8 |
| 13 | 9.060 | 3.000 | 1.4970 | 81.5 |
| 14 | −37.297 | 0.100 | | |
| 15 | 12.834 | 2.000 | 1.4875 | 70.2 |
| 16 | 66.582 | 3.400 | | |
| 17 | ∞ | 11.500 | 1.9037 | 31.3 |
| 18 | ∞ | 2.100 | 1.5163 | 64.1 |
| 19 | ∞ | | | |

TABLE 27-continued

|   | K | $A_3$ | $A_4$ | $A_5$ | $A_6$ |
|---|---|---|---|---|---|
| 3 | 0.0000 | 0.0000E+00 | 2.5451E−03 | −3.3929E−04 | 6.9551E−04 |
| 4 | 0.0000 | 0.0000E+00 | −4.6157E−04 | 4.6502E−03 | −2.7729E−03 |

|   | $A_7$ | $A_8$ | $A_9$ | $A_{10}$ | $A_{11}$ |
|---|---|---|---|---|---|
| 3 | −3.4108E−04 | −3.2434E−06 | 2.3910E−05 | 5.2169E−06 | −6.2400E−07 |
| 4 | 2.3846E−04 | 2.0792E−04 | 2.0683E−05 | −1.5622E−05 | −6.6064E−06 |

|   | $A_{12}$ | $A_{13}$ | $A_{14}$ | $A_{15}$ | $A_{16}$ |
|---|---|---|---|---|---|
| 3 | −6.6590E−07 | −1.5133E−07 | 2.9112E−08 | 2.6857E−08 | −4.7952E−09 |
| 4 | −4.7277E−08 | 6.0675E−07 | 9.9958E−08 | −2.6839E−08 | −1.8832E−09 |

*aspheric surface

As shown in Table 29, the projection lens according to Example 27 satisfies Conditional expressions 1 to 4, 6, 7, 2', 6', and 6". Since the projection lens according to Example 27 simultaneously satisfies Conditional expressions 2' and 6, the projection lens can be mounted to an ultra-miniature portable projection display device.

In Example 27, the focal length f of the entire lens system is 7.6, the F number Fno. is 2.80, and the total angle of view 2ω is 63.6 degrees.

Example 28

The structure of a projection lens according to Example 28 is shown in FIG. 28, and is substantially similar to that according to Example 27 except that the third lens $L_3$ is a positive meniscus lens having a convex surface facing the reduction side and the eighth lens $L_8$ is a biconvex lens.

The sixth lens $L_6$, the seventh lens $L_7$, and the eighth lens $L_8$ arranged on the reduction side are each formed in a non-circular shape including an effective light beam transmission area to remove unnecessary lens portions (portions disposed in the vertical direction of FIG. 28) $L_{6A}$, $L_{7A}$, and $L_{8A}$ (a so-called D-cut is performed), in order to prevent the diameter of a reduction-side lens from being excessively large.

The aspheric shapes of both surfaces of the second lens $L_2$ are defined by the above-mentioned aspheric expression.

In Table 28, an upper part shows the curvature radius R of each lens surface in the projection lens according to Example 28, the on-axis surface spacing D between the lenses, the refractive index $N_d$ of each lens with respect to the d-line, and the Abbe number $v_d$ thereof. In addition, in Table 28, a lower part shows an aspheric coefficient indicating each aspheric surface.

TABLE 28

| Surface Number | R | D | Nd | vd |
|---|---|---|---|---|
| OBJ | ∞ | 680.000 | | |
| 1 | 10.800 | 0.800 | 1.7400 | 28.3 |
| 2 | 3.810 | 2.090 | | |
| 3* | 10.648 | 2.000 | 1.4910 | 57.6 |
| 4* | 11.293 | 1.870 | | |
| 5 | −100.578 | 5.000 | 1.7847 | 25.7 |
| 6 | −8.258 | 1.150 | | |
| 7 (mask) | ∞ | 4.430 | | |
| 8 | −27.693 | 0.800 | 1.8061 | 33.3 |
| 9 | 13.370 | 2.000 | | |
| 10 | 29.487 | 3.000 | 1.7292 | 54.7 |
| 11 | −10.330 | 1.350 | | |
| 12 | 35.206 | 0.800 | 1.8467 | 23.8 |
| 13 | 9.006 | 3.000 | 1.4970 | 81.5 |
| 14 | −30.335 | 0.100 | | |
| 15 | 16.589 | 2.000 | 1.4875 | 70.2 |
| 16 | −137.610 | 3.120 | | |
| 17 | ∞ | 11.500 | 1.9037 | 31.3 |
| 18 | ∞ | 2.100 | 1.5163 | 64.1 |
| 19 | ∞ | | | |

|   | K | $A_3$ | $A_4$ | $A_5$ | $A_6$ |
|---|---|---|---|---|---|
| 3 | 0.0000 | 0.0000E+00 | 2.9956E−03 | −3.1215E−04 | 5.5367E−04 |
| 4 | 0.0000 | 0.0000E+00 | 1.4203E−03 | 2.7631E−03 | −2.1573E−03 |

TABLE 28-continued

|   | $A_7$ | $A_8$ | $A_9$ | $A_{10}$ | $A_{11}$ |
|---|---|---|---|---|---|
| 3 | −3.0257E−04 | 1.0891E−05 | 2.4675E−05 | 4.3736E−06 | −9.9757E−07 |
| 4 | 3.3427E−04 | 1.9084E−04 | 7.9333E−06 | −1.8893E−05 | −6.6959E−06 |

|   | $A_{12}$ | $A_{13}$ | $A_{14}$ | $A_{15}$ | $A_{16}$ |
|---|---|---|---|---|---|
| 3 | −7.3777E−07 | −1.4447E−07 | 4.0097E−08 | 3.0984E−08 | −6.0125E−09 |
| 4 | 2.6344E−07 | 7.6795E−07 | 1.2408E−07 | −4.8733E−08 | −1.2184E−10 |

*aspheric surface

As shown in Table 29, the projection lens according to Example 28 satisfies Conditional expressions 1 to 4, 6, 2', 6', and 6".

In Example 28, the focal length f of the entire lens system is 7.3, the F number Fno. is 2.80, and the total angle of view 2ω is 66.0 degrees.

FIGS. 29 to 56 are diagrams illustrating all aberrations (spherical aberration, astigmatism, distortion, and lateral chromatic aberration) of the small projection lenses according to Examples 1 to 28. In the aberration diagrams, ω indicates a half angle of view. The spherical aberration diagram shows the aberration curves of the d-line, the F-line, and the C-line. The lateral chromatic aberration diagram shows the aberration curves of the F-line (represented by a dotted line, which is the same with the other lateral chromatic aberration diagrams) and the C-line (represented by a two-dot chain line, which is the same with the other lateral chromatic aberration diagrams) with respect to the d-line. As shown in FIGS. 29 to 56, in the small projection lenses according to Examples 1 to 28, all aberrations including distortion and lateral chromatic aberration are effectively corrected.

The small projection lens according to the invention is not limited to the above-described examples, but various modifications and changes of the invention can be made. For example, the curvature radius R of each lens and the surface spacing D (or the thickness of the lens) between the lenses may be appropriately changed.

In addition, the projection display device according to the invention is not limited to the above-mentioned structure, but the small projection lens according to the invention may be applied to various apparatuses. For example, a transmissive or reflective liquid crystal display device or a micro mirror device having a plurality of tiltable micro mirrors formed on a substantial plane (for example, a digital micro mirror device available from Texas Instruments, Inc.) may be used as the light valve. In addition, the structure of the illumination optical system may be appropriately changed depending on the kind of light valves.

TABLE 29

| | Conditional expression | | | | | | | | | | | | |
|---|---|---|---|---|---|---|---|---|---|---|---|---|---|
| | (1) | (2), (2') | (3) | | (4) | (5) | | (6), (6'), (6") | (7) | (8) | (9) | (10) | (11) |
| Example | β/S | 2ω | FH | BH | Bf/f | IH | TH | S/OBJ | S | vd12 | vd34 | vd4-vd3 | vd5-vd4 |
| 1 | 2.8 | 48.3 | 3.0 | 6.2 | 0.95 | 4.7 | 4.4 | 33.8 | 20.3 | 23.8, 23.8 | 54.7, 54.7 | — | — |
| 2 | 4.0 | 61.8 | 1.9 | 3.6 | 0.89 | 3.5 | 3.3 | 42.7 | 6.8 | 31.3, 23.8 | 54.7, 54.7 | — | — |
| 3 | 3.1 | 45.4 | 2.9 | 5.6 | 0.99 | 4.1 | 4.0 | 32.7 | 22.9 | 23.8, 23.8 | 49.6, 53.2 | — | — |
| 4 | 3.1 | 45.4 | 3.0 | 5.2 | 1.04 | 4.1 | 4.1 | 32.7 | 22.9 | 23.8, 23.8 | 49.6, 49.2 | — | — |
| 5 | 3.9 | 45.8 | 1.6 | 4.3 | 1.09 | 3.3 | 3.3 | 33.0 | 19.8 | 23.8, 23.8 | 49.6, 53.2 | — | — |
| 6 | 3.9 | 45.6 | 1.6 | 4.2 | 1.24 | 3.3 | 3.4 | 33.0 | 19.8 | 23.8, 25.4 | 46.6, 53.2 | — | — |
| 7 | 2.9 | 62.0 | 4.2 | 5.8 | 1.57 | 4.7 | 4.3 | 45.4 | 40.9 | — | — | 46.4 | — |
| 8 | 2.8 | 72.8 | 4.0 | 5.9 | 1.55 | 4.7 | 4.0 | 55.5 | 39.5 | — | — | 57.7 | — |
| 9 | 3.3 | 72.9 | 4.1 | 5.9 | 1.55 | 4.7 | 4.3 | 48.4 | 34.4 | — | — | 57.7 | — |
| 10 | 2.8 | 86.5 | 4.5 | 5.6 | 1.97 | 4.7 | 4.5 | 72.5 | 9.1 | — | — | 57.7 | — |
| 11 | 4.7 | 48.1 | 3.0 | 6.3 | 1.01 | 4.7 | 4.3 | 20.2 | 12.1 | — | — | 18.9 | — |
| 12 | 3.0 | 60.9 | 3.9 | 5.8 | 1.26 | 4.6 | 4.5 | 41.9 | 37.3 | — | — | 57.5 | — |
| 13 | 6.6 | 73.2 | 4.2 | 5.7 | 1.80 | 4.7 | 4.3 | 24.0 | 17.3 | — | — | — | 46.4 |
| 14 | 2.8 | 61.5 | 4.0 | 5.9 | 1.27 | 4.6 | 4.3 | 45.4 | 40.4 | — | — | — | 57.7 |
| 15 | 2.8 | 61.6 | 4.1 | 6.0 | 1.28 | 4.7 | 4.1 | 45.9 | 9.2 | — | — | — | 57.7 |
| 16 | 2.8 | 73.0 | 5.2 | 5.8 | 1.55 | 4.7 | 5.3 | 55.9 | 39.8 | — | — | — | 57.7 |
| 17 | 3.0 | 71.8 | 4.5 | 5.8 | 1.52 | 4.7 | 4.5 | 51.8 | 36.9 | — | — | — | 57.7 |
| 18 | 2.7 | 63.6 | 4.3 | 5.8 | 1.27 | 4.7 | 4.3 | 50.4 | 8.3 | — | — | — | 57.7 |
| 19 | 2.8 | 73.1 | 4.2 | 5.7 | 1.56 | 4.7 | 4.9 | 56.1 | 39.9 | — | — | — | — |
| 20 | 4.1 | 86.7 | 4.9 | 5.2 | 0.91 | 4.5 | 4.9 | 52.5 | 7.9 | — | — | — | — |
| 21 | 3.7 | 74.7 | 4.5 | 5.5 | 1.64 | 4.7 | 4.5 | 44.1 | 30.0 | — | — | — | — |
| 22 | 2.8 | 75.9 | 5.7 | 5.5 | 1.68 | 4.7 | 5.7 | 59.1 | 40.2 | — | — | — | — |
| 23 | 3.3 | 74.0 | 4.8 | 5.5 | 1.46 | 4.7 | 4.7 | 50.0 | 9.0 | — | — | — | — |
| 24 | 2.7 | 73.6 | 4.7 | 5.5 | 1.44 | 4.7 | 4.6 | 59.0 | 40.1 | — | — | — | — |
| 25 | 2.8 | 76.3 | 4.6 | 5.3 | 1.68 | 4.7 | 5.0 | 59.3 | 40.3 | — | — | — | — |
| 26 | 2.7 | 63.4 | 4.5 | 5.5 | 1.38 | 5.4 | 5.5 | 49.9 | 9.0 | — | — | — | — |
| 27 | 2.7 | 63.7 | 3.9 | 5.4 | 1.43 | 4.7 | 5.5 | 50.0 | 9.0 | — | — | — | — |
| 28 | 2.7 | 66.1 | 4.6 | 5.5 | 1.44 | 4.7 | 5.3 | 51.2 | 34.8 | — | — | — | — |

What is claimed is:

1. A projection lens that projects image information displayed at a reduction-side conjugate position to a magnification-side conjugate position,
wherein a shortest radius of each lens element of the projection lens in a diametric direction orthogonal to an optical axis is equal to or less than 15 mm, and
the projection lens satisfies the following conditional expression:

$2.5 < \beta/S < 10.0$ where S indicates the maximum length of a magnification-side image (inch), and β indicates a magnifying power.

2. The projection lens according to claim 1,
wherein the projection lens satisfies the following conditional expressions:

$2\omega > 60$ degrees, and $FH < BH$ where 2ω indicates an angle of view on a magnification side, FH indicates the maximum effective light beam height of a lens surface closest to the magnification side, and BH indicates the maximum effective light beam height of a lens surface closest to a reduction side.

3. The projection lens according to claim 1,
wherein a lens arranged closest to the reduction side has a non-circular shape including an effective light beam transmission area, and
the projection lens satisfies the following conditional expression:

$Bf/f > 0.8$ where Bf indicates a reduction-side back focal length and f indicates the focal length of the entire lens system.

4. The projection lens according to claim 1,
wherein a lens arranged closest to the reduction side has a non-circular shape including an effective light beam transmission area, and
the projection lens satisfies the following conditional expressions:

$2\omega > 35$ degrees, and $Bf/f > 0.8$ where 2ω indicates an angle of view on a magnification side, Bf indicates a reduction-side back focal length, and f indicates the focal length of the entire lens system.

5. The projection lens according to claim 1,
wherein the projection lens satisfies the following conditional expressions:

$Bf/f > 0.8$, and $IH > TH$ where Bf indicates a reduction-side back focal length, f indicates the focal length of the entire lens system, IH indicates the maximum effective light beam height at the reduction-side conjugate position, and TH indicates the maximum effective light beam height of lenses other than a lens closest to the reduction side.

6. The projection lens according to claim 1,
wherein the projection lens satisfies the following conditional expression:

$20 < S/OBJ < 65$ where S indicates the maximum length of a magnification-side image (inch) and OBJ indicates a magnification-side projection distance (m).

7. The projection lens according to claim 1,
wherein the projection lens satisfies the following conditional expressions:

$35 < S/OBJ < 140$, and $3.0 < S < 10.0$ where S indicates the maximum length of a magnification-side image (inch) and OBJ indicates a magnification-side projection distance (m).

8. The projection lens according to claim 1,
wherein the reduction side is telecentric.

9. The projection lens according to claim 1, comprising:
a first lens having a positive refractive power;
a second lens that has a negative refractive power and includes a concave surface facing the magnification side;
a third lens that has a positive refractive power and includes a convex surface facing the reduction side; and
a fourth lens having a positive refractive power,
wherein the first to fourth lenses are arranged in this order from the magnification side.

10. The projection lens according to claim 1, comprising:
a first lens that has a negative refractive power and includes a concave surface facing the reduction side;
a second lens that has a positive refractive power and includes a convex surface facing the reduction side;
a third lens having a negative refractive power;
a fourth lens that has a positive refractive power and includes a convex surface facing the reduction side; and
a fifth lens having a positive refractive power,
wherein the first to fifth lenses are arranged in this order from the magnification side.

11. The projection lens according to claim 1, comprising:
a first lens having a meniscus shape in which a convex surface faces the magnification side;
a second lens having a positive refractive power;
a third lens that has a negative refractive power and includes a concave surface facing the magnification side;
a fourth lens that has a positive refractive power and includes a convex surface facing the reduction side; and
a fifth lens having a positive refractive power,
wherein the first to fifth lenses are arranged in this order from the magnification side.

12. The projection lens according to claim 1, comprising:
a first lens that has a negative refractive power and includes a concave surface facing the reduction side;
a second lens that has a positive refractive power and includes a convex surface facing the reduction side;
a third lens that has a positive refractive power and includes a convex surface facing the reduction side;
a fourth lens having a negative refractive power;
a fifth lens that has a positive refractive power and includes a convex surface facing the reduction side; and
a sixth lens that has a positive refractive power and includes a convex surface facing the magnification side,
wherein the first to sixth lenses are arranged in this order from the magnification side.

13. The projection lens according to claim 1, comprising:
a first lens that has a negative refractive power and includes a concave surface facing the reduction side;
a second lens that has a negative refractive power and includes a concave surface facing the reduction side;

a third lens that has a positive refractive power and includes a convex surface facing the reduction side;
a fourth lens having a negative refractive power;
a fifth lens that has a positive refractive power and includes a convex surface facing the reduction side; and
a sixth lens having a positive refractive power,
wherein the first to sixth lenses are arranged in this order from the magnification side.

14. The projection lens according to claim 1, comprising:
a first lens that has a negative refractive power and includes a concave surface facing the reduction side;
a second lens that has a negative refractive power and includes a concave surface facing the reduction side;
a third lens that has a positive refractive power;
a fourth lens that has a positive refractive power and includes a convex surface facing the reduction side;
a fifth lens having a negative refractive power;
a sixth lens that has a positive refractive power and includes a convex surface facing the reduction side; and
a seventh lens that has a positive refractive power and includes a convex surface facing the magnification side,
wherein the first to seventh lenses are arranged in this order from the magnification side.

15. The projection lens according to claim 1, comprising:
a first lens having a negative refractive power;
a second lens having a positive refractive power;
a third lens having a negative refractive power;
a fourth lens having a positive refractive power;
a fifth lens having a positive refractive power;
a sixth lens having a negative refractive power;
a seventh lens having a positive refractive power; and
an eighth lens having a positive refractive power,
wherein the first to eighth lenses are arranged in this order from the magnification side.

16. The projection lens according to claim 1, comprising:
a first lens having a negative refractive power;
a second lens having a negative refractive power;
a third lens having a positive refractive power;
a fourth lens having a negative refractive power;
a fifth lens having a positive refractive power;
a sixth lens having a negative refractive power;
a seventh lens having a positive refractive power; and
an eighth lens having a positive refractive power,
wherein the first to eighth lenses are arranged in this order from the magnification side.

17. A projection display device comprising:
a light source;
a plurality of light valves;
an illumination optical unit that guides light emitted from the light source to the light valves; and
the projection lens according to claim 1,
wherein the light valves modulate the light emitted from the light source,
the modulated light is composed, and
the composed light is projected onto a screen by the projection lens.

18. A projection display device comprising:
a light source;
a light valve;
an illumination optical unit that guides light emitted from the light source to the light valve; and
the projection lens according to claim 1,
wherein the light valve modulates the light emitted from the light source, and
the modulated light is projected onto a screen by the projection lens.

\* \* \* \* \*